United States Patent
Su et al.

(10) Patent No.: US 11,789,847 B2
(45) Date of Patent: Oct. 17, 2023

(54) ON-CHIP CODE BREAKPOINT DEBUGGING METHOD, ON-CHIP PROCESSOR, AND CHIP BREAKPOINT DEBUGGING SYSTEM

(71) Applicant: SHANGHAI CAMBRICON INFORMATION TECHNOLOGY CO., LTD, Shanghai (CN)

(72) Inventors: Zhenyu Su, Shanghai (CN); Dingfei Zhang, Shanghai (CN); Xiaoyong Zhou, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 303 days.

(21) Appl. No.: 17/138,161

(22) Filed: Dec. 30, 2020

(65) Prior Publication Data

US 2021/0182177 A1   Jun. 17, 2021

Related U.S. Application Data

(63) Continuation of application No. PCT/CN2019/092805, filed on Jun. 25, 2019.

(30) Foreign Application Priority Data

Jun. 27, 2018 (CN) .......................... 201810680472.4
Jul. 16, 2018 (CN) .......................... 201810777693.3

(Continued)

(51) Int. Cl.
G06F 11/36 (2006.01)

(52) U.S. Cl.
CPC ...... *G06F 11/3644* (2013.01); *G06F 11/3624* (2013.01); *G06F 11/3656* (2013.01); *G06F 11/3664* (2013.01)

(58) Field of Classification Search
None
See application file for complete search history.

(56) References Cited

U.S. PATENT DOCUMENTS

| 5,052,043 A | 9/1991 | Gaborski |
| 5,544,311 A * | 8/1996 | Harenberg .......... G06F 11/2236 714/E11.166 |

(Continued)

FOREIGN PATENT DOCUMENTS

| CN | 1503858 A | 6/2004 |
| CN | 1503958 A | 6/2004 |

(Continued)

OTHER PUBLICATIONS

D. Kim, C. Celio, S. Karandikar, D. Biancolin, J. Bachrach and K. Asanovic, "DESSERT: Debugging RTL Effectively with State Snapshotting for Error Replays across Trillions of Cycles," 2018 28th Int'l Conf on Field Programmable Logic and Applications (FPL), Dublin, Ireland, Aug. 27, 2018, pp. 76-80 (Year: 2018).*

(Continued)

*Primary Examiner* — Andrew M. Lyons
(74) *Attorney, Agent, or Firm* — Rimon PC

(57) ABSTRACT

The present application discloses an on-chip code breakpoint debugging method, an on-chip processor, and a chip breakpoint debugging system. The on-chip processor starts and executes an on-chip code, and an output function is set at a breakpoint position of the on-chip code. The on-chip processor obtains output information output by the output function, and stores the output information into an off-chip memory. In one embodiment, according to the output information, output by the output function and stored in the off-chip memory, the on-chip processor can obtain execution conditions of the breakpoints of the on-chip code in real time, achieve the purpose of debugging multiple breakpoints (Continued)

US 11,789,847 B2
Page 2 in the on-chip code concurrently, and improve debugging efficiency.

18 Claims, 22 Drawing Sheets

(30) Foreign Application Priority Data

Jul. 17, 2018 (CN) .................. 201810782174.6
Sep. 7, 2018 (CN) .................. 201811045822.6

(56) References Cited

U.S. PATENT DOCUMENTS

| | | | |
|---|---|---|---|
| 6,047,351 A * | 4/2000 | Cheng ............... | G06F 9/4812 710/266 |
| 6,145,123 A | 11/2000 | Torrey et al. | |
| 6,715,065 B1 | 3/2004 | Ebata et al. | |
| 6,732,307 B1 | 5/2004 | Edwards | |
| 6,751,751 B1 * | 6/2004 | Murray ............... | G06F 11/3648 714/34 |
| 6,877,114 B2 * | 4/2005 | Allen ................. | G06F 11/364 714/45 |
| 6,931,639 B1 | 8/2005 | Eickemeyer | |
| 7,242,414 B1 | 7/2007 | Thekkath et al. | |
| 7,406,451 B2 | 7/2008 | Mrziglod et al. | |
| 7,721,128 B2 | 5/2010 | Johns et al. | |
| 7,945,607 B2 | 5/2011 | Hinds | |
| 8,694,572 B2 | 4/2014 | Samy et al. | |
| 8,924,455 B1 | 12/2014 | Barman et al. | |
| 9,412,366 B2 | 8/2016 | Wilensky et al. | |
| 9,916,531 B1 | 3/2018 | Zivkovic et al. | |
| 10,187,568 B1 | 1/2019 | Tran et al. | |
| 10,224,954 B1 | 3/2019 | Madduri et al. | |
| 10,225,400 B1 * | 3/2019 | Engelke ............ | H04M 7/125 |
| 10,255,400 B1 * | 4/2019 | Villarreal .......... | G06F 30/327 |
| 10,360,304 B1 | 7/2019 | Alvarez et al. | |
| 10,427,306 B1 | 10/2019 | Quinlan et al. | |
| 2002/0138714 A1 | 9/2002 | Leibholz et al. | |
| 2003/0167460 A1 | 9/2003 | Desai et al. | |
| 2004/0250164 A1 | 12/2004 | Ahmad et al. | |
| 2005/0138327 A1 | 6/2005 | Tabei | |
| 2006/0161375 A1 | 7/2006 | Duberstein et al. | |
| 2009/0113186 A1 | 4/2009 | Kato et al. | |
| 2009/0125293 A1 | 5/2009 | Lefurgy et al. | |
| 2010/0073068 A1 | 3/2010 | Cho et al. | |
| 2011/0060587 A1 | 3/2011 | Phillips et al. | |
| 2011/0219217 A1 * | 9/2011 | Sixsou ............... | G06F 11/362 712/E9.032 |
| 2011/0301777 A1 | 12/2011 | Cox et al. | |
| 2012/0316845 A1 | 12/2012 | Grey et al. | |
| 2013/0054110 A1 | 2/2013 | Sata | |
| 2013/0332610 A1 | 12/2013 | Beveridge | |
| 2014/0081625 A1 | 3/2014 | Wilensky et al. | |
| 2014/0164737 A1 | 6/2014 | Collange et al. | |
| 2014/0208083 A1 * | 7/2014 | Burnett ............. | G06F 11/3636 712/228 |
| 2014/0249814 A1 | 9/2014 | Nakano et al. | |
| 2015/0134581 A1 | 5/2015 | Doeding et al. | |
| 2015/0370303 A1 | 12/2015 | Krishnaswamy et al. | |
| 2016/0026231 A1 | 1/2016 | Ignowski et al. | |
| 2016/0054922 A1 | 2/2016 | Awasthi et al. | |
| 2016/0124710 A1 | 5/2016 | Lutz et al. | |
| 2016/0170866 A1 | 6/2016 | Ioualalen et al. | |
| 2016/0328645 A1 | 11/2016 | Lin et al. | |
| 2016/0328647 A1 | 11/2016 | Lin et al. | |
| 2017/0090956 A1 | 3/2017 | Linsky | |
| 2017/0103022 A1 | 4/2017 | Kreinin et al. | |
| 2017/0142327 A1 | 5/2017 | Bayani | |
| 2017/0161604 A1 | 6/2017 | Craddock et al. | |
| 2017/0221176 A1 | 8/2017 | Munteanu et al. | |
| 2017/0257079 A1 | 9/2017 | Jain et al. | |
| 2017/0262959 A1 | 9/2017 | Lee et al. | |
| 2017/0316307 A1 | 11/2017 | Koster et al. | |
| 2017/0316312 A1 | 11/2017 | Goyal et al. | |
| 2017/0344882 A1 | 11/2017 | Ambrose et al. | |
| 2017/0353163 A1 | 12/2017 | Gazneli et al. | |
| 2017/0357530 A1 | 12/2017 | Shih et al. | |
| 2017/0357910 A1 | 12/2017 | Sommer et al. | |
| 2018/0046903 A1 | 2/2018 | Yao et al. | |
| 2018/0088996 A1 | 3/2018 | Rossi et al. | |
| 2018/0096243 A1 | 4/2018 | Patil et al. | |
| 2018/0157464 A1 | 6/2018 | Lutz et al. | |
| 2018/0267706 A1 * | 9/2018 | Li .................... | G06F 3/061 |
| 2018/0288440 A1 | 10/2018 | Chao | |
| 2018/0293517 A1 | 10/2018 | Browne et al. | |
| 2018/0300931 A1 | 10/2018 | Vembu et al. | |
| 2018/0322391 A1 | 11/2018 | Wu et al. | |
| 2018/0357541 A1 | 12/2018 | Chen et al. | |
| 2018/0367729 A1 | 12/2018 | Parasnis et al. | |
| 2018/0373976 A1 | 12/2018 | Woo | |
| 2019/0042925 A1 | 2/2019 | Choe et al. | |
| 2019/0050710 A1 | 2/2019 | Wang et al. | |
| 2019/0057696 A1 | 2/2019 | Ogawa | |
| 2019/0114142 A1 | 4/2019 | Yoda et al. | |
| 2019/0122094 A1 | 4/2019 | Chen et al. | |
| 2019/0122119 A1 | 4/2019 | Husain | |
| 2019/0138372 A1 | 5/2019 | Tee | |
| 2019/0164285 A1 | 5/2019 | Nye et al. | |
| 2019/0180170 A1 | 6/2019 | Huang et al. | |
| 2019/0199370 A1 | 6/2019 | Madduri et al. | |
| 2019/0220734 A1 | 7/2019 | Ferdman et al. | |
| 2019/0228762 A1 | 7/2019 | Wang et al. | |
| 2019/0251429 A1 | 8/2019 | Du et al. | |
| 2019/0265949 A1 | 8/2019 | Ito | |
| 2019/0278677 A1 | 9/2019 | Terechko et al. | |
| 2019/0294968 A1 | 9/2019 | Vantrease et al. | |
| 2019/0339937 A1 | 11/2019 | Lo et al. | |
| 2019/0354464 A1 * | 11/2019 | Peck ................. | G06F 11/3664 |
| 2020/0005424 A1 | 1/2020 | Appu et al. | |
| 2020/0097799 A1 | 3/2020 | Divakar et al. | |
| 2020/0117453 A1 | 4/2020 | Zhang et al. | |
| 2020/0117614 A1 | 4/2020 | Zhang et al. | |
| 2020/0125508 A1 | 4/2020 | Liu et al. | |
| 2020/0126554 A1 | 4/2020 | Chen et al. | |
| 2020/0126555 A1 | 4/2020 | Chen et al. | |
| 2020/0142748 A1 | 5/2020 | Liu et al. | |
| 2020/0159527 A1 | 5/2020 | Zhang et al. | |
| 2020/0159530 A1 | 5/2020 | Zhang et al. | |
| 2020/0159532 A1 | 5/2020 | Zhang et al. | |
| 2020/0159533 A1 | 5/2020 | Zhang et al. | |
| 2020/0160162 A1 | 5/2020 | Zhang et al. | |
| 2020/0160163 A1 | 5/2020 | Liu et al. | |
| 2020/0160219 A1 | 5/2020 | Zhang et al. | |
| 2020/0160220 A1 | 5/2020 | Zhang et al. | |
| 2020/0160221 A1 | 5/2020 | Zhang et al. | |
| 2020/0160222 A1 | 5/2020 | Zhang et al. | |
| 2020/0168227 A1 | 5/2020 | Chen et al. | |
| 2020/0174547 A1 | 6/2020 | Fang et al. | |
| 2020/0183752 A1 | 6/2020 | Liu et al. | |
| 2020/0241874 A1 | 7/2020 | Chen et al. | |
| 2020/0257972 A1 | 8/2020 | Miniskar et al. | |
| 2020/0334041 A1 | 10/2020 | Zhang et al. | |
| 2020/0334522 A1 | 10/2020 | Zhang et al. | |
| 2020/0334572 A1 | 10/2020 | Zhang et al. | |
| 2020/0394522 A1 | 12/2020 | Liu et al. | |
| 2020/0394523 A1 | 12/2020 | Liu et al. | |
| 2021/0042889 A1 | 2/2021 | Pei | |
| 2021/0061028 A1 | 3/2021 | Da Deppo et al. | |
| 2021/0117768 A1 | 4/2021 | Liu et al. | |
| 2021/0117810 A1 | 4/2021 | Liu | |
| 2021/0182177 A1 | 6/2021 | Su et al. | |
| 2021/0264270 A1 | 8/2021 | Liu et al. | |
| 2021/0286688 A1 | 9/2021 | Liu et al. | |
| 2021/0334007 A1 | 10/2021 | Liu et al. | |
| 2021/0334137 A1 | 10/2021 | Zhang et al. | |
| 2021/0341989 A1 | 11/2021 | Chen et al. | |
| 2021/0374510 A1 | 12/2021 | Liu et al. | |
| 2021/0374511 A1 | 12/2021 | Liu et al. | |

FOREIGN PATENT DOCUMENTS

| | | |
|---|---|---|
| CN | 1851668 A | 10/2006 |
| CN | 101572829 A | 11/2009 |

(56) References Cited

FOREIGN PATENT DOCUMENTS

| | | |
|---|---|---|
| CN | 102270042 A | 12/2011 |
| CN | 102789413 A | 11/2012 |
| CN | 102903089 A | 1/2013 |
| CN | 104914977 A | 9/2015 |
| CN | 105389158 A | 3/2016 |
| CN | 103534664 A | 8/2016 |
| CN | 105893419 A | 8/2016 |
| CN | 106156310 A | 11/2016 |
| CN | 106354568 A | 1/2017 |
| CN | 106406812 A | 2/2017 |
| CN | 106469291 A | 3/2017 |
| CN | 106650922 A | 5/2017 |
| CN | 106814639 A | 6/2017 |
| CN | 106951587 A | 7/2017 |
| CN | 106951962 A | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107644254 A | 1/2018 |
| CN | 107797913 A | 3/2018 |
| CN | 104899641 A | 7/2018 |
| CN | 104899641 B | 7/2018 |
| CN | 108717570 A | 10/2018 |
| CN | 109062540 A | 12/2018 |
| CN | 109063820 A | 12/2018 |
| CN | 109146057 A | 1/2019 |
| CN | 109214509 A | 1/2019 |
| CN | 109389219 A | 2/2019 |
| CN | 109472353 A | 3/2019 |
| CN | 109800877 A | 5/2019 |
| CN | 109902745 A | 6/2019 |
| EP | 0 789 296 A1 | 8/1997 |
| EP | 2 703 945 A2 | 3/2014 |
| EP | 3 106 997 A2 | 12/2016 |
| EP | 3 407 268 A1 | 11/2018 |
| JP | H03075860 A | 8/1989 |
| JP | H09-265379 A | 10/1997 |
| JP | 2009134433 A | 8/2012 |
| JP | 2013514570 A | 4/2013 |
| JP | 2015509183 A | 3/2015 |
| JP | 1996087475 B2 | 5/2015 |
| JP | 2015176158 A | 10/2015 |
| JP | 2014199464 A | 10/2017 |
| JP | 201826114 A | 2/2018 |
| JP | 2018514872 A | 6/2018 |
| JP | 2019519852 A | 7/2019 |
| WO | 2008153194 A1 | 12/2008 |
| WO | 2016186823 A1 | 11/2016 |
| WO | 2018/103736 A1 | 6/2018 |

OTHER PUBLICATIONS

P. Fogarty, "Minimising the impact of software instrumentation using on-chip debug and a secondary CPU Core," Proceedings of the 2012 System, Software, SoC and Silicon Debug Conference, Vienna, Austria, 2012, pp. 1-5. (Year: 2012).*

Hu Yue-II and Xiong Bing, "Design of an embedded on-chip debug support module of a MCU," Conference on High Density Microsystem Design and Packaging and Component Failure Analysis, 2006. HDP'06., Shanghai, 2006, pp. 5-8, doi: 10.1109/HDP.2006. 1707555. (Year: 2006).*

A. Mayer, H. Siebert and K. D. McDonald-Maier, "Boosting Debugging Support for Complex Systems on Chip," in Computer, vol. 40, No. 4, pp. 76-81, Apr. 2007, doi: 10.1109/MC.2007.118. (Year: 2007).*

Pedro O. Domingos; An Efficient and Scalable Architecture for Neural Networks With Backpropagation Learning; 0-7803-9362 2005 IEEE; Jul. 5, 2005; 6 Pages.

Li et al., "Using Artificial Neural Network for Predicting Thread Partitioning in Speculative Multithreading", IEEE, 2015, pp. 823-826.

Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.

Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Extended European Search Report for Application No. 19215861.6 dated May 15, 2020.

Extended European Search Report for Application No. 19215862.4 dated May 15, 2020.

Sumina Yamashita, et al., "A Method to create illustrate images using DCGAN," JISJ SIG Technical Report, vol. 2017-MPS-112 No. 16, Feb. 27, 2017; translation of abstract included.

Gysel Philipp et al., "Ristretto: A Framework for Empirical Study of Resource-Efficient Inference in Convolutional Neural Networks", IEEE Transactions on Neural Networks and Learning Systems, IEEE, Piscataway, NJ, USA, vol. 29, No. 11, Nov. 1, 2018 (Nov. 1, 2018), pp. 5784-5789, XP011692881, ISSN: 2162-237X, DOI: 10.1109/TNNLS.2018.2808319 [retrieved on Oct. 17, 2018].

Yi Yang et al., "Deploy Large-Scale Deep Neural Networks in Resource Constrained IoT Devices with Local Quantization Region", arxiv.org, Cornell University Library, 201 Olin Library Cornell University Ithaca, NY 14853, May 24, 2018 (May 24, 2018), XP081234517.

European Patent Office, Extended European Search Report for European Application No. 19218382.0 dated Apr. 24, 2020.

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 219].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE. 2018.844167 4 [retrieved on Aug. 20, 2018].

Song Mingcong et al., "In-Situ AI: Towards Autonomous and Incremental Deep Learning for IoT Systems", 2018 IEEE International Symposium on High Performance Computer Architecture (HPCA),IEEE, Feb. 24, 2018 (Feb. 24, 2018), pp. 92-103, XP033341941, DOI: 10.1109/HPCA.2018.00018 [retrieved on Mar. 27, 2018].

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/ MSPEC.2016.7524158 retrieved on [Jul. 27, 2016].

European Patent Office, extended European search report for Application No. 19216754.2 dated May 8, 2020.

Extended European Search Report for EP Application No. 19214324.6 dated Oct. 1, 2020.

Pedro 0. Domingos, et al. "An Efficient and Scalable Architecture for Neural Networks With Backpropagation Learning" Proceedings/ 2005 International Conference on Field Programmable Logic and Applications (FPL): Tampere Hall, Tampere, Finland, Jan. 1, 2005, pp. 89-94, XP055606447, Piscataway, NJ. DOI: 10.1109/FPL.2005. 1515704 ISBN: 978-0-7803-9362-2.

* cited by examiner

ON-CHIP CODE BREAKPOINT DEBUGGING METHOD, ON-CHIP PROCESSOR, AND CHIP BREAKPOINT DEBUGGING SYSTEM

CROSS REFERENCE OF RELATED APPLICATION

The present application is a continuation of International Application No. PCT/CN2019/092805, filed Jun. 24, 2019, which claims the benefits and priorities of Chinese Patent Application No. 201811045822.6 with the title of "On-chip Code Breakpoint Debugging Method, On-chip Processor, and Chip Breakpoint Debugging System" filed on Sep. 7, 2018, Chinese Patent Application No. 201810777693.3 with the title of "Data Processor and Data Processing Method" filed on Jul. 16, 2018, Chinese Patent Application No. 201810782174.6 with the title of "Operation Device and Operation Method" filed on Jul. 17, 2018, and Chinese Patent Application No. 201810680472.4 with the title of "Data Processor and Data Processing Method" filed on Jun. 27, 2018, the entire contents of which are incorporated herein by reference in their entireties.

TECHNICAL FIELD

The present disclosure relates to the field of artificial intelligence technologies, and in particular to an on-chip code breakpoint debugging method, an on-chip processor, and a chip breakpoint debugging system.

BACKGROUND

During a traditional process of chip algorithm debugging, an algorithm result cannot be output in real time. The result of the whole chip algorithm needs to be copied to another platform in order to output the result. In this case, it is impossible to debug in real time while the algorithm testing results are being output, resulting in low debugging efficiency of the chip algorithm.

SUMMARY

In view of this, the present disclosure provides an on-chip code breakpoint debugging method, an on-chip processor, and a chip breakpoint debugging system to solve the problem of low chip breakpoint debugging efficiency.

According to an aspect of the present disclosure, an on-chip code breakpoint debugging method is provided. The method includes:
  the on-chip processor start to execute an on-chip code, where an output function is set at a breakpoint of the on-chip code;
  obtaining, by the on-chip processor, output information of the output function, where the output information is output information of the output function when the execution of the on-chip code reaches the output function; and
  storing, by the on-chip processor, the output information in an off-chip memory.
In a possible implementation manner, the method further includes:
  determining, by the on-chip processor, a breakpoint debugging result of the on-chip code according to the output information in the off-chip memory.
In a possible implementation manner, the output function includes: a print number function or a print string function.

In a possible implementation manner, the output information includes preset number information or string information, or output information of functions other than the output function in the on-chip code.

In a possible implementation manner, the step of obtaining, by the on-chip processor, the output information of the output function includes:
  obtaining, by the on-chip processor, the output information of the output function in a RAM of a SOC (system on chip).
In a possible implementation manner, the method further includes:
  outputting, by the on-chip processor, the output information in the off-chip memory.
In a possible implementation manner, the method further includes:
  outputting, by the on-chip processor, the output information in the off-chip memory by using a driver.
In a possible implementation, the step of outputting, by the on-chip processor, the output information in the off-chip memory includes:
  when the output information in the off-chip memory is updated, outputting, by the on-chip processor, updated output information.
In a possible implementation, the step of when the output information in the off-chip memory is updated, outputting, by the on-chip processor, the updated output information includes:
  querying, by the on-chip processor, the output information in the off-chip memory by using a first thread;
  when the on-chip processor finds that the output information is updated, updating, by the first thread, a status identifier of the off-chip memory;
  querying, by the on-chip processor, the status identifier of the off-chip memory by using a second thread; and
  when the on-chip processor finds that the status identifier is updated, outputting, by the second thread, the updated output information in the off-chip memory.
In a possible implementation manner, the step of querying, by the on-chip processor, the output information in the off-chip memory by using the first thread includes:
  starting, by the on-chip processor, the first thread to query the output information in the off-chip memory by using a driver.
The step of querying, by the on-chip processor, the status identifier of the off-chip memory by using the second thread includes:
  starting, by the on-chip processor, the second thread to query the status identifier of the off-chip memory by using a HOST program.
In a possible implementation manner, the status identifier of the off-chip memory includes: a read identifier or an unread identifier.
In a possible implementation manner, the step of outputting, by the on-chip processor, the output information in the off-chip memory includes:
  triggering, by the off-chip memory, an interrupt function to enter a hardware interrupt status according to the received output information;
  querying, by the on-chip processor, a hardware status of the off-chip memory using a third thread, where the hardware status includes a hardware interrupt status or a hardware non-interrupt status; and
  when the on-chip processor finds that the status of the off-chip memory is the hardware interrupt status, outputting, by the third thread, the output information in the off-chip memory.

According to an aspect of the present disclosure, an on-chip processor is provided. The on-chip processor includes:
- a starting module configured to start to execute an on-chip code, where an output function is set at a breakpoint of the on-chip code;
- an output information obtaining module configured to obtain output information of the output function, where the output information is output information of the output function when the on-chip code is executed to the output function; and
- a storage module configured to store the output information in an off-chip memory.

In a possible implementation manner, the on-chip processor further includes:
- a breakpoint debugging result determining module configured to determine a breakpoint debugging result of the on-chip code according to the output information in the off-chip memory.

In a possible implementation manner, the output function includes: a print number function or a print string function.

In a possible implementation manner, the output information includes preset number information or string information, or output information of functions other than the output function in the on-chip code.

In a possible implementation manner, the output information obtaining module is further configured to:
the output information obtaining module obtains the output information of the output function from a RAM of a SOC.

In a possible implementation manner, the on-chip processor further includes:
an outputting module configured to output the output information in the off-chip memory.

In a possible implementation manner, the output module includes:
a first outputting sub-module configured to output the output information in the off-chip memory by using a driver.

In a possible implementation manner, the outputting module includes:
a second outputting sub-module configured to output updated output information when the output information in the off-chip memory is updated.

In a possible implementation manner, the second outputting sub-module is configured to: query the output information in the off-chip memory by using a first thread.

When the second outputting sub-module finds that the output information is updated, the first thread updates a status identifier of the off-chip memory.

The second outputting sub-module is configured to query the status identifier of the off-chip memory by using a second thread.

When the second outputting sub-module finds that the status identifier is updated, the second thread outputs the updated output information in the off-chip memory.

In a possible implementation manner, a process of querying the output information in the off-chip memory by using the first thread includes:
starting the first thread to query the output information in the off-chip memory by using a driver.

A process of querying the status identifier of the off-chip memory by using the second thread includes:
starting the second thread to query the status identifier of the off-chip memory by using a HOST program.

In a possible implementation manner, the status identifier of the off-chip memory includes: a read identifier or an unread identifier.

In a possible implementation manner, the outputting module includes:
a third outputting sub-module configured to query a hardware status of the off-chip memory by using a third thread, where the hardware status includes a hardware interrupt status or a hardware non-interrupt status. The hardware interrupt status of the off-chip memory is a hardware interrupt status that the off-chip memory enters after triggering an interrupt function according to the received output information. When the third outputting sub-module finds that the status of the off-chip memory is the hardware interrupt status, the third thread outputs the output information in the off-chip memory.

According to an aspect of the present disclosure, a chip breakpoint debugging system is provided. The system includes: a breakpoint debugging chip and an off-chip memory.

The breakpoint debugging chip includes the above-mentioned on-chip processor, and is configured to perform on-chip breakpoint debugging.

The off-chip memory is configured to store output information of the breakpoint debugging chip.

In an embodiment of the present disclosure, an output function may be set at a breakpoint of the on-chip code. When the on-chip processor starts to execute the on-chip code and executes to the output function, the on-chip processor obtains output information of the output function, and stores the output information in the off-chip memory. According to the output information of the output function stored in the off-chip memory, the on-chip processor can obtain the execution status of each breakpoint of the on-chip code in real time, which may help to realize the purpose of placing a plurality of breakpoints in the on-chip code at the same time for debugging, and improve the debugging efficiency of the on-chip code.

In addition, the present disclosure proposes a data processor, a chip, an electronic equipment, and a processing method that can reduce the power consumption of the equipment and cost while meeting the computation requirements of a network model.

According to an aspect of the present disclosure, a data processor is provided. The processor includes:
- a storage module configured to store received network model data, where the network model data includes a computational operator and computational data for performing a computational operation of the network model;
- a task allocation module configured to use a preset algorithm to assign a first identifier or a second identifier to each computational operator, where the computational difficulty of a computational operator of the first identifier is greater than that of a computational operator of the second identifier; and
- an operation module including at least one large core operation unit and at least one small core operation unit. The operation module is configured to use the large core operation unit to execute the computational operator of the first identifier based on the computational data, and use the small core operation unit to execute the computational operator of the second identifier based on the computational data.

In an embodiment of the present disclosure, the task allocation module is further configured to allocate the first identifier or the second identifier to each computational operator according to the operation time of each computational operator when the computational operator operates on the large core operation unit and the small core operation unit respectively; and/or the network model includes a neural network model.

In an embodiment of the present disclosure, the task allocation module is further configured to create a directed graph based on logical relationships between the computational operators, and nodes of the directed graph correspond to the computational operators.

The task allocation module is further configured to respectively obtain a first operation time which is the time the large core operation unit takes for executing each computational operator and a second operation time which is the time the small core operation unit takes for executing each computational operator, use the first operation time as a delay time of each node, and use a critical path algorithm to determine a first critical path, where a computational operator corresponding to each node on the first critical path is assigned a first identifier.

In an embodiment of the present disclosure, a storage allocation module is further included. The storage allocation module is configured to allocate a storage address for each network model data based on free storage space in the storage module, and when the free storage space of the storage module is insufficient, choose either to release the network model data or cache the network model data.

In an embodiment of the present disclosure, a direct memory access module is further included. The direct memory access module is respectively connected to the storage allocation module and the storage module, and is configured to transfer the network model data to the storage module for storage, and transfer operation results of the operation module to the memory.

In an embodiment of the present disclosure, the network model data further includes priority information, where the priority information includes user priority and/or data timeliness. The data processor further includes:
  a caching module configured to cache each computational operator and a corresponding first identifier or second identifier of the computational operator; and
  a scheduling module configured to control the operation module to execute a computational operator with a highest priority in the caching module according to the priority information in the network model data.

In an embodiment of the present disclosure, the operation module includes a plurality of large core operation units and/or a plurality of small core operation units. The plurality of large core operation units or the plurality of small core operation units are constructed to include: a primary operation unit, at least one branch operation unit, and a plurality of secondary operation units. The primary operation unit is connected to each of the branch operation units, and each branch operation unit is connected to at least one secondary operation unit.

The primary operation unit is configured to divide a received computational operator into a plurality of computational instructions and divide computational data into a plurality of data blocks, and transfer the computational instructions and the data blocks to the corresponding secondary operation units using the branch operation unit to perform operations to obtain intermediate results, and obtain a final operation result based on the intermediate result.

The branch operation unit is configured to transfer data blocks, computational instructions, and intermediate results between the primary operation unit and the secondary operation units.

Each of the secondary operation units is configured to perform an operation on a received data block according to a received computational instruction to obtain an intermediate result, and transfer the intermediate result to the branch operation unit.

The operation module includes a plurality of large core operation units and/or a plurality of small core operation units. The plurality of large core operation units or the plurality of small core operation units are constructed to include: a primary operation unit and a plurality of secondary operation units.

The plurality of secondary operation units are constructed as m rows and n columns of secondary operation units.

The primary operation unit is connected to K secondary operation units of the plurality of secondary operation units. The K secondary operation units include: n secondary operation units in a first row, n secondary operation units in an $m^{th}$ row, and m secondary operation units in a first column, where m and n are positive integers greater than 1, and K is a positive integer.

The primary operation unit is configured to divide a received computational operator into a plurality of computational instructions and divide the computational data into a plurality of data blocks, and transfer at least one of the plurality of data blocks and at least one of the plurality of computational instructions to the K secondary operation units to obtain intermediate results, and obtain a final operation result based on the intermediate results.

In an embodiment of the present disclosure, each of the K secondary operation units is configured to transfer data blocks, computational instructions, and intermediate results between the primary operation unit and the remaining secondary operation units.

Each of the remaining secondary operation units is configured to perform an operation on the received data block according to the computational instruction to obtain an intermediate result, and transfer the operation result to a correspondingly connected secondary operation unit of the K secondary operation units.

In an embodiment of the present disclosure, the operation module includes a plurality of large core operation units and/or a plurality of small core operation units. The plurality of large core operation units or the plurality of small core operation units are constructed to include: a primary operation unit, a plurality of secondary operation units, and a tree module connected between the primary operation unit and the secondary operation units.

The tree module includes: a root port and a plurality of branch ports. The root port of the tree module is connected to the primary operation unit, and each of the plurality of branch ports of the tree module is connected to a secondary operation unit of the plurality of secondary operation units.

According to an aspect of the present disclosure, a data processing chip is provided, which includes the data processor as described in the foregoing embodiment.

According to an aspect of the present disclosure, an electronic equipment is provided, which includes the data processing chip as described in the foregoing embodiment.

According to an aspect of the present disclosure, a data processing method is provided. The data processing method can be applied to a data processor and includes:
  receiving and storing network model data, where the network model data includes a computational operator and computational data for performing a computational operation of the network model;
  using a preset algorithm to assign a first identifier or a second identifier to each computational operator, where the computational difficulty of a computational operator of the first identifier is greater than that of a computational operator of the second identifier; and using a large core operation unit to execute the computational operator of the first identifier based on the computational data, and using a small core operation unit to execute the computational operator of the second identifier based on the computational data.

In an embodiment of the present disclosure, the step of using the preset algorithm to assign the first identifier or the second identifier to each computational operator includes:

allocating the first identifier or the second identifier to each computational operator according to the operation time of each computational operator when the computational operator operates on the large core operation unit and the small core operation unit respectively.

In an embodiment of the present disclosure, the step of allocating the identifier to each computational operator according to the operation time of each computational operator when the computational operator operates on the large core operation unit and the small core operation unit respectively includes:

creating a directed graph based on logical relationships between the computational operators, where nodes of the directed graph correspond to the computational operators; respectively obtaining a first operation time which is the time the large core operation unit takes for executing each computational operator and a second operation time which is the time the small core operation unit takes for executing each computational operator; and using the first operation time as a delay time of each node, and using a first critical path algorithm to determine a first critical path, where a computational operator corresponding to each node on the first critical path is assigned a first identifier.

In an embodiment, the step of receiving and storing the network model data includes:

allocating a storage address for each network model data based on the free storage space in the storage module, and when the free storage space of the storage module is insufficient, choosing either to release the network model data or cache the network model data.

In an embodiment of the present disclosure, the network model data further includes priority information, where the priority information includes user priority and/or data timeliness. The method further includes:

caching each computational operator and a corresponding first identifier or second identifier of the computational operator; and controlling the large core operation module or the small core operation module to execute a computational operator with a highest priority in the caching module according to the priority information in the network model data.

In an embodiment of the present disclosure, a plurality of large core operation units and/or a plurality of small core operation units are included. The plurality of large core operation units or the plurality of small core operation units are constructed to include: a primary operation unit, at least one branch operation unit, and a plurality of secondary operation units. The primary operation unit is connected to each of the branch operation units, and each branch operation unit is connected to at least one secondary operation unit.

The step of using the large core operation unit to execute the computational operator of the first identifier based on the computational data, and using the small core operation unit to execute the computational operator of the second identifier based on the computational data may include:

using the primary operation unit to divide a received computational operator into a plurality of computational instructions and divide the computational data into a plurality of data blocks;

using the branch operation unit to transfer the computational instructions and the data blocks to the corresponding secondary operation units; and using the secondary operation units to perform operations on received data blocks according to received computational instructions to obtain intermediate results, and transferring the intermediate results to the primary operation unit through the branch operation unit to obtain a final operation result.

In an embodiment of the present disclosure, a plurality of large core operation units and/or a plurality of small core operation units are included. The plurality of large core operation units or the plurality of small core operation units are constructed to include: a primary operation unit and a plurality of secondary operation units. The plurality of secondary operation units are constructed as m rows and n columns of secondary operation units. The primary operation unit is connected to K secondary operation units of the plurality of secondary operation units. The K secondary operation units include: n secondary operation units in a first row, n secondary operation units in an $m^{th}$ row, and m secondary operation units in a first column, where m and n are positive integers greater than 1, and K is a positive integer.

The step of using the large core operation unit to execute the computational operator of the first identifier based on the computational data, and using the small core operation unit to execute the computational operator of the second identifier based on the computational data may include:

using the primary operation unit to divide a received computational operator into a plurality of computational instructions and divide the computational data into a plurality of data blocks, and transferring at least one of the plurality of data blocks and at least one of the plurality of computational instructions to the K secondary operation units; and using the remaining secondary operation units other than the K secondary operation units to perform operations on the computational instructions and the data blocks received from the K secondary operation units to obtain intermediate results, and transferring the intermediate results to the primary operation unit through the K secondary operation units to obtain a final operation result.

In an embodiment of the present disclosure, a plurality of large core operation units and/or a plurality of small core operation units are included. The plurality of large core operation units or the plurality of small core operation units are constructed to include: a primary operation unit, a plurality of secondary operation units, and a tree module connected between the primary operation unit and the secondary operation units. The tree module includes: a root port and a plurality of branch ports. The root port of the tree module is connected to the primary operation unit, and each of the plurality of branch ports of the tree module is connected to a secondary operation unit of the plurality of secondary operation units.

The step of using the large core operation unit to execute the computational operator of the first identifier based on the computational data, and using the small core operation unit to execute the computational operator of the second identifier based on the computational data may include:

using the primary operation unit to divide a received computational operator into a plurality of computational instructions and divide the computational data into a plurality of data blocks, and transferring the data blocks and the computational instructions to the root port of the tree module; and using the secondary operation units connected to the branch ports of the tree module to perform operations on the received computational instructions and the data blocks to obtain intermediate results, and transferring the intermediate results to the primary operation unit through the tree module to obtain a final operation result.

The embodiments of the present disclosure can assign corresponding identifiers to different computational operators, so that the operation module can use different operation units to perform computational operations based on the identifiers. In this way, the large core operation unit can be used to operate a computational instruction with high difficulty, and the small core operation unit can be used to operate a computational instruction with low difficulty, so that the operation units may be used properly while reducing power consumption and cost.

An embodiment of the present disclosure provides a technical solution that can reduce the cost and reduce bandwidth requirements. The technical solution provides an operation device, a data processing chip, an electronic equipment, and an operation method.

According to an aspect of the present disclosure, an operation device is provided. The operation device includes: a plurality of operation modules configured to execute corresponding computational sub-commands in parallel to complete a computational operation of a network model. Each of the operation module includes:

at least one operation unit configured to execute a first computational sub-command using first computational sub-data; and a storage unit at least configured to store the first computational sub-data, where the first computational sub-data includes data for executing the first computational sub-command.

In an embodiment of the present disclosure, at least two operation modules have a data connection, and one of the operation modules is configured to execute the first computational sub-command by using the first computational sub-data and second computational sub-data of the other operation module. The second computational sub-data includes data stored in a storage unit in the other operation module and/or data generated by an operation unit in the other operation module.

In an embodiment of the present disclosure, a control module is further included. The control module is configured to allocate a corresponding computational sub-command and corresponding computational sub-data to each of the operation modules according to a received computational command and computational data.

The computational command includes a plurality of computational sub-commands, and the computational data includes computational sub-data required for executing each of the computational sub-commands.

In an embodiment of the present disclosure, the control module includes:

a first allocation unit configured to divide the computational command into a plurality of computational sub-commands according to a computational logic relationship in the computational command, and correspondingly allocate the plurality of computational sub-commands to different operation modules for operation; and a second allocation unit configured to determine computational sub-data required for executing each of the computational sub-commands, and allocate the computational sub-data to a corresponding operation module for storage.

In an embodiment of the present disclosure, the control module is further configured to selectively connect operation modules according to a computational logic relationship between the computational sub-commands.

In an embodiment of the present disclosure, the operation unit includes a network processor or a computer equipment.

In an embodiment of the present disclosure, the storage unit includes at least one of a register, a register file, and a memory array.

According to an aspect of the present disclosure, a data processing chip is provided. The data processing chip includes the operation device as described in the foregoing embodiment.

According to an aspect of the present disclosure, an electronic equipment is provided. The electronic equipment includes the data processing chip as described in the foregoing embodiment.

According to an aspect of the present disclosure, an operation method is provided. The method is applied to an operation device. The operation device includes a plurality of operation modules. The plurality of operation modules are configured to execute corresponding computational sub-commands in parallel to complete a computational operation of a network model. The method includes:

storing the first computational sub-data by using the storage unit of each operation module, where the first computational sub-data includes data for executing the first computational sub-command; and using, by the operation unit of each operation module, the first computational sub-data to execute the first computational sub-command.

In an embodiment of the present disclosure, the step of using, by the operation unit of each operation module, the first computational sub-data to execute the first computational sub-command further includes:

executing the first computational sub-command by using the first computational sub-data and the second computational sub-data of the other operation module, where the second computational sub-data includes data stored in a storage unit in the other operation module and/or data generated by an operation unit in the other operation module.

In an embodiment of the present disclosure, the method further includes:

allocating a corresponding computational sub-command and computational sub-data to each operation module according to a received computational command and computational data, where the computational command includes a plurality of computational sub-commands, and the computational data includes computational sub-data required for executing each of the computational sub-commands.

In an embodiment of the present disclosure, the step of allocating the corresponding computational sub-command and the computational sub-data to each operation module according to the received computational command and the computational data includes:

using a first allocation unit to divide the computational command into a plurality of computational sub-commands according to a computational logic relationship in the computational command, and correspondingly allocating the plurality of computational sub-commands to different operation modules for operation; and using a second allocation unit to determine computational sub-data required for executing each of the computational sub-commands, and allocating the computational sub-data to a corresponding operation module for storage.

In an embodiment of the present disclosure, the method further includes:

selectively connecting operation modules according to a computational logic relationship between the computational sub-commands.

In the embodiments of the present disclosure, instead of storing data required by each operation module in a memory, the data required for the operation of each operation module is stored by the storage unit of each operation module. This configuration may reduce the data access bandwidth of each operation module when the operation module accesses the storage unit and increase the data transfer speed. At the same time, since the embodiments of the present disclosure do not need a large storage device and do not need to read and write data of all operation modules, there is no need to set a storage device with large capacity and high data read and write speed, thereby reducing the cost of the storage devices.

In addition, the embodiments of the present disclosure can also improve the scalability of the operation device. A computing function of the operation device can be easily expanded by adding an operation module with a corresponding computing function.

An embodiment of the present disclosure also provides a data processor, a chip, an electronic equipment, and a data processing method that have good applicability and are capable of reducing the cost.

According to an aspect of the present disclosure, a data processor is provided. The processor includes:

a data conversion module configured to convert first data into second data according to a preset data format, where the preset data format includes a preset granularity and a preset endian; and a control module configured to control the data conversion module to convert the first data into the second data when the control module determines that a data format of the first data is different from the preset data format according to a received control signal.

In some embodiments, the data conversion module includes:

a grouping unit configured to convert data into data corresponding to the preset granularity; and an endian conversion unit configured to convert data into data corresponding to the preset endian.

The control module is further configured to, when data granularity of the first data is different from the preset granularity and endian of the first data is different from the preset endian, use the grouping unit to convert the first data into third data based on the preset granularity, and use the endian conversion unit to convert the third data into the second data based on the preset endian; or when the data granularity of the first data is the same as the preset granularity and the endian of the first data is different from the preset endian, the control module is further configured to use the endian conversion unit to convert the first data into the second data based on the preset endian; or when the data granularity of the first data is different from the preset granularity and the endian of the first data is the same as the preset endian, the control module is further configured to use the grouping unit to convert the first data to the second data based on the preset granularity.

In some embodiments, the control module includes:

an endian control unit configured to determine the endian of the first data according to a received control signal, and when the endian of the first data is different from the preset endian, control the data conversion module to perform data conversion on the first data based on the preset endian.

In some embodiments, the grouping unit is further configured to divide the first data into a plurality of byte groups based on a ratio between the data granularity of the first data and the preset granularity. The plurality of byte groups serve as the third data or the second data, where the data granularity of each byte group is the same as the preset granularity.

In some embodiments, the grouping unit is further configured to divide the first data into a plurality of byte groups according to the order from a low address to a high address of an address space of the first data. In addition, a count of the plurality of byte groups is the same as the ratio between the data granularity of the first data and the preset granularity.

In some embodiments, the endian conversion unit is further configured to reverse the endian of each byte group of the first data or the third data, and obtain the second data according to the order of each byte group, where the data granularity of each byte group is the same as the preset granularity.

In some embodiments, the control module is configured to obtain a first address space for storing the first data and a second address space for storing the second data based on the control signal.

The data conversion module is configured to obtain the first data based on the first address space, convert the first data into the second data, and store the second data in the second address space.

In some embodiments, an operation module is further included. The operation module is configured to perform computational processing on the second data according to a preset computational instruction.

The control module is further configured to determine the preset computational instruction based on the control signal, and control the operation module to perform computational processing on the second data based on the preset computational instruction.

In some embodiments, the control module further includes:

a detection unit configured to detect whether the operation module meets a preset condition, and if the operation module meets the preset condition, control the operation module to perform computational processing on the second data.

In some embodiments, the operation module includes a plurality of operation units. The detection unit is further configured to determine that the operation module meets the preset condition when the operation module includes an idle operation unit.

In some embodiments, the detection unit is further configured to detect whether an address space used by the current computational processing performed by the operation module conflicts with an address space of the second data and an address space of the preset computational instruction. If there is no conflict, the detection unit determines that the operation module meets the preset condition.

In some embodiments, the data processor further includes:

a storage module.

The control module is further configured to store the control signal, the first address space of the first data, the granularity information of the first data, and the preset granularity information determined according to the control signal in the storage module.

According to an aspect of the embodiments of the present disclosure, a data processing chip is provided. The chip includes the data processor as described in any one of the embodiments above.

According to an aspect of the embodiments of the present disclosure, an electronic equipment is provided. The equipment includes the data processing chip as described in the foregoing embodiment.

According to an aspect of the embodiments of the present disclosure, a data processing method is provided. The method is applied to a data processor and includes:

receiving a control signal; and according to the received control signal, when the data format of the first data is determined as being different from the preset data format, controlling the data conversion module to convert the first data into the second data.

The data conversion module is configured to convert the first data into the second data according to the preset data format, where the preset data format includes a preset granularity and a preset endian.

In an embodiment of the present disclosure, the data conversion module includes a grouping unit and an endian conversion unit.

The step of controlling the data conversion module to convert the first data into the second data includes:

when the data granularity of the first data is different from the preset granularity, using the grouping unit to convert the first data into the third data based on the preset granularity, and when the endian of the first data is different from the preset endian, using the endian conversion unit to convert the third data into the second data based on the preset endian; or when the data granularity of the first data is the same as the preset granularity and the endian of the first data is different from the preset endian, the control module is further configured to use the endian conversion unit to convert the first data into the second data based on the preset endian; or when the data granularity of the first data is different from the preset granularity and the endian of the first data is the same as the preset endian, the control module is further configured to use the grouping unit to convert the first data to the second data based on the preset granularity.

In an embodiment of present disclosure, the method further includes:

determining the endian of the first data according to a received control signal, and when the endian of the first data is different from the preset endian, controlling the data conversion module to perform data conversion on the first data based on the preset endian.

In an embodiment of present disclosure, the step of using the grouping unit to convert the first data into the second data or the second data based on the preset granularity includes:

using the grouping unit to divide the first data into a plurality of byte groups based on the ratio between the data granularity of the first data and the preset granularity, and using the plurality of byte groups as the third data or the second data, where the data granularity of each byte group is the same as the preset granularity.

In an embodiment of present disclosure, the step of dividing the first data into the plurality of byte groups based on the ratio between the data granularity of the first data and the preset granularity includes:

dividing the first data into the plurality of byte groups according to the order from a low address to a high address of the address space of the first data. In addition, the count of the plurality of byte groups is the same as the ratio between the data granularity of the first data and the preset granularity.

In an embodiment of present disclosure, the step of using the endian conversion unit to convert the third data or the first data into the second data based on the preset endian includes:

using the endian conversion unit to reverse the endian of each byte group of the first data or the third data, and obtaining the second data according to the order of each byte group, where the data granularity of each byte group is the same as the preset granularity.

In an embodiment of present disclosure, the method further includes:

obtaining the first address space for storing the first data and the second address space for storing the second data based on the control signal, where the data conversion module is used to obtain the first data based on the first address space, convert the first data into the second data, and store the second data in the second address space.

In an embodiment of present disclosure, the method further includes:

determining the preset computational instruction based on the control signal; and controlling the operation module to perform computational processing on the second data according to the preset computational instruction.

In an embodiment of present disclosure, the method further includes:

detecting whether the operation module meets the preset condition; and if the operation module meets the preset condition, controlling the operation module to perform computational processing on the second data according to the preset computational instruction.

In an embodiment of present disclosure, the step of detecting whether the operation module meets the preset condition includes:

when the operation module includes an idle operation unit, determining that the operation module meets the preset condition.

In an embodiment of present disclosure, the step of detecting whether the operation module meets the preset condition includes:

detecting whether the address space used by the current computational processing performed by the operation module conflicts with the address space of the second data and the address space of the preset computational instruction, and if there is no conflict, determining that the operation module meets the preset condition.

In the embodiment of the present disclosure, the data conversion module can be set inside the data processor, so that data can be conveniently converted into the required format by the data conversion module without using other conversion devices to convert data, thereby reducing the cost of using other conversion devices. At the same time, with the data conversion module, the data processor can be adapted to a variety of data formats, thus having better applicability.

Exemplary embodiments will be described in detail below with the accompanying drawings to make other features and aspects of the present disclosure clear.

BRIEF DESCRIPTION OF THE DRAWINGS

The drawings are included in the specification and constitute a part of the specification. Together with the specification, the drawings illustrate exemplary embodiments, features, and aspects of the present disclosure, and are used to explain the principles of the present disclosure.

FIG. 1-2 is a flowchart of an on-chip code breakpoint debugging method according to an embodiment of the present disclosure.

FIG. 1-3 is a flowchart of an on-chip code breakpoint debugging method according to an embodiment of the present disclosure.

FIG. 1-4 is a flowchart of an on-chip code breakpoint debugging method according to an embodiment of the present disclosure.

FIG. 1-5 is a flowchart of a step S51 of an on-chip code breakpoint debugging method according to an embodiment of the present disclosure.

FIG. 1-6 is a flowchart of an on-chip code breakpoint debugging method according to an embodiment of the present disclosure.

FIG. 1-7 is a block diagram of an on-chip processor according to an embodiment of the present disclosure.

FIG. 1-8 is a block diagram of a chip breakpoint debugging system according to an embodiment of the present disclosure.

FIG. 2-1 is a block diagram of a data processor according to an embodiment of the present disclosure.

FIG. 2-2 is a diagram showing a computation model of a computational operator of a network model according to an embodiment of the present disclosure.

FIG. 2-3 is a block diagram of a data processor according to an embodiment of the present disclosure.

FIG. 2-4 is a block diagram of a data processor according to an embodiment of the present disclosure.

FIG. 2-5 is a flowchart of a data processing method according to an embodiment of the present disclosure.

FIG. 2-6 is a block diagram of an electronic equipment according to an embodiment of the present disclosure.

FIG. 2-7 is a block diagram of operation units structured into an H shape according to an embodiment of the present disclosure.

FIG. 2-8 is a block diagram of operation units structured into a systolic array machine shape according to an embodiment of the present disclosure.

FIG. 2-9 is a block diagram of operation units structured into a tree shape according to an embodiment of the present disclosure.

FIG. 2-10 is a block diagram of operation units structured into a binary tree shape according to an embodiment of the present disclosure.

FIG. 3-1 is a block diagram of an operation device according to an embodiment of the present disclosure.

FIG. 3-2 is a block diagram of an operation device according to an embodiment of the present disclosure.

FIG. 3-3 is a block diagram of a control module according to an embodiment of the present disclosure.

FIG. 3-4 is a flowchart of an operation method according to an embodiment of the present disclosure.

FIG. 3-5 is a block diagram of an operation module structured into an H shape according to an embodiment of the present disclosure.

FIG. 3-6 is a block diagram of an operation module structured into a systolic array machine shape according to an embodiment of the present disclosure.

FIG. 3-7 is a block diagram of an operation module structured into a tree shape according to an embodiment of the present disclosure.

FIG. 3-8 is a block diagram of an operation unit structured into a binary tree shape according to an embodiment of the present disclosure.

FIG. 4-1 is a block diagram of a data processor according to an embodiment of the present disclosure.

FIG. 4-2 is a block diagram of a data conversion module in a data processor according to an embodiment of the present disclosure.

FIG. 4-3 is a block diagram of a control module in a data processor according to an embodiment of the present disclosure.

FIG. 4-4 is a block diagram of a data processor according to an embodiment of the present disclosure.

FIG. 4-5 is a flowchart of a data processing method according to an embodiment of the present disclosure.

FIG. 4-6 is a structure diagram of a grouping unit according to an embodiment of the present disclosure.

DETAILED DESCRIPTION

Technical solutions in embodiments of the present disclosure will be described clearly and completely hereinafter with reference to the drawings in the embodiments of the present disclosure. Obviously, the embodiments to be described are merely some rather than all examples of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" appear in the claims, the specification, and drawings are used for distinguishing different objects rather than describing a specific order. It should be understood that the terms "including" and "comprising" used in the specification and the claims indicate the presence of a feature, an entity, a step, an operation, an element, and/or a component, but do not exclude the existence or addition of one or more other features, entities, steps, operations, elements, components, and/or collections thereof.

It should also be understood that the terms used in the specification of the present disclosure are merely for the purpose of describing particular embodiments rather than limiting the present disclosure. As being used in the specification and the claims of the disclosure, unless the context clearly indicates otherwise, the singular forms "a", "an", and "the" are intended to include the plural forms. It should also be understood that the term "and/or" used in the specification and the claims refers to any and all possible combinations of one or more of relevant listed items and includes these combinations.

As being used in this specification and the claims, the term "if" can be interpreted as "when", or "once", or "in response to a determination" or "in response to a case where something is detected" depending on the context. Similarly, depending on the context, the phrase "if it is determined that" or "if [a described condition or event] is detected" can be interpreted as "once it is determined that", or "in response to a determination", or "once [a described condition or event] is detected", or "in response to a case where [a described condition or event] is detected".

Figure 1:
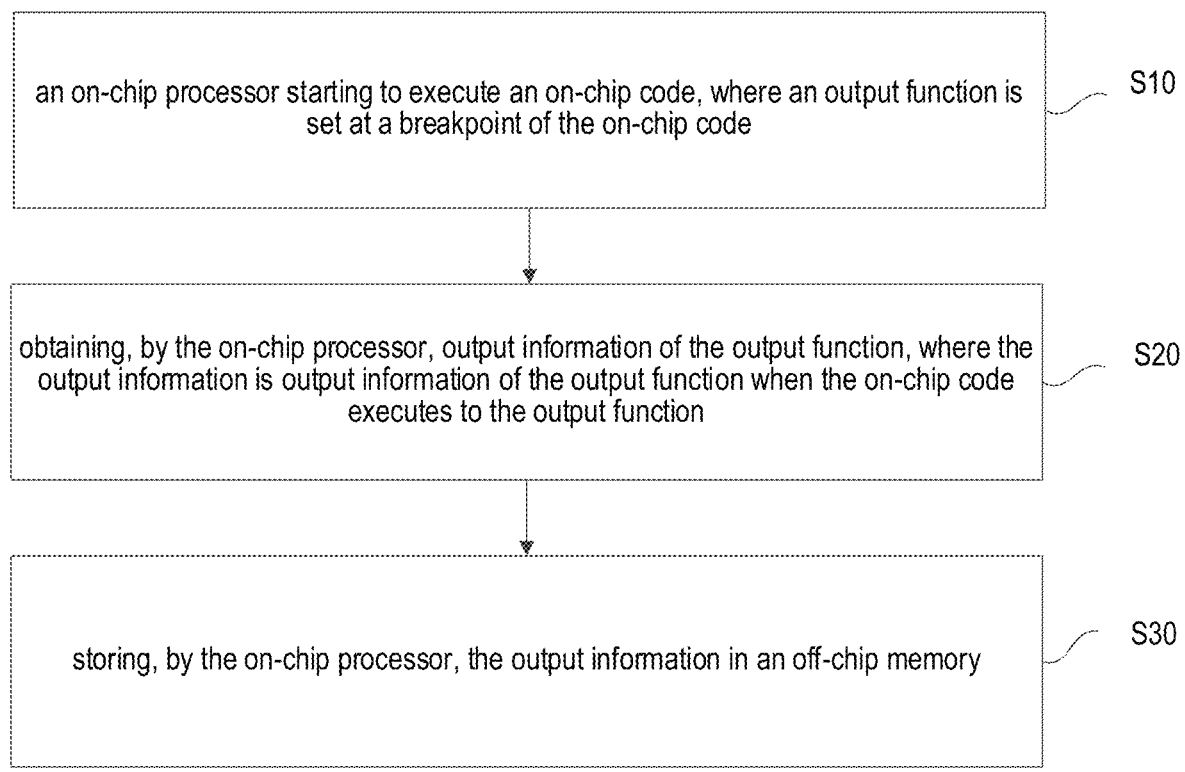
FIG. 1-1 is a flowchart of an on-chip code breakpoint debugging method according to an embodiment of the present disclosure.

FIG. 1-1 is a flowchart of an on-chip code breakpoint debugging method according to an embodiment of the present disclosure. As shown in FIG. 1-1, the on-chip code breakpoint debugging method includes:

step S10, an on-chip processor starting to execute an on-chip code, where an output function is set at a breakpoint of the on-chip code.

In a possible implementation manner, an application program can be written in any language capable of generating machine instructions such as C language and C++ language. The on-chip processor can use the application program to implement the on-chip code breakpoint debugging method in the embodiment of the present disclosure. The application program can be set in a SOC (system on chip). The on-chip processor may execute the application program while executing the on-chip code.

In a possible implementation, the on-chip code is code that can run on the SOC. The SOC may be a hardware system integrated on a single chip or a plurality of chips. The system can run a code to realize a logic function of the code. For example, the on-chip code can include various types of functional functions such as a kernel function. The output function can output information without interrupting the running of the on-chip code. This disclosure does not limit the type and content of the on-chip code. The on-chip processor can start to execute the on-chip code according to a start command.

In a possible implementation manner, the user may place one or a plurality of breakpoints in the on-chip code according to debugging requirements. The user may set an output function at the breakpoint of the on-chip code.

In a possible implementation manner, the output function includes: a print number function or a print string function.

In a possible implementation manner, the output function includes a print number function. The print number function can be configured to print a preset number or can be configured to print an obtained number. For example, the preset number is a binary number "01011". When the print number function is executed, the function prints the binary number "01011".

In a possible implementation manner, the output function may include a print string function. The print string function can be configured to print a preset string, or can be configured to print an obtained string.

In a possible implementation manner, the print number function and print string function may be set in the on-chip code at the same time. The user may also set only one of the print number function and the print string function in the on-chip code. When the on-chip code includes a plurality of the print number functions or a plurality of the print string functions, the plurality of the print number functions or the plurality of the print string functions may be the same or different.

In a possible implementation manner, the step of setting an output function at a breakpoint of the on-chip code includes: setting an output function at each of a plurality of breakpoints of the on-chip code.

In a possible implementation manner, an output function can be set at each breakpoint. The output functions at the plurality of breakpoints may be the same or different.

In a possible implementation manner, when the on-chip code is executed normally, the output function at each breakpoint can be executed normally, and can output information normally. When the on-chip code is executed abnormally, the output function related to the part of the code that is executed abnormally cannot output information normally, or the output function outputs information representing an abnormal execution status.

For example, the on-chip code may include a plurality of sub-codes, which are sub-code 1, sub-code 2, sub-code 3, etc. An output function can be set for each sub-code respectively (for example, the user may set a breakpoint at an end of a sub-code and set an output function at the breakpoint), which are output function 1, output function 2, output function 3, etc. Each output function can be used to output a preset number. The output function 1 is configured to output a number "1", the output function 2 is configured to output a number "2", the output function 3 is configured to output a number "3", etc. During the execution of the on-chip code, it is assumed that parts of the code after and including the sub-code 3 cannot be executed normally, and output functions after and including the output function 3 cannot be executed normally either, then the output functions after and including the output function 3 cannot output information normally. Finally, the output information of the output functions of the on-chip code only contains the number "1" and the number "2".

Each output function can also be configured to output an execution status of a corresponding sub-code. When a sub-code is executed normally, a corresponding output function can output a status value "0". When the execution of a sub-code is abnormal, a corresponding output function may be configured to output a status value "1". In this case, during the execution of the on-chip code, an output function related to an abnormally executed sub-code outputs the status value "1".

The method includes: step S20, obtaining, by the on-chip processor, output information of the output function, where the output information is output by the output function when the output function is executed by the on-chip processor.

In a possible implementation manner, when the on-chip processor executes the on-chip code and reaches the output function, the output function can output the output information to a RAM (random access memory) of the SOC.

In a possible implementation manner, the step of obtaining, by the on-chip processor, the output information of the output function includes: obtaining, by the on-chip processor, the output information of the output function in the RAM of the SOC.

In a possible implementation manner, the on-chip processor can obtain the output information of the output function in the RAM in real time. The on-chip processor can also periodically obtain the output information of the output function in the RAM. The on-chip processor can also obtain the output information of the output function in the RAM according to an obtaining instruction.

In a possible implementation manner, the output information includes preset digital information or string information.

In a possible implementation manner, the output function can output preset digital information or string information. The user may set the same output information for different output functions at different breakpoints, in other words, the user may preset the same digital information or string information. For example, the output information of the output function at each breakpoint is a binary number 1. Alternatively, the user may preset different output information for different output functions at different breakpoints, in other words, the user may preset different digital information or string information. For example, the output information of the first output function is the binary number 1, the output information of the second output function is the binary number 2, and so on.

In a possible implementation manner, the output information includes: output information of functions other than the output function in the on-chip code.

In a possible implementation manner, the output function can output obtained digital information or string information. The output function can obtain the output information of other functions in the on-chip code, and output the output information of the other functions. For example, the on-chip code can be used for neural network operations. When the on-chip code is used to complete the relevant operations of a neural network, a plurality of output functions can be set in the on-chip code to output intermediate results in the neural network operation process. The neural network may include a plurality of convolutional layers. Output data of each convolutional layer is an intermediate result during the operation process of the neural network. The on-chip code can include a plurality of functions corresponding to each convolutional layer. During the execution of the on-chip code, the function corresponding to each convolutional layer can output the output data of each convolutional layer to a preset storage address. The output function can be configured to output the output data of each convolutional layer stored in a preset storage address. For example, the on-chip code may include a convolution operation function 1, a convolution operation function 2, and a convolution operation function 3, which are used for the convolution operation of a first to a third convolution layer respectively. The on-chip code can store an operation result of each convolution operation function to a preset storage address. The on-chip code may include an output function corresponding to each convolution operation function. The output function can output the output data of each convolution operation function stored in a preset storage address.

The method includes: step S30, storing, by the on-chip processor, the output information in an off-chip memory.

In a possible implementation manner, the on-chip processor may store the output information of the output function obtained from the RAM of the SOC in the off-chip memory in real time. The off-chip memory may include any off-chip storage device, such as a magnetic disk (non-volatile) and a network storage device.

In a possible implementation manner, the off-chip memory includes a DDR (Double Data Rate) memory.

In a possible implementation manner, the output information stored in the off-chip memory can be used for analyzing the execution of the on-chip code. When the output information in the off-chip memory is the normal output information of each output function in the on-chip code, it can be considered that the execution of the on-chip code is normal, otherwise, it can be considered that the execution of the on-chip code is abnormal.

In a possible implementation manner, the on-chip processor may determine the execution status of each output function according to the output information in the off-chip memory. The on-chip processor may obtain the execution status of the on-chip code according to the execution status of each output function, to place a plurality of breakpoints in the on-chip code at the same time of debugging.

In this embodiment, the output function is set at the breakpoint of the on-chip code. When the on-chip processor starts to execute the on-chip code and reaches the output function, the on-chip processor obtains the output information of the output function and stores the output information in the off-chip memory. According to the output information of the output function stored in the off-chip memory, the on-chip processor can obtain an execution status of the on-chip code at each breakpoint in real time, which may help to realize the purpose of placing a plurality of breakpoints at the same time for debugging in the on-chip code, and improve the debugging efficiency for the on-chip code.

Figures 1, 2:
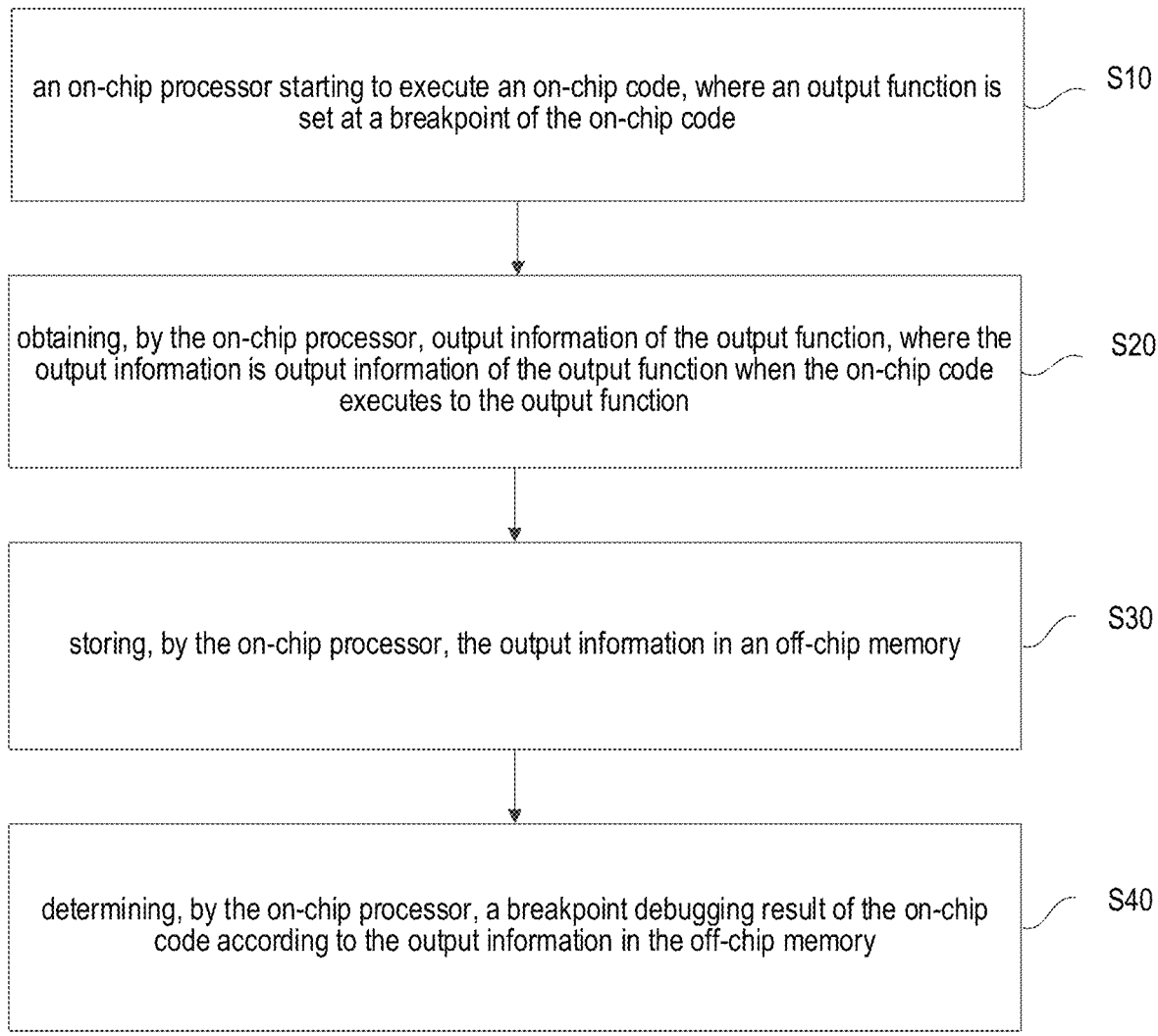

FIG. 1-2 shows a flowchart of an on-chip code breakpoint debugging method according to an embodiment of the present disclosure. As shown in FIG. 1-2, the on-chip code breakpoint debugging method further includes:

step S40, determining, by the on-chip processor, a breakpoint debugging result of the on-chip code according to the output information in the off-chip memory.

In a possible implementation manner, the on-chip processor may determine the execution status of each output function according to the output information in the off-chip memory. The on-chip processor can obtain the breakpoint debugging result of the on-chip code according to the output information of each output function and a mapping relationship between preset output information and the breakpoint debugging result. For example, the on-chip code includes three output functions. When the on-chip code is executed normally, the output information of the three output functions is the preset number "0". The mapping relationship between the preset output information and the breakpoint debugging result may include: when the output information in the off-chip memory is "0, 0, 0", the breakpoint debugging result of the on-chip code is "normal"; when the output information in the off-chip memory is "0, 0, 1", the breakpoint debugging result of the on-chip code is "abnormal execution at the third breakpoint", and the like. The mapping relationship between output information and the breakpoint debugging result may be determined according to the content of the on-chip code and the output functions.

In this embodiment, the on-chip processor may determine the breakpoint debugging result of the on-chip code according to the output information in the off-chip memory. Since the breakpoint debugging result is output by the on-chip processor directly to an off-chip memory without interrupting the execution of the on-chip code, the debugging efficiency of the on-chip code is improved.

Figures 1, 2, 3:
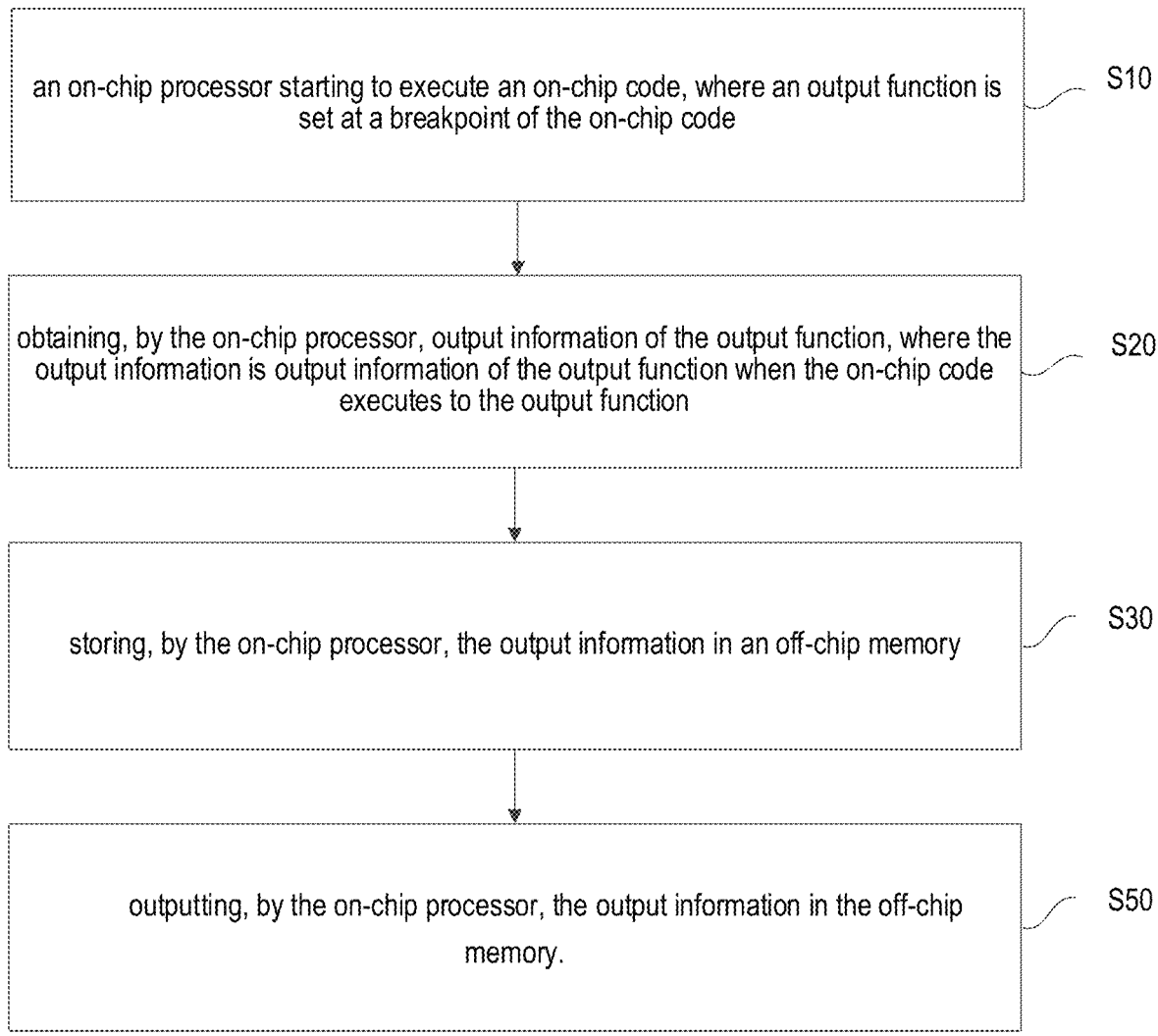

FIG. 1-3 shows a flowchart of an on-chip code breakpoint debugging method according to an embodiment of the present disclosure. As shown in FIG. 1-3, the on-chip code breakpoint debugging method further includes:

step S50, outputting, by the on-chip processor, the output information in the off-chip memory.

In a possible implementation manner, the on-chip processor may use a driver to output the output information in the off-chip memory. The on-chip processor can display the debugging result of the on-chip code by outputting the output information in the off-chip memory, so as to facilitate the debugger to monitor the debugging process.

In a possible implementation manner, the output information in the off-chip memory may be output by displaying the information on a screen. Other manners such as printing may be used to output the output information in the off-chip memory. The present disclosure does not limit the output manner of the output information in the off-chip memory.

In a possible implementation manner, the output information in the off-chip memory may be output in real time. When the debugger determines that the on-chip code execution is abnormal according to the output information, the debugger may terminate the on-chip code execution for debugging, so that the debugging efficiency of the on-chip code may be improved.

In this embodiment, the output information of the off-chip memory may be output. The debugger can monitor the execution status of the on-chip code in real time according to the output information, thereby improving the debugging efficiency of the on-chip code.

FIG. 1-4 shows a flowchart of an on-chip code breakpoint debugging method according to an embodiment of the present disclosure. As shown in FIG. 1-4, the step S50 of the on-chip code breakpoint debugging method includes:

step S51, when the output information in the off-chip memory is updated, outputting, by the on-chip processor, updated output information.

In a possible implementation manner, the on-chip code may include a plurality of output functions. The output information in the off-chip memory can be the output information of the plurality of output functions. When the output information in the off-chip memory is updated, in other words, when there is new output information of the output function in the off-chip memory, the updated output information can be output.

In this embodiment, by outputting the output information when it is updated, the output efficiency of the output information may be improved.

FIG. 1-5 shows a flowchart of the step S51 of the on-chip code breakpoint debugging method according to an embodiment of the present disclosure. As shown in FIG. 1-5, the step S51 of the on-chip code breakpoint debugging method includes:

step S511, querying, by the on-chip processor, the output information in the off-chip memory using a first thread.

In a possible implementation manner, the on-chip processor may start the first thread to query whether the output information in the off-chip memory is updated, e.g., whether the on-chip processor has output new debugging information. The on-chip processor may use a driver to start the first thread to query the output information in the off-chip memory.

In a possible implementation manner, the on-chip processor may use the first thread to periodically query the output information in the off-chip memory according to a first query period.

The step S51 includes: step S512, when the on-chip processor finds the output information is updated, updating, by the first thread, a status identifier.

In a possible implementation manner, a status identifier can be set for the off-chip memory. The status identifier can include a number or a character. The status identifier of the off-chip memory can include a read or an unread identifier. For example, a number "0" can be used to indicate "read", and a number "1" can be used to indicate "unread".

In a possible implementation manner, when the first thread finds that the output information in the off-chip memory is updated, the first thread may update the status identifier of the off-chip memory. The first thread may update the status identifier of the off-chip memory from the "read identifier" to the "unread identifier".

The step S51 includes: step S513, querying, by the on-chip processor, the status identifier of the off-chip memory by using a second thread.

In a possible implementation manner, the on-chip processor may use a HOST program to start the second thread to query the status identifier of the off-chip memory. The on-chip processor may use the second thread to query the status identifier of the off-chip memory according to a second query period. The length of the first query period and the second query period can be determined according to requirements.

The step S51 includes: step S514, when the on-chip processor finds that the status identifier is updated, outputting, by the second thread, the updated output information in the off-chip memory.

In a possible implementation manner, when the second thread finds that the status identifier of the off-chip memory is updated, for example, when the second thread finds that the status identifier of the off-chip memory is updated from the "read identifier" to the "unread identifier", the second thread can output the updated output information in the off-chip memory.

In a possible implementation manner, after the second thread outputs the updated output information in the off-chip memory, the second thread can update the status identifier of the off-chip memory from the "unread identifier" to the "read identifier".

In a possible implementation manner, a driver and a HOST program may work collaboratively to output the output information in the off-chip memory timely and efficiently when the output information in the off-chip memory is updated.

FIG. 1-6 shows a flowchart of an on-chip code breakpoint debugging method according to an embodiment of the present disclosure. As shown in FIG. 1-6, the step S50 of the on-chip code breakpoint debugging method includes:

step S52, querying, by the on-chip processor, a hardware status of the off-chip memory by using a third thread, where the hardware status includes a hardware interrupt status or a hardware non-interrupt status. The hardware interrupt status of the off-chip memory is a status that the off-chip memory enters after triggering an interrupt function according to the received output information.

In a possible implementation manner, when the off-chip memory has a hardware interrupt function, an interrupt function can be set in the off-chip memory. When the off-chip memory receives the output information, the off-chip memory can trigger the interrupt function to enter the hardware interrupt status.

In a possible implementation manner, the on-chip processor may use a driver program to start the third thread to query the hardware status of the off-chip memory. The status of the off-chip memory being the interrupt status indicates that there is new output information stored in the off-chip memory. The status of the off-chip memory being the non-interrupt status indicates that there is no new output information stored in the off-chip memory.

The step S50 includes: step S53, when the on-chip processor finds that the status of the off-chip memory is the hardware interrupt status, outputting, by the third thread, the output information in the off-chip memory.

In a possible implementation manner, when the third thread finds that the status of the off-chip memory is the hardware interrupt status, the third thread can output the updated output information in the off-chip memory.

In this embodiment, the output information of the off-chip memory may be output according to the hardware interrupt status of the off-chip memory. The hardware interrupt status of the off-chip memory can timely reflect that the off-chip memory receives the output information, so that the output information in the off-chip memory can be output in time.

FIG. 1-7 is a block diagram of an on-chip processor according to an embodiment of the present disclosure. As shown in FIG. 1-7, the on-chip processor includes:

a starting module 10 configured to start to execute an on-chip code, where an output function is set at a breakpoint of the on-chip code;

an output information obtaining module 20 configured to obtain output information of the output function, where the output information is output by the output function when the output function is executed; and a storage module 30 configured to store the output information in an off-chip memory.

In a possible implementation manner, the on-chip processor further includes:

a breakpoint debugging result determining module configured to determine a breakpoint debugging result of the on-chip code according to the output information in the off-chip memory.

In a possible implementation manner, the output function includes: a print number function or a print string function.

In a possible implementation manner, the output information includes preset number information or string information, or output information of functions other than the output function in the on-chip code.

In a possible implementation manner, the output information obtaining module further includes:

the on-chip processor obtains the output information of the output function from a RAM of a SOC.

In a possible implementation manner, the on-chip processor further includes:

an outputting module configured to output the output information in the off-chip memory.

In a possible implementation manner, the outputting module includes:

a first outputting sub-module configured to output the output information in the off-chip memory by using a driver.

In a possible implementation manner, the outputting module includes:

a second outputting sub-module configured to output updated output information when the output information in the off-chip memory is updated.

In a possible implementation manner, the second outputting sub-module is configured to: query the output information in the off-chip memory by using a first thread;

when the second outputting sub-module finds that the output information is updated, use the first thread to update a status identifier of the off-chip memory;

query the status identifier of the off-chip memory by using a second thread to; and when the second outputting sub-module finds that the status identifier is updated, use the second thread to output the updated output information in the off-chip memory.

In a possible implementation manner, a process of using the first thread to query the output information in the off-chip memory includes:

starting the first thread to query the output information in the off-chip memory by using a driver.

A process of using the second thread to query the status identifier of the off-chip memory includes:

starting the second thread to query the status identifier of the off-chip memory by using a HOST program.

In a possible implementation manner, the status identifier of the off-chip memory includes: a read identifier or an unread identifier.

In a possible implementation manner, the outputting module includes:

a third outputting sub-module configured to query a hardware status of the off-chip memory using a third thread, where the hardware status includes a hardware interrupt status or a hardware non-interrupt status. The hardware interrupt status of the off-chip memory is a hardware interrupt status that the off-chip memory enters after triggering an interrupt function according to the received output information. When the third outputting sub-module finds that the status of the off-chip memory is the hardware interrupt status, the third thread outputs the output information in the off-chip memory.

FIG. 1-8 is a block diagram of a chip breakpoint debugging system according to an embodiment of the present disclosure. As shown in FIG. 1-8, the chip breakpoint debugging system includes: a breakpoint debugging chip 100 and an off-chip memory 200.

The breakpoint debugging chip 100 includes the on-chip processor of any of the embodiments above, and is configured to perform on-chip breakpoint debugging.

The off-chip memory 200 is configured to store output information of the breakpoint debugging chip.

It should be noted that, the foregoing embodiments of method, for the sake of conciseness, are all described as a series of combinations of actions, but those skilled in the art should know that the present disclosure is not limited by the described order of action since the steps may be performed in a different order or simultaneously according to the present disclosure. Secondly, those skilled in the art should also understand that the embodiments described in the specification are all optional, and the actions and modules involved are not necessarily required for this disclosure.

In the embodiments above, the description of each embodiment has its own emphasis. For a part that is not described in detail in one embodiment, reference may be made to related descriptions in other embodiments.

In the several embodiments provided in this disclosure, it should be understood that the disclosed device may be implemented in other ways. For instance, the embodiments above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the examples of the present disclosure.

In addition, the functional units in each embodiment of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer equipment (which may be a personal computer, a server, or a network equipment, etc.) to perform all or part of the steps of the methods described in the examples of the present disclosure. The foregoing memory includes: a USB flash drive, a read-only memory (ROM), a random access memory (RAM), a mobile hard disk, a magnetic disk, or an optical disc, and other media that can store program codes.

A person of ordinary skill in the art may understand that all or part of the steps of the foregoing embodiments of method may be completed by a program instructing related hardware. The program may be stored in a computer-readable memory, and the memory may include a flash disk, a read-only memory (ROM), a random access memory (RAM), a magnetic disk, an optical disk, or the like.

The embodiments of the present disclosure have been described in detail above. Specific examples have been used in the specification to explain the principles and implementation manners of the present disclosure. The descriptions of the above embodiments are only used to facilitate understanding of the methods and core ideas of the present disclosure. Persons of ordinary skill in the art may change the implementation scope and application scope according to the ideas of the present application. In summary, the content of this specification should not be construed as a limitation on the present disclosure.

Aspects of the present disclosure are described according to the flowcharts and/or the block diagrams of the method, the device (system), and the computer program product provided by the present disclosure. It should be understood that each block of the flowcharts and/or block diagrams and combinations of the blocks in the flowcharts and/or block diagrams can be implemented by computer-readable program instructions.

The flowcharts and block diagrams in the drawings show the possible implementation architecture, functions, and operations of the system, the method, and the computer program product according to the plurality of embodiments of the present disclosure. In this regard, each block in the flowcharts or block diagrams may represent a module, a program segment, or a part of an instruction. The module, the program segment, or the part of an instruction contains one or more executable instructions for realizing a specified logic function. In some alternative implementations, a function marked in the block may also occur in a different order from the order indicated in the drawings. For example, depending on a function involved, two consecutive blocks can actually be executed in parallel, or sometimes be executed in reverse order. It should also be noted that each block in the block diagrams and/or flowcharts, and the combination of the blocks in the block diagrams and/or flowcharts, can be implemented by a dedicated hardware-based system that performs a specified function or action, or can be realized by a combination of dedicated hardware and a computer instruction.

The embodiments of the present disclosure have been described above. The description above is exemplary rather than exhaustive, and is not limited to the disclosed embodiments. Without departing from the scope and spirit of the described embodiments, many modifications and changes are obvious to those of ordinary skill in the art. The choice of terms used herein is intended to best explain the principles, implementations, or improvements on the current technology in the market of the embodiments, or to enable other ordinary skilled in the art to understand the embodiments disclosed herein.

In addition, with the performance improvement of computer hardware in recent years, deep learning algorithms have been widely used in more and more fields. Deep learning algorithms (such as neural network algorithms) are the best-performing algorithms known in the fields of image classification, speech recognition, machine translation, and the like. But no matter what kind of equipment runs the neural network algorithm, a huge amount of computation is always required, and the consequent problems of high energy consumption and low energy efficiency ratio are very serious. The problem of energy consumption is particularly prominent when it comes to mobile equipment, which is due to the fact that mobile equipment is powered by batteries and thus the power consumption of the equipment is strictly limited. This makes it too expensive to run deep learning algorithms on mobile terminals.

In view of this, the present disclosure provides a data processor, a chip, an electronic equipment, and a processing method that can reduce the power consumption of the equipment and the cost while meeting the computation requirements of a network model. The present disclosure relates to the field of data processing, and in particular to a data processor, a chip, an electronic equipment, and a data processing method.

Technical solutions in embodiments of the present disclosure will be described clearly and completely hereinafter with reference to the drawings in the embodiments of the present disclosure. Obviously, the embodiments to be described are merely some rather than all examples of the present disclosure. All other embodiments obtained by those of ordinary skill in the art based on the embodiments of the present disclosure without creative efforts shall fall within the protection scope of the present disclosure.

FIG. 2-1 is a block diagram of a data processor according to an embodiment of the present disclosure. The data processor in the embodiment of the present disclosure is configured to perform operations on a network model corresponding to a deep learning algorithm. As shown in FIG. 2-1, the data processor in the embodiment of the present disclosure includes: a storage module 100, a task allocation module 200, and an operation module 300.

The storage module 100 is configured to store received network model data, where the network model data includes a computational operator and computational data for performing a computational operation of the network model. The storage module 100 in the embodiment of the present disclosure may be a memory independent of other electronic devices, or may be an internal storing unit located in other electronic devices. For example, the storage module may be a storing unit inside a control module, or may be independent of the control module. As long as the memory or storing unit is capable of storing network module data, the memory or storing unit can serve as the storage module of the embodiment of the present disclosure. The storage module in the embodiment of the present disclosure can receive an instruction for controlling an address space for storing the network model data, and can store the network model data in the address space according to the instruction, so as to facilitate related data reading of other devices according to the address space.

In addition, in the embodiment of the present disclosure, the network model data may include a computational operator for performing network model computational operations and the computational data required for performing the operations. The computational operator may include a plurality of computational instructions. Each computational operator may be associated with one set or a plurality of sets of input/output data. FIG. 2-2 is a diagram showing a computation model of a computational operator of a network model according to an embodiment of the present disclosure. The computation model diagram shown in the figure is merely an example showing a logical relationship between computational operators in the computational operation of the network model. For the computational operations of other embodiments, the computation model diagram may differ. As shown in FIG. 2-2, computational operators f1 and f2 may be included. In other embodiments, a plurality of computational operators may be included. A computation graph model formed by the respective computational operators can be a directed acyclic graph. Each computational operator can be a node that performs computation in the computation graph model, and each computational operator is associated with one set or a plurality of sets of input/output data. For example, output data of the computational operator f1 can be input data of the other computational operator f2. In this case, f1 and f2 have a data dependency, or f2 depends on f1. And information of the operator node (information of the computational operator) may include a type of the operator, dimension information of input and output data of the operator, dimension information of internal data of the operator, and the like. Related operations of the computational operators can be performed according to the above-mentioned information. Each computational operator may include one or a plurality of computational instructions for performing computational operations. In addition, the computational data may include initial data for performing network model operations, and may also include intermediate data generated during operations. For example, the network model of the embodiment of the present disclosure may include a neural network model. The neural network model includes two parts: a neural network structure and neural network computational data. The neural network structure is a description of the model structure of the neural network, which may include information of a computational operator in the network, information of the computational data, and information of a connection manner between the computational operator and the computational data. The computational data of the neural network may include data input by the user (data actually used for computation), internal data of the operator (also data actually used for computation, such as a convolution kernel of a convolution operator, a weight of a fully connected operator), and the like.

In addition, the task allocation module 200 may be configured to use a preset algorithm to assign a first identifier or a second identifier to each computational operator, where the computational difficulty of a computational operator of the first identifier is greater than that of a computational operator of the second identifier. In the embodiment of the present disclosure, the computational operator may be assigned the first identifier or the second identifier according to the computational difficulty of the computational operator. The difficulty of operation in the embodiment of the present disclosure may be related to a count, a type, operation time, and other parameters of the computational instruction in the computational operator. The first identifier and the second identifier may be distinguished by two different identifier values. The identifier values may be specific characters or combinations of characters, which are not limited in the embodiment of the present disclosure. In addition, the computational difficulty of a computational operator corresponding to the first identifier is greater than the computational difficulty of a computational operator corresponding to the second identifier.

The operation module 300 may include at least one large core operation unit and at least one small core operation unit. In the embodiment of the present disclosure, the operation module 300 may include a large core group 301 and a small core group 302. The large core group 301 may include one or a plurality of large core operation units, and the small core group may include one or a plurality of small core operation units. The operation module 300 may use a large core operation unit to execute a computational operator of the first identifier based on the computational data, and use a small core operation unit to execute a computational operator of the second identifier based on the computational data.

The large core operation units in the large core group 301 are network processor cores with strong computing power and high power consumption, and the small core operation units in the small core group 302 are a group of network processor cores with slightly weaker computing power and low power consumption. The large core group and the small core group together form an operation core of the operation module 300 in the embodiment of the present disclosure. In the embodiment of the present disclosure, differences between a large core operation unit and a small core operation unit may include the following: the large core operation unit includes more operation components and has strong computing power but relatively large computing power consumption and startup power consumption; the small core operation unit includes fewer operation components and has relatively weaker computing power but relatively small computing power consumption and startup power consumption. Counts of operation units in the large core group 301 and the small core group 302 may be different. The count of operation units in the small core group 302 may be smaller than the count of operation units in the large core group 301. In addition, the large core operation units in the large core group 301 and the small core operation units in the small core group 302 in the embodiment of the present disclosure can run in parallel at the same time, which can be realized by corresponding scheduling and control.

In the embodiment of the present disclosure, the operation units in the large core group 301 and the small core group 302 may be constructed in one of the following structures: an H-shaped structure, a systolic array machine structure, and a tree structure. The structures of the respective operation units in the large core group 301 and the small core group 302 may be the same or different, which can be set by those skilled in the art according to requirements and is not limited by the present disclosure. The structures of the operation units in the large core group and the small core group will be described below.

FIG. 2-7 is a block diagram of operation units structured into an H shape according to an embodiment of the present disclosure. As shown in FIG. 2-7, when the operation units in the large core group 301 or the small-core group 302 are structured into the H shape, the operation units in the large core group and the small core group may include a primary operation unit 3001 and at least one branch operation unit 3002, and a plurality of secondary operation units 3003. The primary operation unit 3001 may be connected to each branch operation unit 3002. Each branch operation unit 3002 is respectively connected to at least one secondary operation unit 3003, and each secondary operation unit 3003 may only be connected to one branch operation unit 3002. As shown in FIG. 2-7, four branch operation units 3002 are included. Each branch operation unit 3002 is connected to four secondary operation units 3003, and can be used to transfer data, instructions, and intermediate results between the primary operation unit 3001 and the secondary operation units 3003.

In the embodiment of the present disclosure, a fully connected operation of a neural network operation is taken as an example. A process may be: y=f(wx+b), where x denotes an input neuron matrix, w denotes a weight matrix, and b denotes a bias scalar, f denotes an activation function which may be any one of the following: a sigmoid function, or any of tanh, relu, and softmax functions. It is assumed that the operation units are structured into a binary tree shape. The structure includes 8 secondary operation units 3003, then an implementation method may be:

the task allocation module 200 obtains network model data from the storage module 100, where, for example, the data may include an input neuron matrix x, a weight matrix w, and a fully connected computational instruction (a computational operator); the task allocation module 200 may assign the first identifier or the second identifier to each computational operator, and transfer the computational operator and the computational data corresponding to an assigned identifier to the operation module 300.

When the large core group 301 and the small core group 302 corresponding to the operation module 300 perform corresponding computational operations according to the identifiers, the primary operation unit 3001 is configured to divide a received computational operator into a plurality of computational instructions and divide computational data into a plurality of data blocks, transfer the computational instructions and the data blocks to the corresponding secondary operation unit 3003 through the branch operation unit 3002 to obtain intermediate results, and obtain a final operation result based on the intermediate results. The branch operation unit is configured to forward data blocks, computational instructions, and weights, and other information between the primary operation unit and the secondary operation unit. For example, an input neuron matrix x can be split into 8 sub-matrices, and then the 8 sub-matrices are allocated to 8 secondary operation units 3003 through the branch operation unit 3002, and a weight matrix w is broadcast to the 8 secondary operation units 3003.

The secondary operation units 3003 can generate corresponding intermediate results after completing the corresponding computational instructions, and then can transfer the intermediate results back to the primary operation unit 3001 through the branch operation unit 3002. In other words, each secondary operation unit can execute the multiplication and accumulation of 8 sub-matrices and the weight matrix w in parallel to obtain 8 intermediate results, and transfer the 8 intermediate results to the primary operation unit 3001.

The primary operation unit 3001 can further compute and process the obtained intermediate results to obtain the final operation result. For example, the primary operation unit can sort the 8 intermediate results, then compute and process the results to obtain a corresponding operation result, perform a bias b operation and then an activation operation to obtain a final result y, and transfer the final result y to the storage module 100 for storage or to other electronic devices for subsequent processing. In other words, the final result y can be output or be stored in the storage module 100.

In addition, FIG. 2-8 is a block diagram of operation units structured into a systolic array machine shape according to an embodiment of the present disclosure. When the operation units in the large core group 301 or the small-core group 302 are structured into the systolic array machine shape, the operation units in the large core group and the small core group may include a primary operation unit 3001 and a plurality of secondary operation units 3003. The plurality of secondary operation units 3003 are arranged as an array, and the plurality of secondary operation units are constructed as m rows and n columns of secondary operation units, where m and n are positive integers greater than 1, and K is a positive integer. Each secondary operation unit 3003 is connected to other adjacent secondary operation units 3003, and the primary operation unit 3001 is connected to K secondary operation units 3003 of the plurality of secondary operation units 3003. The K secondary operation units 3003 are: n secondary operation units 3003 in a first row, n secondary operation units 3003 in an $m^{th}$ row, and m secondary operation units 3003 in a first column. It should be noted that the K secondary operation units 3003 shown in FIG. 2-8 only include the n secondary operation units 3003 in the first row, the n secondary operation units 3003 in the $m^{th}$ row, and the m secondary operation units 3003 in the first column. In other words, the K secondary operation units 3003 are secondary operation units 3003 that are directly connected to the primary operation unit 3001 among the plurality of secondary operation unit 3003. The K secondary operation units 3003 can be configured to forward data and instructions between the primary operation unit 3001 and the plurality of secondary operation units 3003. The K secondary operation units are configured to convert data of the primary operation unit and the remaining secondary operation units.

The remaining secondary operation units except the K secondary operation units are configured to perform operations on received data blocks according to the computational instruction to obtain intermediate results, and transfer the operation results to the K secondary operation units.

The primary operation unit 3001 can transfer assigned computational operators to the K secondary operation units 3003 to perform operations, and can be connected to the remaining secondary operation units 3003 so as to obtain intermediate results through the remaining secondary operation units 3003. The primary operation unit 3001 can process the intermediate results transferred by the plurality of remaining secondary operation units 3003 to obtain a final operation result, and send the operation result to the storage module 100 for storage.

In addition, FIG. 2-9 is a block diagram of operation units structured into a tree shape according to an embodiment of the present disclosure. When the operation units in the large core group 301 or the small core group 302 are structured into the tree shape, the operation units in the large core group and the small core group may include a primary operation unit 3001 and a plurality of secondary operation units 3003, and a tree module 3004 connected between the primary operation unit 3001 and the secondary operation units. The tree module 3004 includes a root port 1 and a plurality of branch ports 2. The root port of the tree module is connected to the primary operation unit 3001, and each of the plurality of branch ports of the tree module is connected to a secondary operation unit of the plurality of secondary operation units. The tree module has receiving and transferring functions. FIG. 2-9 shows the transferring function of the tree module. In other embodiments, the tree module may also have the receiving function, which is not limited herein. The tree module 3004 can be configured to forward data blocks, weights, and computational instructions between the primary operation unit and the plurality of secondary operation units. The primary operation unit 3004 can divide a received computational operator into a plurality of computational instructions and divide computational data into a plurality of data blocks, and transfer the computational instructions and the data blocks to the tree module 3004. The tree module 3004 then transfers the data, computational instructions, and weights to corresponding secondary operation units 3003, receives intermediate results from the secondary operation units 3003, and transfers the intermediate results to the primary operation unit 3001. Then, the primary operation unit 3001 processes the intermediate results to obtain a final operation result, and sends the operation result to the storage module 100 for storage.

In the embodiment of the present disclosure, the tree module may include at least one layer of nodes. The nodes are structured into a line with a forwarding function. The nodes may not have a computing function. If the tree module has zero layer of nodes, the tree module is not required.

In the embodiment of the present disclosure, the tree module may be structured into an n-ary tree shape. For example, the tree module may be structured into a binary tree shape as shown in FIG. 2-10, or may be structured into a ternary tree shape, where n may be an integer greater than or equal to 2. The embodiment of the present disclosure does not limit a specific value of n. The count of layers may be 2, and the secondary operation units may be connected to nodes of any layer except the second-to-last layer. For example, the secondary operation units may be connected to nodes of the last layer.

Besides, each of the operation units of the embodiment of the present disclosure may have an independent cache. For example, each of the operation units may include: a neuron caching unit. The neuron caching unit 3 is configured to cache input neuron vector data and output neuron value data of the secondary operation unit. Optionally, the tree module may be structured into an n-ary tree shape. For example, FIG. 2-10 is a block diagram showing that the operation units in the embodiment of the present disclosure are structured into a binary tree shape. In other embodiments, the respective operation units may also be constructed as a ternary tree or another n-ary tree, where n can be an integer greater than or equal to 2. The embodiment of the present disclosure does not limit a specific value of n, the count of layers may be 2 or another number. The secondary operation units 3003 can be connected to secondary operation units 3003 on nodes of its neighboring layers. Each node in FIG. 2-10 can correspond to a secondary operation unit 3003.

Optionally, each of the operation units may carry an independent cache. For example, each of the operation units may include: a neuron caching unit configured to cache input data and output data of the secondary operation unit 3003, such as input neuron vector data and output neuron value data.

In addition, in the embodiment of the present disclosure, the operation module 300 can be directly connected to the storage module 100 and the task allocation module 200, so that computational instructions of computational operators can be executed by the respective operation units according to identifier values assigned by the task allocation module 200. In other embodiments, the data processor may further include a control module. The control module is configured to control the operation module 300 to perform a corresponding computational operation according to an identifier value assigned by the task allocation module 200 to a computational operator.

Based on the configuration above, the embodiment of the present disclosure can assign corresponding identifiers to different computational operators, so that the operation module can use different operation units to perform computational operations based on the identifiers. In this way, the large core operation unit can be used to operate a computational instruction with high difficulty, and the small core operation unit can be used to operate a computational instruction with low difficulty, so that the operation units may be used properly while reducing power consumption and cost.

Further, in the embodiment of the present disclosure, the network model data stored in the storage module 100 may be data information processed by a driver module. When related operations of the network model need to be performed, the user may submit description information of the network model. The description information can be used to determine the above-mentioned network model data. The driver module can establish a data descriptor for the computational data used for performing the network model computational operation according to the description information of the network model, establish an operator descriptor for the computational operator in the network model, and establish a connection relation of the operator descriptor and the data descriptor to describe the network model, and then allocate a storage space in the storage module 100 for the data descriptor and operator descriptor through the storage allocation module, obtain an address of the storage space for transferring the data to the allocated space in the storage module. The computational data and the computational operator can be determined according to the operator descriptor and the data descriptor.

An embodiment in which the task allocation module allocates identifiers according to the embodiment of the present disclosure will be described in an example below. The task allocation module 200 is configured to allocate the computational operator in the network model data submitted by the user to one of the large core group 301 and the small core group 302. It should be noted that the task allocation module 200 can allocate the first identifier or the second identifier to the computational operators of a plurality of network models simultaneously. Correspondingly, the operation module 300 can also execute the computational operators of the plurality of network models simultaneously. Each computational operator can generate one or more computational instructions, and each computational instruction will be assigned an identifier (the first identifier or the second identifier), indicating which operation core (the large core or the small core) is expected to run this computational instruction. A smallest unit allocated by the task allocation module can be a computational operator instead of a computational instruction, in other words, all instructions generated by the same computational operator correspond to the same identifier. When the description below mentions about giving an identifier of execution on a large/small core to a node (a computational operator), it means to give an identifier of execution on a corresponding core (a large or small core) to all instructions generated by this computational operator.

In the embodiment of present disclosure, the task allocation module 200 can allocate the first identifier or the second identifier to each computational operator according to the operation time of the computational operator operating on the large core operation unit and the small core operation unit respectively.

In the embodiment of the present disclosure, the task allocation module 200 can obtain the operation time of the computational operator operating on the large core operation unit and the small core operation unit respectively. For example, the operation time of the large core operation unit is first operation time, and the operation time of the small core operation unit is second operation time. The task allocation module 200 can assign the first identifier to a computational operator when the first operation time is greater than first threshold time, and/or the second operation time is greater than second threshold time; otherwise, the task allocation module 200 assigns the second identifier to the computational operator. The first threshold time is greater than the second threshold time. Each of the first threshold time and the second threshold time may be time threshold that is set according to different requirements, respectively, which is not limited by the embodiment of the present disclosure.

In other embodiments of the present disclosure, the task allocation module 200 may be further configured to create a directed graph based on logical relationships between the computational operators, where nodes of the directed graph correspond to the computational operators. The task allocation module is further configured to respectively obtain the first operation time which is the time the large core operation unit takes for executing each computational operator and the second operation time which is the time the small core operation unit takes for executing each computational operator, use the first operation time as a delay time of each node, and use the critical path algorithm to determine a first critical path, where a computational operator corresponding to each node on the first critical path is assigned the first identifier.

A preset algorithm of the embodiment of the present disclosure may be a critical path algorithm, in other words, the identifier of a computational operator can be determined by using the critical path algorithm. The task allocation module 200 can abstract the network model into a directed graph (for example, as shown in FIG. 2-2) based on the received network model data, and each node in the directed graph represents a computational operator. Each node v has two attributes: $t1(v)$ and $t2(v)$. $t1(v)$ represents the first operation time of a computational instruction when executed by the large core group 301, and $t2(v)$ represents the second operation time of a computational instruction when executed by the small core group 302. It assumed that a ratio of the operation speed between the large core group and the small core group is $\alpha(\alpha>1)$, then $t1(v)=t^2(v)/\alpha$. First, the second identifier can be assigned to each computational operator, and the delay of each node v is set to $t1(v)$ (in other words, the operation time on the large core group), a first critical path L1 can be found by using the critical path algorithm, all nodes on this path are identified as being executed on the large core, in other words, the computational operators corresponding to all nodes on the first critical path are assigned the first identifier, and the computational operations corresponding to all nodes outside the critical path are assigned the second identifier. In other words, the computational operators corresponding to the nodes on the first critical path L1 are assigned the first identifier, and the remaining operators are assigned the second identifier. Those skilled in the art can learn a specific process of the critical path algorithm according to the existing technical means, which will not be described in detail here.

In some embodiments of the present disclosure, the network model data may also include the timeliness of the network model operations, in other words, data timeliness. The data timeliness refers to whether the user wants the computation of this network model to be completed as soon as possible. The timeliness can simply be represented by the Boolean type. If the value is true (such as 1), it means that the timeliness is strong (the computation needs to be completed as soon as possible); if the value is false (such as 0), then it means that the timeliness is weak (the computation may be completed later). Therefore, for different network model data, the data timeliness of the computational operators in the data may be different. The urgency of the operation of the computational operators in the network model can be determined according to the timeliness.

In the embodiment of the present disclosure, if the user requires timeliness, the task allocation module 200 may further set the delay of each node on L1 to 0, and use the critical path algorithm to find a second critical path L2. It is assumed that the total delay of L2 is $t(L2)$, if $t(L2) \leq t(L1)/\alpha$ then the algorithm terminates. If the condition $t(L2) \leq t(L1)/\alpha$ is not met, then this step is repeated again, the computational operators corresponding to the nodes on the second critical path L2 are assigned the first identifier, the delay of each node on L2 is set to 0, and then a third critical path L3 is found by using the critical path algorithm until $t(L2) \leq t(L1)/\alpha$. By constantly looking for new critical paths and setting the delay of nodes on the new critical paths to 0, identifiers can be assigned to all nodes. Nodes on a certain critical path are all assigned the first identifier, and nodes that are not on all critical paths are assigned the second identifier. A pseudo code of this iterative process is shown below. By setting a limitation on the delay of the critical path $t(L2) \leq t(L1)/\alpha$, it can be ensured that the computational operators to be executed on the large core group will not wait for the computational operators to be executed on the small core group, so that the entire network model can be completed at a fastest speed.

Based on the embodiment above, the allocation process of the first identifier or the second identifier can be completed, and then the operation module can perform computational operations correspondingly.

```
i = 0
while true do
    i = i + 1
    if all nodes have been assigned identifiers
    then
        the algorithm terminates
    end if
    L[i] = find a critical path
    let t(L[i])= the total latency of L[i]
    for the node v of L[i] do
        assign the first identifier to v
        set the latency of v to 0
    end for
    L[i +1] = find a new critical path
    let t(L[i+1])= the total latency of L[i+1]
    if t(L[i+1])<=t(L[i])/alpha then
        assign the second identifier to all
    nodes that have not been assigned any
    identifier
        the algorithm terminates
    end if
end while
```

FIG. 2-3 is a block diagram of a data processor according to an embodiment of the present disclosure. The data processor may further include a storage allocation module 400. The storage allocation module 400 is configured to allocate a storage address to respective network module data based on the free storage space in the storage module 100, and when the free storage space of the storage module 100 is insufficient, choose either to release the network model data or cache the network model data.

The storage allocation module 400 is configured to allocate storage space in the storage module 100 for storing the network model data submitted by the user. The storage allocation module 400 can obtain free storage space in the storage module 100, such as a free memory block, and can also determine an occupied memory block. The storage allocation module 400 is shared by all users. In other words, the storage allocation module 400 can be used to allocate a corresponding storage space for network model data submitted by a plurality of users. An algorithm used by the storage allocation module 400 may include a buddy algorithm or a slab algorithm, which, however, is not a limitation on the embodiment of the present disclosure.

In the embodiment of the present disclosure, when a plurality of users run network models at the same time, the space of the storage module 100 may be insufficient, in other words, the free storage space may become insufficient. The storage allocation module 400 can feed back prompt information about insufficient space at such time and receive selection information returned by the user. The selection information can include: information of terminating operation or information of waiting for operation. The storage allocation module 400 can choose to release the network module data according to the information of terminating operation, or cache the network model data according to the information of waiting for operation, and store the network model data by using the storage module when the storage space of the storage module is sufficient. In other words, in the embodiment of the present disclosure, when the storage space is insufficient, the user can decide whether to terminate the computation or wait until the free space in the cache becomes large enough for continuing the computation. If the user decides to wait, after a currently running computing task is finished, output data of this computing task is copied back to the memory by the driver, and then an input and output space associated with this task is released. At this time, the cached network model data can be stored in the released storage space so that the user's computing task can be executed. The data copied to the memory needs to be transferred to the storage module through the bus again when the data needs to be used in the future.

Further, the data processor in the embodiment of the present disclosure may further include a direct memory access module 500, which may be connected to the storage allocation module 400 and the storage module 300 respectively, and may be configured to transfer the network model data to the storage module 100 for storage, and transfer an operation result of the operation module to the memory, or store the data stored in the memory to the storage module 100, or the like. In other words, the memory access module 500 in the embodiment of the present disclosure can be used to establish a data connection between the storage allocation module 400 and the storage module 300, and can also establish a data connection between the storage module 300 and the memory to transfer corresponding data.

Figures 1, 2, 3, 4:
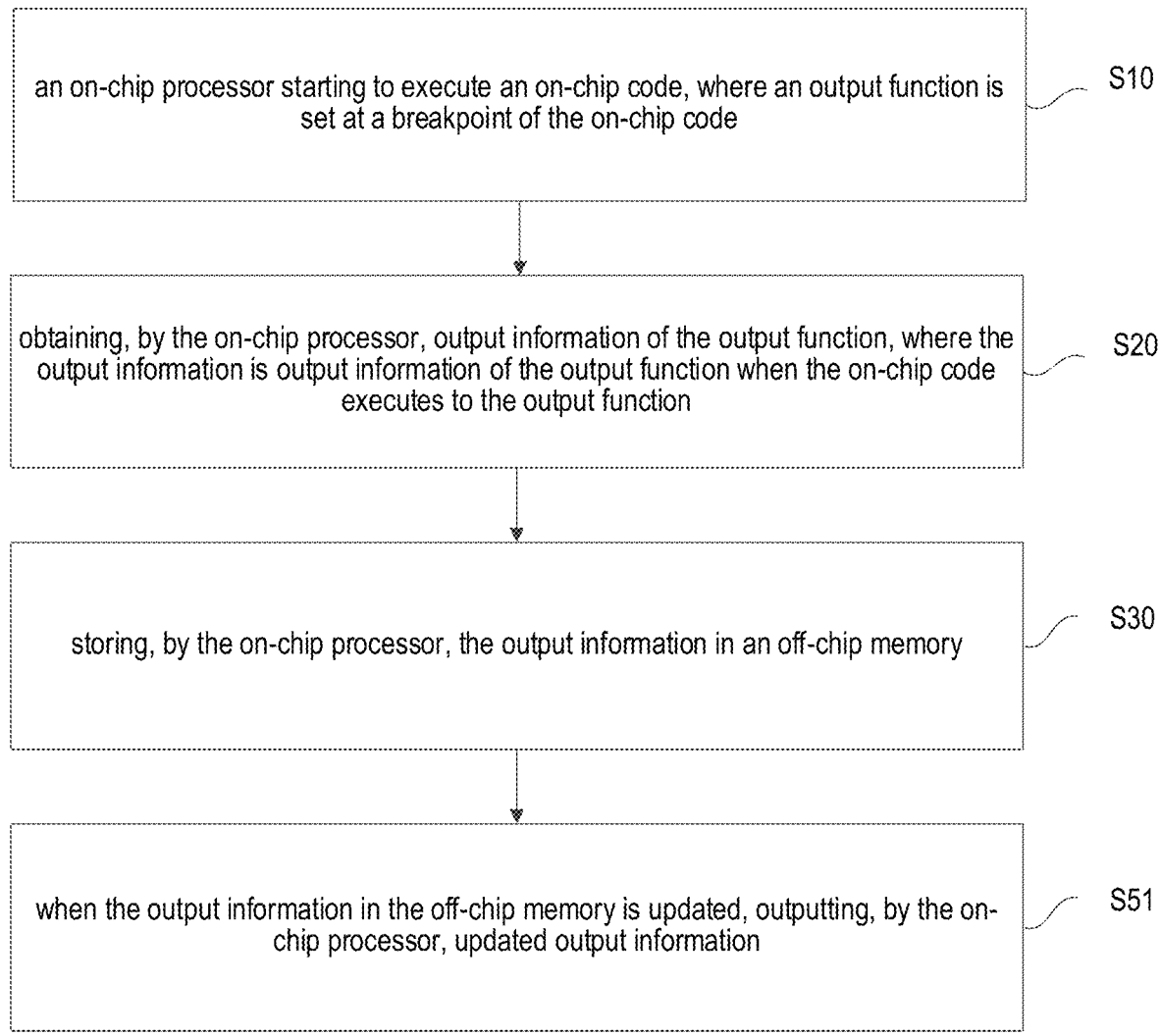

FIG. 2-4 is a block diagram of a data processor according to an embodiment of the present disclosure. Compared with the embodiment shown in FIG. 2-3, the data processor may further include a caching module 600 and a scheduling module 700. The caching module 600 can be configured to wait a computational operator and computational data to be processed by the operation module 300. As in the above-mentioned embodiment, the task allocation module 200 can assign a corresponding identifier to a computational operator. The computational operator that has been assigned an identifier is cached in the caching module 600. When the operation module 300 can execute a corresponding computational instruction, the task allocation module 200 reads the computational instruction in the corresponding computational operator in the caching module 600 to perform a computational operation. When the execution of the computational operator is completed, the caching module can release the cached data of the computational operator.

In the embodiment of the present disclosure, a storage structure of the computational operator stored by the caching module 600 is as shown in Table 1. The order of the columns in the table can be freely adjusted.

TABLE 1

| Network Computational Instruction | User Priority | Data Timeliness | Identifier Value |
|---|---|---|---|

The network computational instruction includes all instructions dedicated to completing corresponding network operations, which are used to form computational operators. The network computational instruction includes but is not limited to a control instruction, a data transfer instruction, a computational instruction, and a logical instruction. The control instruction controls a network execution process. The data transfer instruction completes the data transfer between different storage media. The data format includes but is not limited to a matrix, a vector and a scalar. The computational instruction is configured to complete a computational operation of the network, which includes but is not limited to, a matrix computational instruction, a vector computational instruction, a scalar computational instruction, a convolution neural network computational instruction, a fully connected neural network computational instruction, a pooling neural network computational instruction, a RBM neural network computational instruction, a LRN neural network computational instruction, a LCN neural network computational instruction, a LSTM neural network computational instruction, a RNN neural network computational instruction, a RELU neural network computational instruction, a PRELU neural network computational instruction, a SIGMOID neural network computational instruction, a TANH neural network computational instruction, and a MAXOUT neural network computational instruction. The logical instruction is configured to complete a logical operation of the neural network, including but not limited to a vector logical computational instruction and a scalar logical computational instruction.

The RBM neural network computational instruction is configured to implement a Restricted Boltzmann Machine (RBM) neural network operation. The LRN neural network computational instruction is configured to implement a Local Response Normalization (LRN) neural network operation. The LSTM neural network computational instruction is configured to implement a Long Short-Term Memory (LSTM) neural network operation. The RNN neural network computational instruction is configured to implement a Recurrent Neural Network (RNN) operation. The RELU neural network computational instruction is configured to implement a Rectified linear unit (RELU) neural network operation. The PRELU neural network computational instruction is configured to implement a Parametric Rectified Linear Unit (PRELU) neural network operation. The SIGMOID neural network computational instruction is configured to realize S-shaped growth curve (SIGMOID) neural network operation. $y=\text{sigmoid}(x)=1/1+e^{-x}$ where x and y are real numbers. The TANH neural network computational instruction is configured to implement a hyperbolic tangent function (TANH) neural network operation. The MAXOUT neural network computational instruction is configured to implement (MAXOUT) neural network operation by using a maxout activation function to output a node, and the MAXOUT neural network computational instruction can include the Cambricon instruction set. The instructions of the Cambricon instruction set are composed of operation codes and operands. The instruction set includes four types of instructions, which are control instruction, data transfer instruction, computational instruction, and logical instruction. The length of each instruction in the instruction set is a fixed length. For example, the length of each instruction in the instruction set can be 64 bits. The control instruction is configured to control an execution process. The control instruction includes a jump instruction and a conditional branch instruction. The data transfer instruction is configured to complete data transfer between different storage media. The data transfer instruction includes a load instruction, a store instruction, and a move instruction. The load instruction is configured to load data from the main memory to the cache, the store instruction is configured to store data from the cache to the main memory, and the move instruction is configured to move data between caches, or between a cache and a register, or between registers. The data transfer instruction supports three different data organization methods, including matrix, vector and scalar. The computational instruction is configured to complete a network computational operation. The computational instruction includes a matrix computational instruction, a vector computational instruction, and a scalar computational instruction. The matrix computational instruction is configured to complete a matrix operation in the network, including a matrix-multiply-vector operation, a vector-multiply-matrix operation, a matrix-multiply-scalar operation, an outer product operation, a matrix-add-matrix operation, and a matrix-subtract-matrix operation. The vector computational instruction is configured to complete a vector operation in the network, including: a vector elementary arithmetic, vector transcendental functions, dot product, random vector generator, and maximum/minimum of a vector. The vector elementary arithmetic include: vector add, subtract, multiply, and divide. A vector transcendental function refers to a function of a polynomial equation that cannot take any polynomial as a coefficient, including but not limited to an exponential function, a logarithmic function, a trigonometric function, and an inverse trigonometric function. The scalar computational instruction is configured to complete a scalar operation in the network, including a scalar elementary arithmetic and a scalar transcendental function. The basic scalar operations include scalar addition, subtraction, multiplication, and division (add, subtract, multiply, divide). Scalar transcendental functions refer to functions that do not satisfy any polynomial equation with polynomials as coefficients, including but not limited to exponential functions, number function, trigonometric function, inverse trigonometric function. The logical instruction is for a logical operation of the network. The logical operation includes a vector logical computational instruction and a scalar logical computational instruction. The vector logical computational instruction includes: vector compare, vector logical operations, and vector greater than merge. The vector comparison includes but is not limited to: greater than, less than, equal to, greater than or equal to, less than or equal to, and not equal to. The vector logical operation includes AND, OR, and NOT. The scalar logical operation includes scalar compare and scalar logical operations. The scalar compare includes but is not limited to: greater than, less than, equal to, greater than or equal to, less than or equal to, and not equal to. The scalar logical operation includes AND, OR, and NOT.

Further, the scheduling module 700 in the embodiment of the present disclosure can perform the operation scheduling of the operation module 300. The scheduling module 700 can select a computational operator from the caching module 600 and schedule the computational operator to a corresponding operation unit to perform a computational operation according to the operation status of each operation unit in the operation module 300. The scheduling module 700 can monitor the operation status of the large core operation unit and the small core operation unit in the operation module 300 in real time. The operation status may include a working status and an idle status. The scheduling module 700 can determine the priority information of each computational operator in the caching module 600, and determine the identifier of the currently cached computational operator with the highest priority, and control the operation module to execute the computational operator with the highest priority according to the identifier.

The network model data in the embodiment of the present disclosure may also include priority information. The priority information may include user priority and/or data timeliness. When the user submits network model data, the user's information is also included in the network model data. Each user can have user priority information. The user priority is set separately for each user by the system administrator. The data timeliness is specified by each user when the user submits network model data to the data processor. The data timeliness refers to whether the user wants the computation of this network model to be completed as soon as possible. The data timeliness can simply be represented by the Boolean type. If the value is true, it means that the timeliness is strong (the computation needs to be completed as soon as possible); if the value is false, then it means that the timeliness is weak (the computation may be completed later). Based on the timeliness, the scheduling module 700 can determine computational operators with the highest user priority, and then determine a computational operator with the strongest data timeliness from the computational operators with the highest user priority, and according to the corresponding identifier of the operator with the strongest timeliness, control the operation module to execute the computational instruction corresponding to the computational operator.

The scheduling module 700 can also determine whether there is an idle operation unit in the operation module 300. If the corresponding identifier of the computational operator with the strongest data timeliness is the first identifier, the scheduling module 700 can determine whether there is an idle large core operation unit in the large core group 301. If there is an idle large core operation unit in the large core group 301, the idle large core operation unit can be used to execute the above-mentioned computational operator with the strongest timeliness. If there is no idle large core operation unit in the large core group 301, a large core operation unit in the working status may be switched to the idle status and then used to execute the computational operator with the strongest timeliness, or, an idle small core operation unit in the small core group 302 can be used to execute the computational operator with the strongest timeliness. As there may be a competing relationship among a plurality of users, the data timeliness may not be satisfied in time. For example, when a computational operator is originally identified as being operated on the large core group, but there is no large core operation unit available within the preset time range (all large core operation units are in working status), the scheduling module 700 can dispatch the computational operator to a small core operation unit for operation. The preset time range can be set according to different needs. For example, the preset time range may be set to 1 minute or 30 seconds, which is not limited in the present disclosure. Or, in other embodiments, when a computational operator is originally identified as being operated on the small core group, but there is no small core operation unit available within the preset time range (all small core operation units are in working status), the scheduling module 700 can dispatch the computational operator to a large core operation unit for operation. Based on the embodiments of the present disclosure, when the scheduling module 700 performs instruction scheduling, the higher the user priority of a user is, the less likely the timeliness specified by the user cannot be satisfied.

In summary, the embodiments of the present disclosure can assign corresponding identifiers to different computational operators, so that the operation module can use different operation units to perform computational operations based on the identifiers. In this way, the large core operation unit can be used to operate a computational instruction with high user priority and/or high timeliness, and the small core operation unit can be used to operate a computational instruction with low user priority and/or timeliness so that the operation units may be used properly while reducing power consumption and cost.

It can be understood that, without violating the principle and logic, the method embodiments mentioned in the present disclosure can be combined with each other to form a combined embodiment, details of which are omitted due to space limitation.

In addition, the present disclosure also provides a data processing chip and an electronic equipment that include the data processor provided in any of the embodiments above, and a data processing method applied to the data processor. Corresponding technical solutions and descriptions can be found in the description of the method, and are thus omitted.

An embodiment of the present disclosure also provides a data processing chip which includes the data processor as described in any of the foregoing embodiments.

In some embodiments, the present disclosure provide a chip package structure which includes the above-mentioned chip.

In some embodiments, the present disclosure provide a board card which includes the above-mentioned chip package structure.

An embodiment of the present disclosure also provides an electronic equipment which includes the data processor or the data processing chip or the board card as described in any of the above embodiments.

The electronic equipment may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable equipment, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In addition, an embodiment of the present disclosure also provides a data processing method. The method is applied to the data processor provided in the embodiments above. FIG. 2-5 is a flowchart of a data processing method according to an embodiment of the present disclosure. The method includes:

S100: receiving and storing network model data, where the network model data includes a computational operator and computational data for performing a computational operation of the network model;

S200: using a preset algorithm to assign a first identifier or a second identifier to each computational operator, where the computational difficulty or priority of a computational operator of the first identifier is greater than that of a computational operator of the second identifier; and S300: using a large core operation unit to execute the computational operator of the first identifier based on the computational data, and using a small core operation unit to execute the computational operator of the second identifier based on the computational data.

In an embodiment of the present disclosure, the step of using the preset algorithm to assign the first identifier or the second identifier to each computational operator includes:

allocating the first identifier or the second identifier to each computational operator according to the operation time of each computational operator when the computational operator operates on the large core operation unit and the small core operation unit respectively.

In an embodiment of the present disclosure, the step of allocating the identifier to each computational operator according to the operation time of each computational operator when the computational operator operates on the large core operation unit and the small core operation unit respectively includes:

creating a directed graph based on logical relationships between the computational operators, where nodes of the directed graph correspond to the computational operators;

respectively obtaining a first operation time which is the time the large core operation unit takes for executing each computational operator and a second operation time which is the time the small core operation unit takes for executing each computational operator; and using the first operation time as a delay time of each node, and using a first critical path algorithm to determine a first critical path, where a computational operator corresponding to each node on the first critical path is assigned a first identifier.

In an embodiment, the step of receiving and storing the network model data includes:

allocating a storage address for each network model data based on a free storage space in the storage module, and when the free storage space of the storage module is insufficient, choosing either to release the network model data or cache the network model data.

In an embodiment of the present disclosure, the network model data further includes priority information, where the priority information includes user priority and/or data timeliness. The method further includes:

caching each computational operator and a corresponding first identifier or second identifier of the computational operator; and controlling the large core operation module or the small core operation module to execute a computational operator with a highest priority in the caching module according to the priority information in the network model data.

In an embodiment of the present disclosure, a plurality of large core operation units and/or a plurality of small core operation units are included. The plurality of large core operation units or the plurality of small core operation units are constructed to include: a primary operation unit, at least one branch operation unit, and a plurality of secondary operation units. The primary operation unit is connected to each of the branch operation units, and each branch operation unit is connected to at least one secondary operation unit.

The step of using the large core operation unit to execute the computational operator of the first identifier based on the computational data, and using the small core operation unit to execute the computational operator of the second identifier based on the computational data may include:

using the primary operation unit to divide a received computational operator into a plurality of computational instructions and divide the computational data into a plurality of data blocks;

using the branch operation unit to transfer the computational instructions and the data blocks to the corresponding secondary operation units; and using the secondary operation units to perform operations on received data blocks according to received computational instructions to obtain intermediate results, and transferring the intermediate results to the primary operation unit through the branch operation unit to obtain a final operation result.

In an embodiment of the present disclosure, a plurality of large core operation units and/or a plurality of small core operation units are included. The plurality of large core operation units or the plurality of small core operation units are constructed to include: a primary operation unit and a plurality of secondary operation units. The plurality of secondary operation units are constructed as m rows and n columns of secondary operation units. The primary operation unit is connected to K secondary operation units of the plurality of secondary operation units. The K secondary operation units include: n secondary operation units in a first row, n secondary operation units in an $m^{th}$ row, and m secondary operation units in a first column, where m and n are positive integers greater than 1.

The using the large core operation unit to execute the computational operator of the first identifier based on the computational data, and using the small core operation unit to execute the computational operator of the second identifier based on the computational data may include:

using the primary operation unit to divide a received computational operator into a plurality of computational instructions and divide the computational data into a plurality of data blocks, and transferring at least one of the plurality of data blocks and at least one of the plurality of computational instructions to the K secondary operation units; and using the remaining secondary operation units other than the K secondary operation units to perform operations on the computational instructions and the data blocks received from the K secondary operation units to obtain intermediate results, and transferring the intermediate results to the primary operation unit through the K secondary operation units to obtain a final operation result.

In an embodiment of the present disclosure, a plurality of large core operation units and/or a plurality of small core operation units are included. The plurality of large core operation units or the plurality of small core operation units are constructed to include: a primary operation unit, a plurality of secondary operation units, and a tree module connected between the primary operation unit and the secondary operation units. The tree module includes: a root port and a plurality of branch ports. The root port of the tree module is connected to the primary operation unit, and each of the plurality of branch ports of the tree module is connected to a secondary operation unit of the plurality of secondary operation units.

The using the large core operation unit to execute the computational operator of the first identifier based on the computational data, and using the small core operation unit to execute the computational operator of the second identifier based on the computational data may include:

using the primary operation unit to divide a received computational operator into a plurality of computational instructions and divide the computational data into a plurality of data blocks, and transferring the data blocks and the computational instructions to the root port of the tree module; and using the secondary operation units connected to the branch ports of the tree module to perform operations on the received computational instructions and the data blocks to obtain intermediate results, and transferring the intermediate results to the primary operation unit through the tree module to obtain a final operation result.

FIG. 2-6 is a block diagram of an electronic equipment according to an exemplary embodiment of the present disclosure. The electronic equipment can be provided as a terminal, server or other form of equipment. The electronic equipment may include a classification task incremental processing device 800. For example, the device 800 may be a terminal such as a mobile phone, a computer, a digital broadcasting terminal, a message transceiving device, a game console, a tablet equipment, a medical equipment, a fitness equipment, and a personal digital assistant.

Referring to FIG. 2-6, the device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the device 800, such as operations associated with display, telephone calls, data communications, camera operations, and recording operations. The processing component 802 may include one or more processors 820 for executing instructions to complete all or part of the steps of the foregoing method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations of the device 800. Examples of these types of data include instructions for any application or method operating on the device 800, contact data, phonebook data, messages, pictures, videos, etc. The memory 804 can be implemented by using any type of volatile or non-volatile storage equipment or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 806 provides power to various components of the device 800. The power component 806 may include a power management system, one or more power supplies, and other components associated with the power generation, management, and distribution of the device 800.

The multimedia component 808 includes a screen that provides an output interface between the device 800 and the user. In some embodiments, the screen may include a liquid crystal display (LCD) and a touch panel (TP). If the screen includes a touch panel, the screen may be a touch screen capable of receiving input signals from the user. The touch panel includes one or more touch sensors to detect touch, sliding, and gestures performed on the touch panel. The touch sensor may not only detect the boundary of a touch or sliding action, but also detect the duration and pressure of the touch or slide action. In some embodiments, the multimedia component 808 includes a front camera and/or a rear camera. When the device 800 is in an operation mode such as a shooting mode or a video mode, the front camera and/or the rear camera can receive external multimedia data. Each front camera and rear camera can be a fixed optical lens system or cameras with focal length and optical zoom capabilities.

The audio component 810 is configured to output and/or input audio signals. For example, the audio component 810 includes a microphone (MIC). When the device 800 is in an operation mode such as a call mode, a recording mode, and a voice recognition mode, the microphone is configured to receive external audio signals. An audio signal received by the audio component 810 may be further stored in the memory 804 or transferred by the communication component 816. In some embodiments, the audio component 810 further includes a speaker for outputting audio signals.

The I/O interface 812 provides an interface between the processing component 802 and a peripheral interface module. The peripheral interface module may be a keyboard, a click wheel, a button, and the like. The button may include but is not limited to: a home button, a volume button, a start button, and a lock button.

The sensor component 814 includes one or more sensors for providing the device 800 with status assessments of various aspects. For example, the sensor component 814 can detect the on/off status of the device 800 and the relative positioning of components such as a display and a keypad of the device 800. The sensor component 814 can also detect the position change of the device 800 or a component of the device 800, the presence or absence of contact between the user and the device 800, the orientation or acceleration/deceleration of the device 800, and the temperature change of the device 800. The sensor component 814 may include a proximity sensor configured to detect the presence of nearby objects when there is no physical contact between them. The sensor component 814 may also include a light sensor, such as a CMOS or CCD image sensor for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the device 800 and other equipment. The device 800 can access a wireless network based on a communication standard, such as WiFi, 2G, or 3G, or a combination thereof. In an exemplary embodiment, the communication component 816 receives broadcast signals or information related to broadcast from an external broadcast management system via a broadcast channel. In an exemplary embodiment, the communication component 816 further includes a near field communication (NFC) module to facilitate short-range communication. For example, the NFC module can be implemented based on the radio frequency identification (RFID) technology, the infrared data association (IrDA) technology, an ultra-wide band (UWB) technology, a Bluetooth (BT) technology, and other technologies.

In an exemplary embodiment, the device 800 may be implemented by one or more of an application specific integrated circuit (ASIC), a digital signal processor (DSP), a digital signal processing device (DSPD), a programmable logic device (PLD), a field-programmable gate array (FPGA), a controller, a micro-controller, a micro-processor, or other electronic components, and is used to perform the method above.

An exemplary embodiment provides a non-volatile computer-readable storage medium in which a computer program instruction is stored. When a processor executes the computer program instruction, the classification task incremental processing method described in the above-mentioned embodiment is realized. For example, the non-volatile computer-readable storage medium may be the memory 804 that includes a computer program instruction. The computer program instruction can be executed by the processor 820 of the device 800 to complete the method above.

It should be noted that, the foregoing embodiments of method, for the sake of conciseness, are all described as a series of action combinations, but those skilled in the art should know that since according to the present disclosure, the steps may be performed in a different order or simultaneously, the disclosure is not limited by the described order of action. Secondarily, those skilled in the art should also know that the embodiments described in the specification are all optional, and the actions and modules involved are not necessarily required for the present disclosure.

In the embodiments above, the description of each embodiment has its own emphasis. For a part that is not described in detail in one embodiment, reference may be made to related descriptions in other embodiments.

In the several examples provided in this disclosure, it should be understood that the disclosed device may be implemented in other ways. For instance, the embodiments above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the embodiments of the present disclosure.

In addition, the functional units in each embodiment of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the embodiments of the present disclosure. The foregoing memory includes: a USB flash drive, a read-only memory (ROM), a random access memory (RAM), a mobile hard disk, a magnetic disk, or an optical disc, and other media that can store program codes.

A person of ordinary skill in the art may understand that all or part of the steps of the foregoing embodiments of method may be completed by a program instructing related hardware. The program may be stored in a computer-readable memory, and the memory may include a flash disk, a read-only memory (ROM), a random-access memory (RAM), a magnetic disk, an optical disk, or the like.

The embodiments of the present disclosure have been described in detail above. Specific embodiments have been used in the specification to explain the principles and implementation manners of the present disclosure. The descriptions of the above embodiments are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

In addition, in the prior art, there are usually a large number of operations in network models involving deep learning. For example, some of neural network operations require parallel processing. Forward operations, backward operations, weight updating, etc., require a large number of parallel operations. In a traditional parallel computing system, a processing unit needs to read and write data from a storage unit that has large memory access overhead. A large number of parallel operations may lead to high bandwidth requirements and huge energy consumption.

In view of this, an embodiment of the present disclosure provides a technical solution that can reduce cost and reduce bandwidth requirements. The technical solution provides an operation device, a data processing chip, an electronic equipment, and an operation method. The present disclosure relates to the field of data processing technologies, and in particular to an operation device, a data processing chip, an electronic equipment, and an operation method.

An embodiment of the present disclosure provides an operation device that can be used to perform related operations of a deep learning network model, which can reduce the cost of the operation device and at the same time, reduce the bandwidth requirement for data access.

FIG. 3-1 shows a block diagram of an operation device according to an embodiment of the present disclosure. The operation device may include: a plurality of operation modules 100. The plurality of operation modules 100 can complete the computational operations of a network model by executing corresponding computational sub-commands in parallel. In other words, the operation modules 100 in the embodiment of the present disclosure can execute different computational sub-commands in parallel, and the computational sub-commands executed by the respective operation modules 100 are used to complete the operations of the network model. FIG. 3-1 shows an embodiment including 4 operation modules. Each of the operation modules may be connected to each other, or some of the operation modules may be connected to each other, which is not limited in the present disclosure.

The network model in the embodiment of the present disclosure may include a neural network model or may also include other network models used for machine learning. The network model may be used for machine learning or the above-mentioned neural network learning. The operation device may be used for executing the computational operations of the network model. The operation device can receive a computational command about the network model, and can generate a plurality of corresponding computational sub-commands according to the computational command. The plurality of computational sub-commands can be allocated to the plurality of operation modules 100 respectively. In other words, each of the operation modules 100 can correspondingly execute one or more computational sub-commands, so that the relevant operations of the network model can be completed correspondingly. The computational command includes a computational operation that needs to be performed by the operation device.

When the network model includes an artificial neural network model, the computational command may include: operation information, input neuron data, weight data, and output neuron data. The operation information includes but is not limited to: a forward computational instruction or a backward training instruction, or another neural network computational instruction such as a convolution computational instruction. The embodiment of the present disclosure does not limit a specific form of the computational instruction.

As described above, the operation device in the embodiment of the present disclosure can generate a plurality of computational sub-commands based on the received computational command, and allocate a corresponding computational sub-command to each operation module 100 to perform a corresponding computational operation. Each operation module 100 includes: at least one operation unit 101 and a storage unit 102 connected to each operation unit 101. A count and type of operation units 101 in each operation module can be the same or different, which can be set according to different operation requirements. An operation unit 101 includes one or more types of multipliers and adders, an addition tree formed by the adders, an activation function unit, and a vector processing unit. In other embodiments, other operation devices may also be included. The multiplier may multiply input data 1 (in1) by input data 2 (in2) to obtain output (out) after the multiplication, where the process is expressed as: out=in1*in2. The adder may add the input data in1 through the adder to obtain output data (out). The addition tree may add the input data in1 stage by stage to obtain output data (out), where in1 is a vector of length N, N is greater than 1, and the operation process is expressed as: out=in1[1]+in1[2]+ . . . +in1[N]; and/or the addition tree accumulates the input data (in1) and then adds the sum with the input data (in2) to obtain output data (out), where the process is expressed as: out=in1[1]+in1[2]+ . . . +in1[N]+in2; or the addition tree adds the input data (in1) and the input data (in2) to obtain output data (out), where the process is expressed as: out=in1+in2. The activation function unit may perform an activation function (active) operation on input data (in) to obtain activation output data (out), where the process is expressed as: out=active(in); the activation function (active) may include a sigmoid, tanh, relu, or softmax function, and may include another activation function. In addition to the activation operation, the activation function unit can also implement another non-linear function. An operation (f) may be performed on the input data (in) to obtain the output data (out), where the process is expressed as: out=f(in). The vector processing unit may process vector operations and/or pooling operations. Regarding the pooling operations, the vector processing unit may perform a pooling operation on the input data (in) to obtain output data (out) after the pooling operation, where the process is expressed as: out=pool(in), and pool refers to the pooling operation function. The pooling operation includes but is not limited to: mean value pooling, maximum value pooling, median value pooling. The input data (in) is data in a pooling kernel related to the output (out).

Alternatively, in an embodiment of the present disclosure, the operation unit 101 may also include an electronic equipment or device with an operation function, such as a network processor (NPU) or a computer equipment, for executing a corresponding computational sub-command, which, however, does not place any limitation on the embodiment of the present disclosure. In an embodiment of the present disclosure, the operation unit and the storage unit in each operation module may be electronic devices arranged in an equipment or device to facilitate data transfer between the operation unit and the storage unit.

Each operation module 100 in the embodiment of the present disclosure may include at least one operation unit 101 for performing a different operation to complete a corresponding computational sub-command. In other words, each operation module 100 can control a different operation unit 101 according to a received computational sub-command to perform a corresponding computational operation. For example, when the computational sub-command includes an addition instruction, the operation module may use an adder to perform an addition operation, and the like, which will not explained in detail in the embodiment of the present disclosure and can be regarded as an embodiment of the present disclosure as long as an operation program to be executed can be identified through a computational sub-command and a corresponding operation unit 101 can be used to execute the corresponding operation program.

In addition, the operation unit 101 may need to call computational data when executing a corresponding computational sub-command. For example, the operation unit 101 in the embodiment of the present disclosure can use first computational sub-data to execute a first computational sub-command, where the first computational sub-command is an instruction assigned to the operation unit 101 to execute a corresponding operation, and the first computational sub-data is the data required for executing the first computational sub-command.

When a corresponding operation command is executed through the network model, computational data related to the operation command can be received. Each operation module in the embodiment of the present disclosure can correspondingly transfer the computational data to the storage unit 102 of each operation module. Alternatively, the computational sub-data may be allocated to an operation module according to a computational sub-command to be executed by each operation module 100, and the computational sub-data is at least a part of the computational data. In other words, the storage unit 102 in the embodiment of the present disclosure is at least configured to store the first computational sub-data required by an operation unit in a group of the storage unit 102. The first computational sub-data includes data for executing the first computational sub-command. The computational sub-commands executed by the respective operation modules 100 may be the same or different, and may be specifically allocated according to different operation requirements. The storage unit 102 in the embodiment of the present disclosure may include at least one of a buffer, a register, a register file, and a memory array for storing data.

Based on the above configuration of the embodiment of the present disclosure, the data required for operation can be stored by the storage unit in each operation module instead of storing the data required by each operation module in a memory, which may reduce the data access bandwidth of each operation module to the storage unit, and improve the data transfer speed. At the same time, since there is no need for a large storage device to store, read, and write the data of all operation modules, there is no need of a storage device with large capacity and high data reading and writing speed, thereby reducing the cost of the storage device.

In the embodiment of the present disclosure, the respective operation units 101 in each operation module 100 can be structured into one of an H shape, a systolic array machine shape, and a tree shape. The structure of the operation units in each operation module 100 may be the same or different. Those skilled in the art can set the structure according to requirements, which is not limited by the present disclosure. Regarding the above-mentioned types of structure, the structure of the respective operation units in the operation module will be described below.

Figures 1, 2, 3, 4, 5:
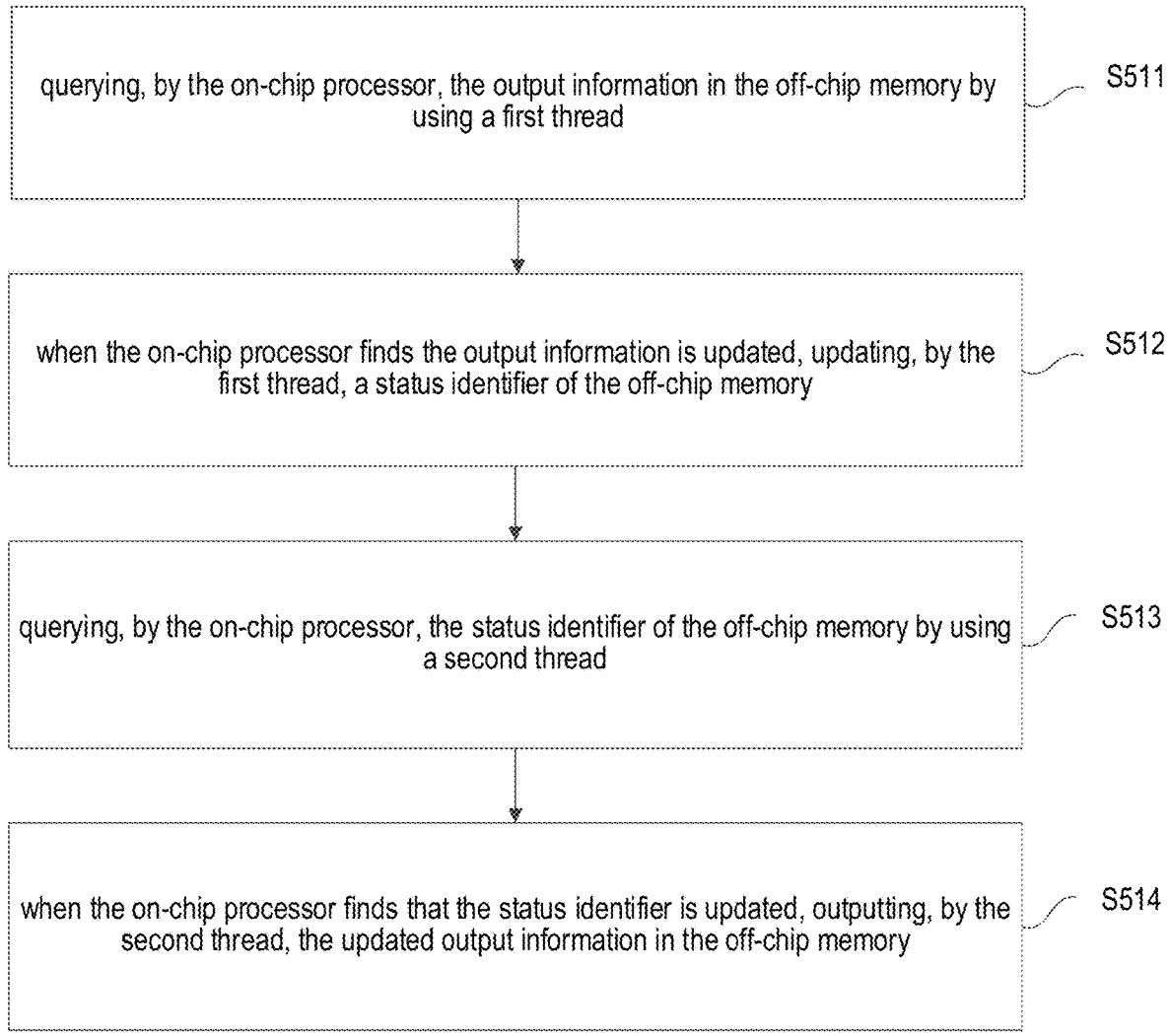

FIG. 3-5 is a block diagram of an operation module structured into an H shape according to an embodiment of the present disclosure. As shown in FIG. 3-5, when the operation units 101 in the operation module 100 are structured into the H shape, each operation unit may include a primary operation unit 1001, at least one branch operation unit 1002, and a plurality of secondary operation units 1003. The primary operation unit 1001 can be connected to each branch operation unit 1002. The branch operation unit 1002 is respectively connected to at least one of the secondary operation units 1003. As shown in FIG. 3-5, the operation module includes four branch operation units 1002. Each branch operation unit 1002 is connected to four secondary operation units 1003, and the branch operation unit 1002 is configured to transfer data, instructions, and intermediate results between the primary operation unit 1001 and the secondary operation units 1003. When each branch operation unit 1002 executes a computational sub-command, the branch operation unit 1002 can perform an operation through data stored in the storage unit 102 in the module.

The primary operation unit 1001 is configured to divide a received computational operator into a plurality of computational instructions and divide computational data into a plurality of data blocks, transfer the computational instructions and the data blocks to a corresponding secondary operation unit 1003 through a branch operation unit 1002 to obtain intermediate results, and obtain a final operation result based on the intermediate results. Each of the branch operation units is configured to forward information such as data blocks, computational instructions, and weights between the primary operation unit and the secondary operation unit.

The secondary operation units 1003 can generate corresponding intermediate results after completing the corresponding computational instructions, and then can transfer the intermediate results back to the primary operation unit 1001 through the branch operation unit 1002. In other words, the respective secondary operation units can execute the multiplication and accumulation of 8 sub-matrices and a weight matrix w in parallel to obtain 8 intermediate results, and transfer the 8 intermediate results to the primary operation unit 1001.

The primary operation unit 1001 can sort the 8 intermediate results to obtain a corresponding operation result, perform a bias b operation and then perform an activation operation to obtain a final result y, and transfer the final result y to the storage module 100 for storage or to another electronic device for subsequent processing. In other words, the final result y can be output or be stored in the storage unit 102.

In addition, FIG. 3-6 is a block diagram of an operation module structured into the systolic array machine shape according to an embodiment of the present disclosure. When the respective operation units 101 in the operation module 100 are structured into the systolic array machine shape, each operation unit may include a primary operation unit 1001 and a plurality of secondary operation units 1003. The plurality of secondary operation units 1003 are arranged as an array, and the plurality of secondary operation units are constructed as m rows and n columns of secondary operating units, where m and n are positive integers greater than 1. Each secondary operation unit 1003 is connected to other adjacent secondary operation units 1003, and the primary operation unit 1001 is connected to k secondary operation units 1003 of the plurality of secondary operation units 1003. The k secondary operation units 1003 are: n secondary operation units 1003 in a first row, n secondary operation units 1003 in an $m^{th}$ row, and m secondary operation units 1003 in a first column. It should be noted that the k secondary operation units 1003 shown in FIG. 3-6 only include the n secondary operation units 1003 in the first row, the n secondary operation units 1003 in the $m^{th}$ row, and the m secondary operation units 1003 in the first column. In other words, the k secondary operation units 1003 are secondary operation units 1003 that are directly connected to the primary operation unit 1001 among the plurality of secondary operation unit 1003. The k secondary operation units 1003 can be configured to forward data and instructions between the primary operation unit 1001 and the plurality of secondary operation units 1003. The remaining secondary operation units except the k secondary operation units are configured to perform operations on received data blocks according to the computational instructions to obtain intermediate results, and transfer the operation results to the k secondary operation units.

The primary operation unit 1001 can transfer assigned computational operators to the k secondary operation units 1003 to perform operations, and can be connected to the remaining secondary operation units 1003 to obtain intermediate results through the remaining secondary operation units 1003. The primary operation unit 1001 can process the intermediate results transferred by the plurality of remaining secondary operation units 1003 to obtain a final operation result, and send the operation result to the storage module 102 for storage.

In addition, FIG. 3-7 is a block diagram of an operation module structured into the tree shape according to an embodiment of the present disclosure. When the operation units in the operation module are structured into the tree shape, the operation units may include a primary operation unit 1001 and a plurality of secondary operation units 1003, and a tree module 1004 connected between the primary operation unit 1001 and the secondary operation units. The tree module 1004 includes a root port 1 and a plurality of branch ports 2. The root port 1 of the tree module is connected to the primary operation unit 1001, and each of the plurality of branch ports 2 of the tree module is connected to a secondary operation unit of the plurality of secondary operation units. The tree module has receiving and transferring functions. FIG. 3-7 shows the transferring function of the tree module. In other embodiments, the tree module may also have the receiving function, which is not limited herein. The tree module 1004 can be configured to forward data blocks, weights, and computational instructions between the primary operation unit 1001 and the plurality of secondary operation units 1003. The primary operation unit 1001 can divide a received computational operator into a plurality of computational instructions and divide computational data into a plurality of data blocks, and transfer the computational instructions and the data blocks to the tree module 1004. The tree module 1004 then transfers the data, computational instructions, and weights to corresponding secondary operation units 1003, receives intermediate results from the secondary operation units 1003, and transfers the intermediate results to the primary operation unit 1001. Then, the primary operation unit 1001 processes the intermediate results to obtain a final operation result, and sends the operation result to the storage unit 102 for storage.

In the embodiment of the present disclosure, the tree module may include at least one layer of nodes. The nodes are structured into a line with a forwarding function. The nodes may not have a computing function. If the tree module has zero layer of nodes, the tree module is not required.

The tree module may be structured into an n-ary tree shape. For example, FIG. 3-8 is a block diagram showing that the operation units in the embodiment of the present disclosure are structured into a binary tree shape. In other embodiments, the respective operation units may also be constructed as a ternary tree or an n-ary tree, where n can be an integer greater than or equal to 2. The embodiment of the present disclosure does not limit a specific value of n, the count of layers may be 2 or more. The secondary operation units may be connected to nodes of any layer except the second-to-last layer. For example, the secondary operation units may be connected to nodes of the last layer.

Besides, each of the operation units of the embodiment of the present disclosure may have an independent cache. For example, each of the operation units may include: a neuron caching unit. The neuron caching unit is configured to cache input neuron vector data and output neuron value data of the secondary operation unit.

In the embodiment of the present disclosure, the operation modules may be connected, for example, at least two operation modules may be connected. For example, data connection exists between at least two operation modules, and one of the two operation modules can execute the first computational sub-command by using the first computational sub-data and second computational sub-data of the other operation module. The second computational sub-data includes data stored in the storage unit of the other operation module and/or data generated by the operation unit of the other operation module. In other words, data connection exists between the operation modules 100 in the embodiment of the present disclosure, where the connection may be wired or wireless. A data transfer channel can be built between two operation modules based on the data connection. When an operation module 100 executes the first computational sub-command, the operation module 100 may need data generated by another operation module 100. In this case, data transfer can be realized based on the data connection between the two operation modules.

FIG. 3-2 is a block diagram of an operation device according to an embodiment of the present disclosure.

Besides a plurality of operation modules 100, the operation device may further include a control module 200. The control module 200 is configured to control the operation modules to execute corresponding computational sub-commands and control a memory to store corresponding computational sub-data. The control module 200 can also control the connection status between the operation modules.

The control module 200 in the embodiment of the present disclosure can receive a computational command related to a network model. The control module 200 may receive and transfer the computational command or other information through a communication module, or the control module 200 may receive the computational command or other information directly. The communication module may include a wired communication unit and/or a wireless communication unit. The wired communication unit may perform information transfer through a wired cable, where the wired cable may include an optical fiber, a twisted pair, or a coaxial cable. The wireless communication unit may perform information transfer through wireless communication. The wireless communication unit may include a wifi module, an NFC module, and the like. Similarly, the data connection between the operation modules 100 may also be performed in a wired or wireless manner. For example, the connection may be realized by an optical fiber.

The control module 200 can allocate corresponding computational sub-commands and computational sub-data to the operation modules 100 according to the received computational command and computational data. The computational command includes a plurality of computational sub-commands for performing network model operations, and the computational data includes the computational sub-data required for executing each of the computational sub-commands. The control module 200 in the embodiment of the present disclosure can determine each computational sub-command and computational sub-data according to the computational logic relationship in the received computational command. For example, the control module 200 can establish a directed graph according to the logical relationship of the computational commands. The nodes of the directed graph can be used to distinguish the computational sub-commands. In other words, the computational command corresponding to the computational operation between every two nodes can be regarded as a computational sub-command. At this time, the required computational sub-data can also be determined according to the input data of the computational sub-command, so that an operation module can be allocated to execute the computational sub-command, and the computational sub-data can be allocated to the storage unit of the operation module.

In addition, the control module 200 can also determine whether each operation module needs data from another operation module when executing the corresponding computational sub-command. If the operation module needs the data from another operation module, the control module 200 establishes a connection between the two operation modules. If the operation module does not need the data from another operation module, the control module 200 does not establish a connection between the two operation modules. For example, in the embodiment of the present disclosure, a switching component can be used to connect or disconnect operation modules. In this case, the operation modules can be connected to the switching component separately. By controlling the connection of a corresponding line of the switching component, the connection between the corresponding operation modules can be realized. With this configuration, the internal structure of the operation device can be simplified.

FIG. 3-3 is a block diagram of a control module according to an embodiment of the present disclosure. The control module 200 in the embodiment of the present disclosure may include: a first allocation unit 201 and a second allocation unit 202.

The first allocation unit 201 is configured to divide the computational command into a plurality of computational sub-commands according to the computational logic relationship in the received computational command, and correspondingly allocate the plurality of computational sub-commands to different operation modules 100 for computation. The second allocation unit 202 is configured to determine the computational sub-data required for executing each of the computational sub-commands, and allocate the computational sub-data to corresponding operation modules for storage.

In other words, in the embodiment of the present disclosure, the allocation of the computational command may be performed by the first allocation unit 201, and the allocation of the computational data may be performed by the second allocation unit 202. In this way, each operation module can use the data stored in the storage unit of the operation module to complete a computational operation when executing its own computational sub-command.

To present the structural configuration of the embodiment of the present disclosure, the following examples will be used to illustrate the operation device of the embodiment of the present disclosure. The operation device of the embodiment of the present disclosure may include four operation modules 100. Each operation module 100 includes one storage unit 102 and four operation units 101. For example, a first operation module 100 includes a storage unit A0 and operation units B0, B1, B11, B10; a second operation module 100 may include a storage unit A1 and operation units B2, B9, B12, B15; a third operation module 100 may include a storage unit A2 and operation units B4, B5, B6, and n7; and a fourth operation module 100 may include a storage unit A3 and operation units B3, B8, B13, B14. The operation units in each operation module 100 can be connected to each other. Operation modules 100 can be connected selectively according to the control of the control module 200.

In addition, the control module 200 may also allocate the corresponding computational sub-command to each operation module according to the received computational command and computational data, and at the same time, allocate the corresponding computational sub-data to the storage unit. Based on the configuration above, the scalability of the operation device can be ensured, and a Numa architecture of the operation device can also be realized through the setting of the various operation modules.

In summary, in the embodiment of the present disclosure, instead of storing data required by each operation module in a memory, the data required for the operation of each operation module is stored in the storage unit of each operation module. This configuration may reduce the data access bandwidth of each operation module when each operation module accesses the storage unit, and increase the data transfer speed. At the same time, since there is no need for a large storage device to store, read, and write the data of all operation modules, it is not needed to set a storage device with large capacity and high data reading and writing speed, thereby reducing the cost of the storage device. In addition, the embodiment of the present disclosure can also improve the scalability of the operation device. A computation function of the operation device can be easily expanded by adding an operation module with a corresponding computing function.

It can be understood that, without violating the principle and logic, the embodiments mentioned in the present disclosure can be combined with each other to form a combined embodiment, details of which are omitted due to space limit.

In addition, the present disclosure also provides a data processing chip and an electronic equipment that include the operation device provided in any of the embodiments above, and an operation method applied to the operation device. Corresponding technical solutions and descriptions can be found in the description of the method, and are thus omitted.

An embodiment of the present disclosure also provides a data processing chip which includes the operation device as described in any of the foregoing embodiments.

In some embodiments, the present disclosure provide a chip package structure which includes the above-mentioned data processing chip.

In some embodiments, the present disclosure provide a board card which includes the above-mentioned chip package structure.

An embodiment of the present disclosure also provides an electronic device which includes the operation device or the chip or the board card as described in any of the above embodiments.

The electronic equipment may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In addition, an embodiment the present disclosure provides an operation method. The method is applied to the operation device of any of the above-mentioned embodiments. The operation device includes a plurality of operation modules. The plurality of operation modules are configured to execute corresponding computational sub-commands in parallel to complete a computational operation of a network model. FIG. 3-4 is a flowchart of an operation method according to an embodiment of the present disclosure. The method includes:

S100: storing first computational sub-data by using a storage unit of each operation module, where the first computational sub-data includes data for executing a first computational sub-command; and S200: using, by the operation unit of each operation module, the first computational sub-data to execute the first computational sub-command, where the computational sub-command executed by each operation module may be different.

In the embodiment of the present disclosure, the step of using, by the operation unit of each operation module, the first computational sub-data to execute the first computational sub-command further includes:

executing the first computational sub-command by using the first computational sub-data and second computational sub-data of another operation module, where the second computational sub-data includes data stored in a storage unit in another operation module and/or data generated by an operation unit in another operation module.

In an embodiment of the present disclosure, the method further includes:

allocating a corresponding computational sub-command and computational sub-data to each operation module according to a received computational command and computational data, where the computational command includes a plurality of computational sub-commands, and the computational data includes computational sub-data required for executing each of the computational sub-commands.

In an embodiment of the present disclosure, the step of allocating the corresponding computational sub-command and the computational sub-data to each operation module according to the received computational command and the computational data includes:

using a first allocation unit to divide the computational command into a plurality of computational sub-commands according to a computational logic relationship in the computational command, and correspondingly allocate the plurality of computational sub-commands to different operation modules for operation; and using a second allocation unit to determine computational sub-data required for executing each of the computational sub-commands, and allocate the computational sub-data to a corresponding operation module for storage.

In an embodiment of the present disclosure, the method further includes:

selectively connecting operation modules according to a computational logic relationship between the computational sub-commands.

It should be noted that, the foregoing embodiments of method, for the sake of conciseness, are all described as a series of action combinations, but those skilled in the art should know that since according to the present disclosure, the steps may be performed in a different order or simultaneously, the disclosure is not limited by the described order of action. Secondarily, those skilled in the art should also know that the embodiments described in the specification are all optional, and the actions and modules involved are not necessarily required for the present disclosure.

In the embodiments above, the description of each embodiment has its own emphasis. For a part that is not described in detail in one embodiment, reference may be made to related descriptions in other embodiments.

In the several embodiments provided in this disclosure, it should be understood that the disclosed device may be implemented in other ways. For instance, the embodiments above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the embodiments of the present disclosure.

In addition, the functional units in each embodiment of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the embodiments of the present disclosure. The foregoing memory includes: a USB flash drive, a read-only memory (ROM), a random-access memory (RAM), a mobile hard disk, a magnetic disk, or an optical disc, and other media that can store program codes.

A person of ordinary skill in the art may understand that all or part of the steps of the foregoing embodiments of method may be completed by a program instructing related hardware. The program may be stored in a computer-readable memory, and the memory may include a flash disk, a read-only memory (ROM), a random-access memory (RAM), a magnetic disk, an optical disk, or the like.

The embodiments of the present disclosure have been described in detail above. Specific embodiments have been used in the specification to explain the principles and implementation manners of the present disclosure. The descriptions of the above embodiments are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

In addition, in a processor structured into a bus, data is operated inside the processor in a fixed format. When data needs to be written into the memory from the processor, data written into the memory has two formats. A first format is called the big endian, which means that a logic high-order byte of data of the processor is written to a low address in the memory, and a logic low-order byte of the data of the processor is written to a high address in the memory. A second format is called the little endian, of which the storage order of data in the memory is opposite to the big endian. Existing processors either only support data operations of the big endian format or the little endian format. In this case, the prior art may have poor applicability.

In view of this, an embodiment of the present disclosure provides a data processor, a chip, an electronic equipment, and a data processing method that have good applicability and can reduce the cost. The present disclosure relates to the field of data processing, and in particular to a data processor, a chip, an electronic equipment, and a data processing method.

FIG. 4-1 shows a block diagram of a data processor according to an embodiment of the present disclosure. The data processor of the embodiment of the present disclosure can be constructed as a chip for data processing, or can also be set in an electronic equipment to execute a corresponding data processing operation. The data processor can realize the simultaneous application of the big-endian format and the little-endian format, which improves the applicability while reducing the cost.

As shown in FIG. 4-1, the data processor of the embodiment of the present disclosure may include: a data conversion module 100 and a control module 200 connected to the data conversion module 100.

The data conversion module 100 may convert first data into second data according to a preset data format, where the preset data format includes a preset granularity and a preset endian. According to a received control signal, when the control module 200 determines that the endian of the first data is different from the preset endian, the control module 200 may control the data conversion module 100 to convert the first data into the second data according to the preset data format.

In the embodiment of the present disclosure, according to a data conversion instruction transferred by the control module 200, the data conversion module 100 may convert the first data into the second data, where the first data may be converted into the second data with the preset endian format according to the preset granularity. The data granularity refers to a count of bytes of data, such as 8 bits, 16 bits, 32 bits, 64 bits, etc., and the present disclosure is not limited thereto. Endian refers to whether the order of storing bytes and the order of inputting (outputting) bytes are first-come first or last-come first, in other words, endian can include a byte order of the big endian format and a byte order of the little endian format. The endian of the big endian format refers to that a logic high-order byte of data is written to a low address, and a logic low-order byte of data is written to a high address. The endian of the small endian format refers to that a logic high-order byte of data is written to a high address, and a logic low-order byte of data is written to a low address.

The control module 200 in the embodiment of the present disclosure can receive a control signal. From the received control signal, the following can be obtained: a first address space of first data on which a data processing operation is to be executed, a data format of the first data, a preset data format of second data that is to be output when the data processing operation is executed, a preset computational instruction for performing the data processing operation, and a second address space of the second data that is output after the data processing operation is executed. The first address space may include a starting address and an end address for storing the first data. Correspondingly, the second address space may also include a starting address and an end address for storing the second data. The data format of the first data may include a data granularity and an endian of the first data, and the preset data format may include the required data format of the second data, such as a preset granularity and/or a preset endian.

The control module 200 of the embodiment of the present disclosure may store a control signal or various information obtained based on the control signal in a storage module. The storage module may be a storage device independent of the control module 200 and the data conversion module 100 in the data processor. The storage module may also be a buffer or memory provided in the control module 200, which is not limited by the embodiment of the present disclosure. By storing the control signal or various information obtained based on the control signal in the storage module, the modules or devices in the data processor can obtain corresponding data or instructions conveniently. The storage module may include one or more of a register and a cache. Specifically, the cache may be configured to store the computational instruction. The register may be configured to store the machine learning model, the data, and the scalar. In some embodiments, the cache is a scratch pad memory.

The control module 200 can obtain the above-mentioned information about the data conversion operation according to the received control signal, and can correspondingly control the data conversion module 100 to perform the related data conversion operation. The control module 200 can determine whether the endian of the first data is the same as the preset endian based on the control signal. If the endian of the first data is the same as the preset endian, the data conversion module 100 does not need to perform the endian conversion operation on the data. If the endian of the first data is different from the preset endian, a data conversion instruction can be sent to the data conversion module 100 to control the data conversion module 100 to convert the first data into the second data corresponding to the preset data format.

FIG. 4-2 shows a block diagram of the data conversion module in the data processor according to an embodiment of the present disclosure. The data conversion module 100 may include a grouping unit 101 and an endian conversion unit 102. The grouping unit 101 can be configured to divide the first data into a plurality of byte groups to obtain third data according to the preset granularity. The endian conversion unit 102 may be configured to convert the endian of the data into the preset endian. The data conversion module 100 can obtain the first address space of the first data based on the data conversion instruction transferred from the control module 200, so that the data conversion module 100 can read the corresponding first data according to the first address space, and can also obtain the second address space for storing the second data, so that the converted second data can be stored in the second address space. At the same time, the data conversion module 100 can also obtain the data format of the first data and the preset data format of the second data.

When the data granularity of the first data is different from the preset granularity and the endian of the first data is not the same as the preset endian, the control module 200 can send a corresponding data conversion instruction to control the grouping unit 101 to group the first data based on the preset granularity to obtain the third data. The granularity of each byte group of the third data is the same as the preset granularity. The endian conversion unit 102 can convert the third data into the second data based on the preset endian.

Based on the configuration above, when the endian of the first data is different from the preset endian, the first data can be grouped by the grouping unit 101, so that the data granularity of each group is the preset granularity, and then the endian conversion unit 102 converts the endian of the first data into the preset endian to obtain the second data with the preset data format.

Correspondingly, FIG. 4-3 shows a block diagram of a control module in a data processor according to an embodiment of the present disclosure. The control module 200 in the embodiment of the present disclosure may include an endian control unit 201 and a grouping control unit 202. The endian control unit 101 is configured to determine the endian of the first data according to a received control signal, and when the endian of the first data is different from the preset endian, control the data conversion module 100 to perform data conversion based on the preset endian. The grouping control unit 202 may determine the granularity of the first data according to the received control signal, and when the granularity of the first data is different from the preset granularity, the grouping unit 101 may determine a count of groups of grouping operations to be performed by the data conversion module 100, where the count of groups is a ratio between the number of bits of the first data and the preset granularity.

Correspondingly, the grouping control unit 202 can be configured to control the grouping unit 101 to group the first data according to the determined count of groups to obtain the third data. The endian control unit 201 can be configured to control the endian conversion unit 102 to convert the endian of the third data into the preset endian. The grouping control unit 202 may obtain the granularity of the first data and the preset granularity of the second data based on the control signal, and then determine the count of groups. The endian control unit 201 may control the endian conversion unit 102 to perform data conversion based on the preset endian. In other words, the endian conversion unit 102 may convert the third data into the second data.

The foregoing are only embodiments of the control module and the data conversion module in the embodiments of the present disclosure. In other embodiments, the control module and the data conversion module may have different structures. As long as the data conversion module can be controlled by the control module to perform data conversion, they can be used as embodiments of the present disclosure.

A specific data conversion process performed by the data conversion module according to an embodiment of the present disclosure will be described below with an example. The grouping unit 101 of the embodiment of the present disclosure can divide the first data into a plurality of byte groups based on the ratio between the data granularity of the first data and the preset granularity. The plurality of byte groups are combined to form the third data, where each of the byte groups has the same data granularity as the preset granularity. Each byte group includes at least data of one byte. Each byte is 8-bit long. In other words, in the embodiment of the present disclosure, when the grouping unit 101 performs the grouping operation, the grouping unit 101 may divide the first data into a plurality of byte groups according to the ratio above, combine the data in each byte group, and form the third data according to the combined data of the byte groups.

In addition, according to the embodiment of the present disclosure, the first data can be read sequentially according to the order of the first address space of the first data, and then data grouping can be performed. The grouping unit 101 can divide the first data into the plurality of byte groups according to the order from a low address to a high address of the address space of the first data. In addition, the count of the plurality of byte groups is the same as the ratio between the data granularity of the first data and the preset granularity. That is to say, in the embodiment of the present disclosure, when the first data is stored in the corresponding address space, the first data can be stored in the order of a low address to a high address. Therefore, the grouping unit 101 can read the first data according to the order of low address to high address, and regroup the first data to obtain a plurality of byte groups, where the count of byte groups can be determined according to the ratio between the granularity of the first data and the preset granularity, and each of the byte groups includes data with the preset granularity.

Since a count of bits of data transferred by a data bus is a multiple of 64 (64*n), the following examples illustrate embodiments of converting the data granularity of the first data into 8 bits, 16 bits, 32 bits, or 64 bits by the data conversion module 100.

The preset granularity may be 8 bits. In this case, there is no need to perform grouping conversion and endian conversion on the first data.

Alternatively, when the preset granularity is data of 16 bits, according to the order from a low address to a high address of first address space, every 2 bytes are grouped as a byte group, and then a plurality of byte groups can be obtained. The count of groups is the ratio between the granularity of the first data and 16. The data granularity of the byte groups is 16 bits.

When the preset granularity is data of 32 bits, according to the order from a low address to a high address of first address space, every 4 bytes are grouped as a byte group. The count of groups is the ratio between the granularity of the first data and 32. The data granularity of the byte groups is 32 bits.

When the preset granularity is data of 64 bits, according to the order from a low address to a high address of first address space, every 8 bytes are grouped as a byte group. The count of groups is the ratio between the granularity of the first data and 64. The data granularity of the byte groups is 64 bits.

Based on the configuration above, the grouping operation of the first data can be completed. With the above-mentioned manner, the count of byte groups can be conveniently determined according to the ratio between the data granularity of the first data and the preset granularity, so as to obtain the third data corresponding to the preset data granularity.

In the embodiment of the present disclosure, the grouping unit 101 may include a conversion sub-unit corresponding to the preset granularity, such as at least one of: an 8-bit conversion sub-unit, a 16-bit conversion sub-unit, a 32-bit conversion sub-unit, or a 64-bit conversion sub-unit. Alternatively, other embodiments may also have a conversion sub-unit corresponding to another granularity. When data conversion of a corresponding preset granularity is to be performed, a corresponding conversion sub-unit may be controlled to perform data granularity conversion.

Figures 1, 2, 3, 4, 5, 6:
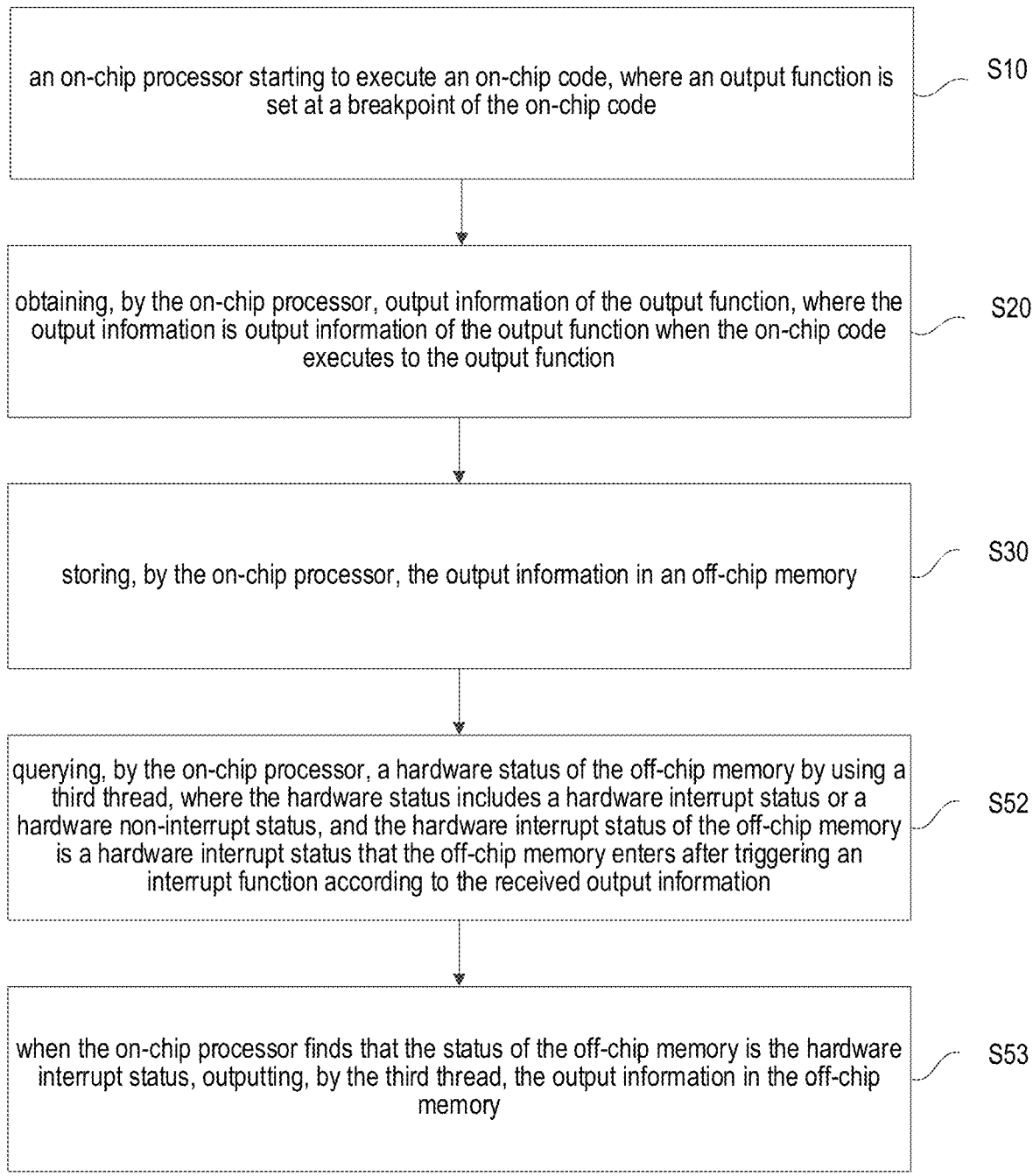
Figures 1, 2, 3, 4, 5, 6, 7:
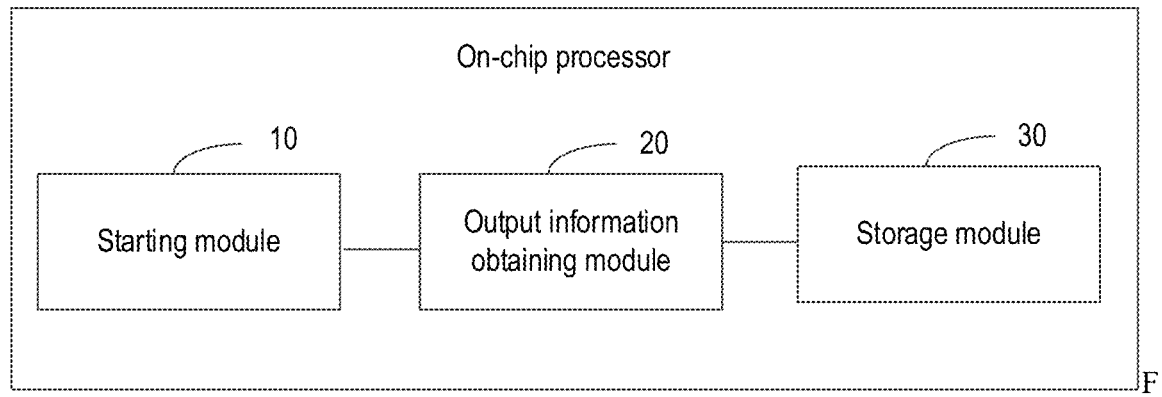
Figures 1, 2, 3, 4, 5, 6, 7, 8:
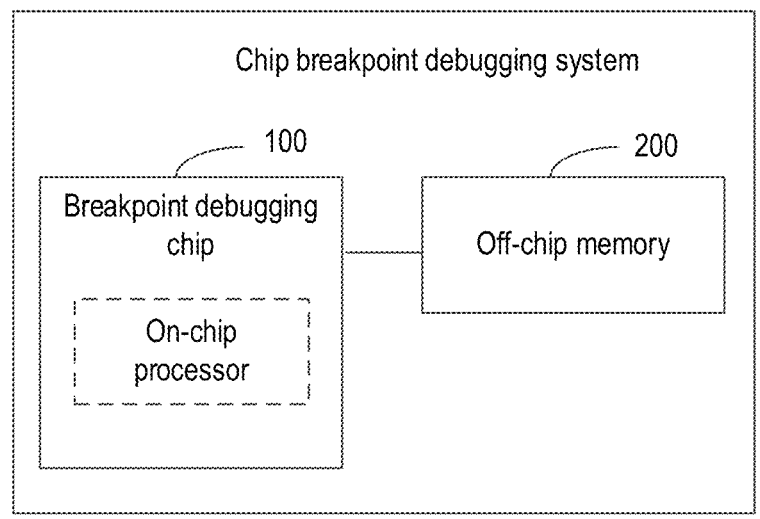
Figures 1, 2:
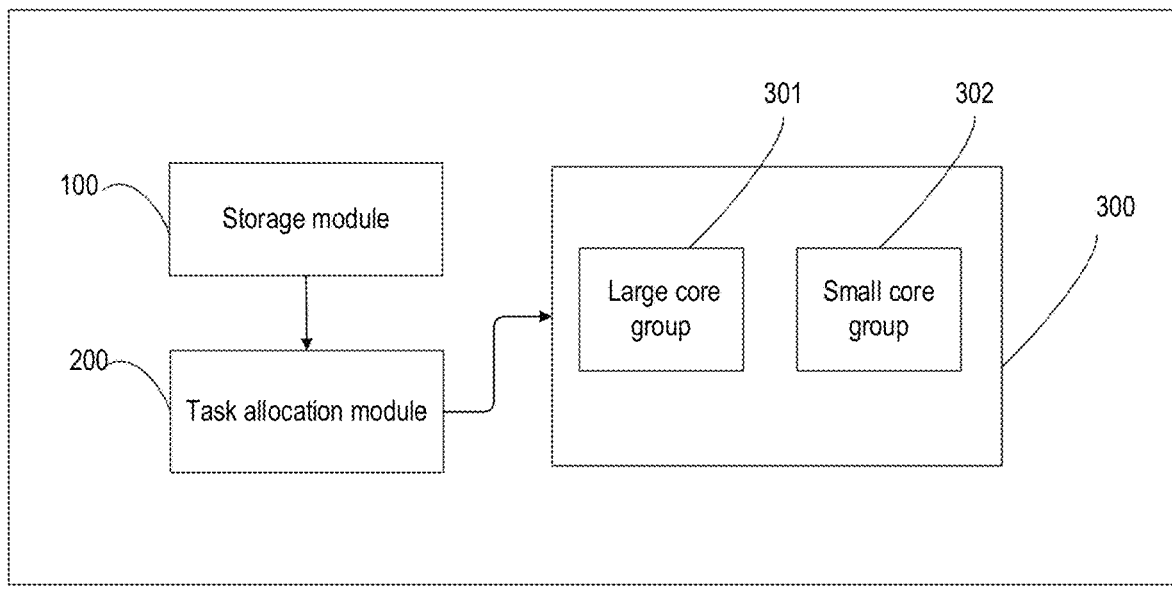
Figure 2:
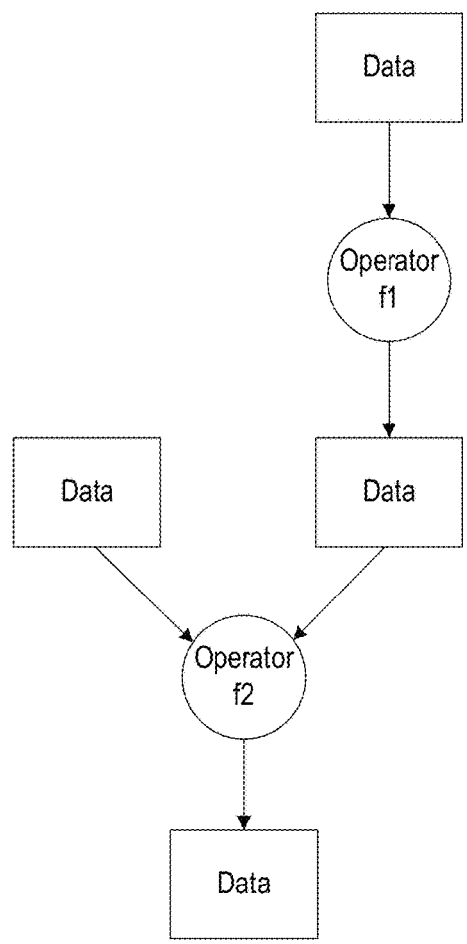
Figures 2, 3:
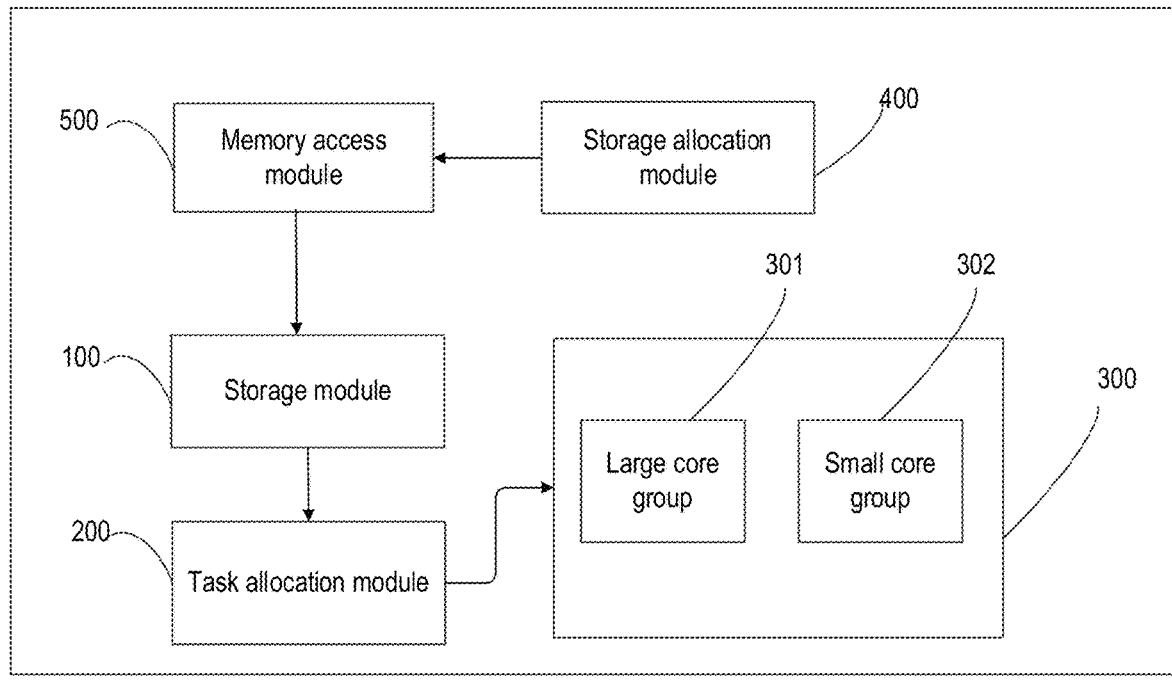
Figures 2, 3, 4:
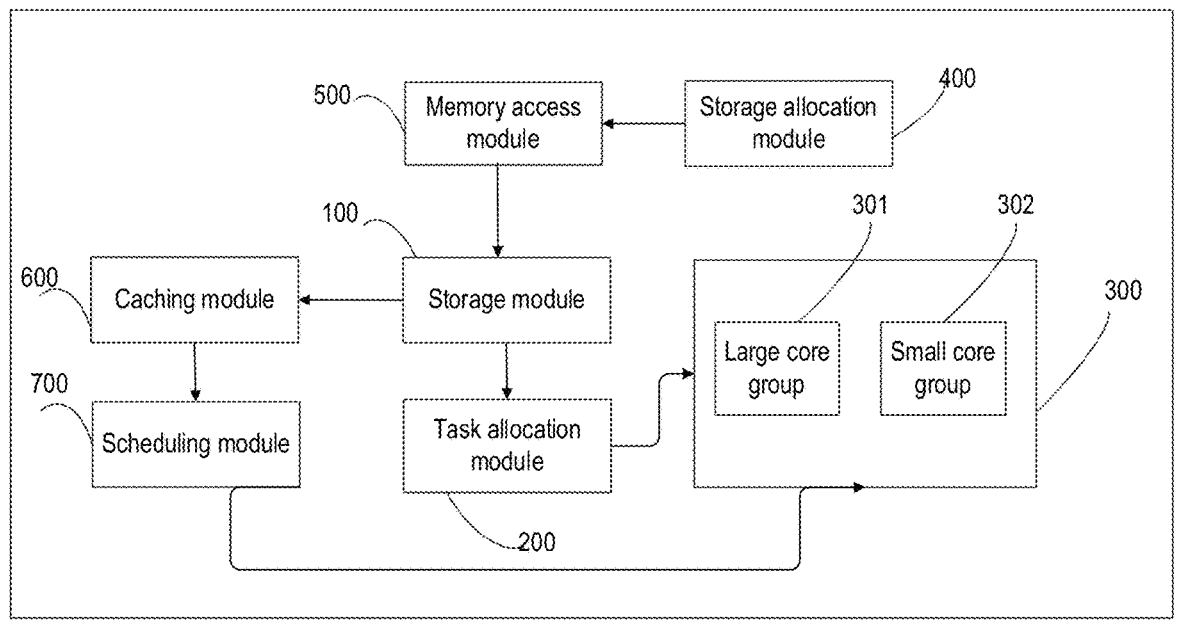
Figures 2, 3, 4, 5:
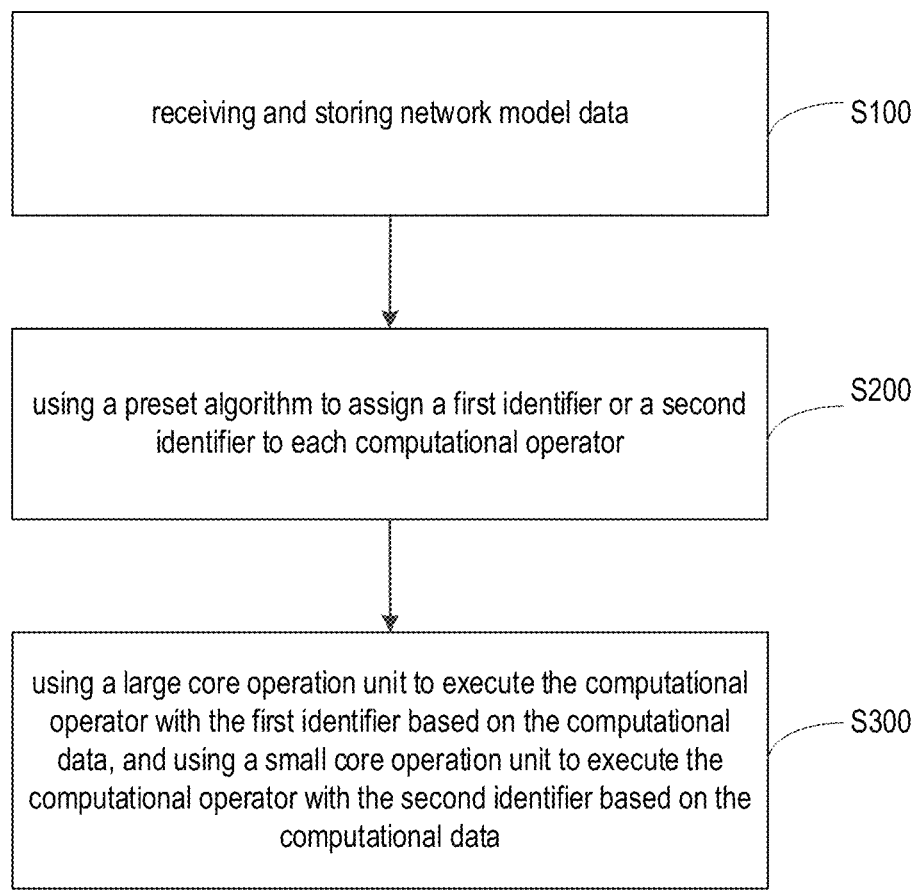
Figures 2, 3, 4, 5, 6:
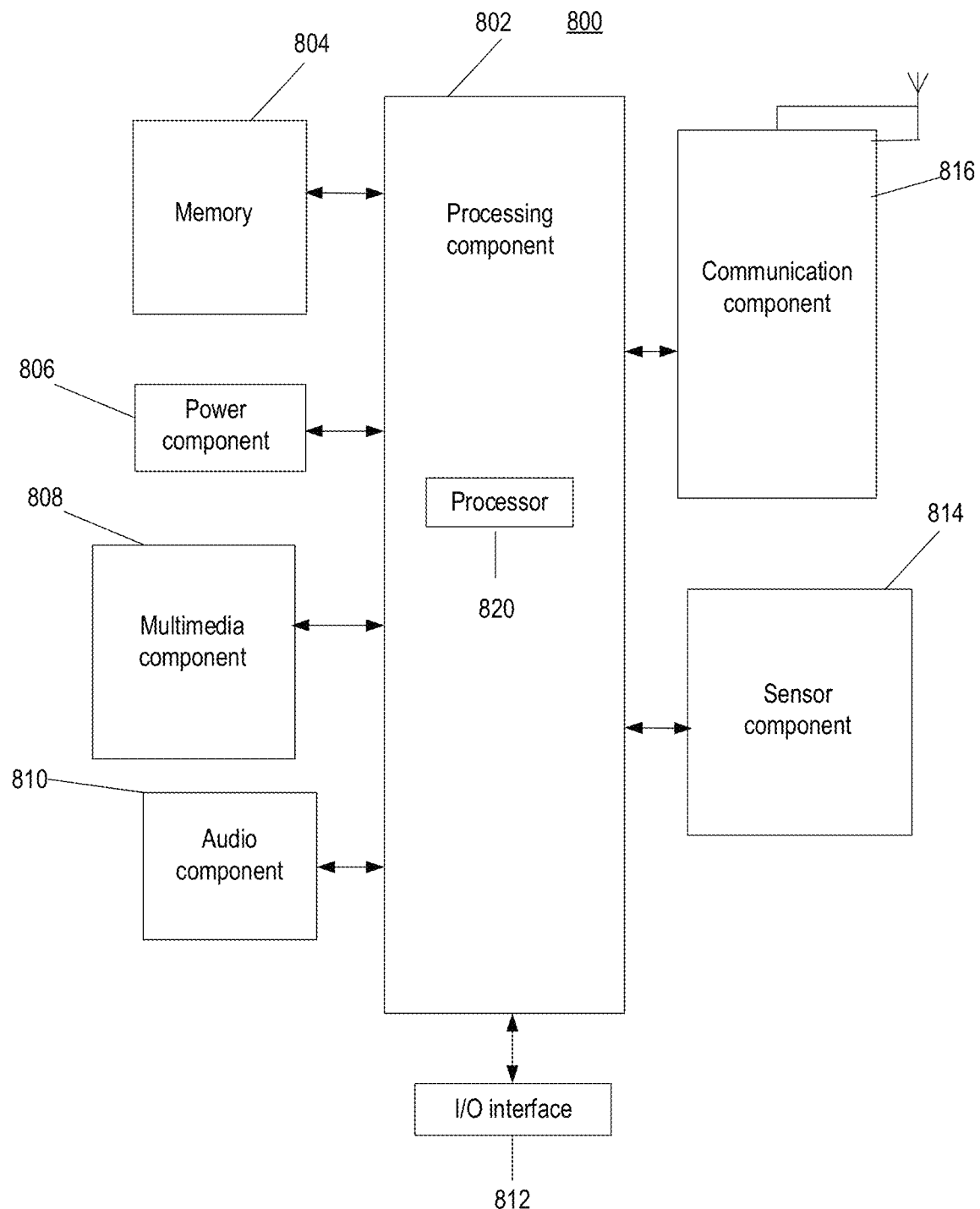
Figures 2, 3, 4, 5, 6, 7:
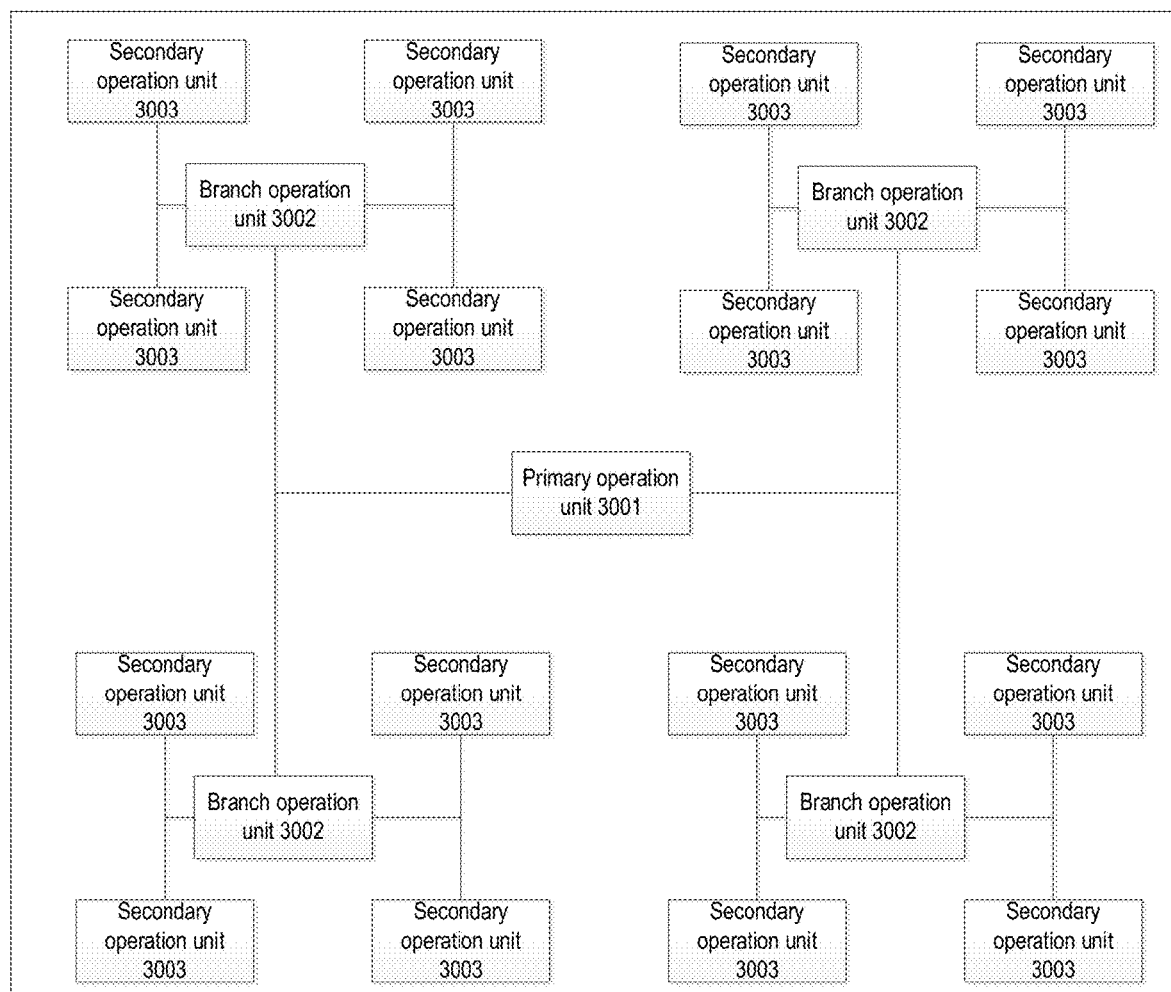
Figures 2, 3, 4, 5, 6, 7, 8:
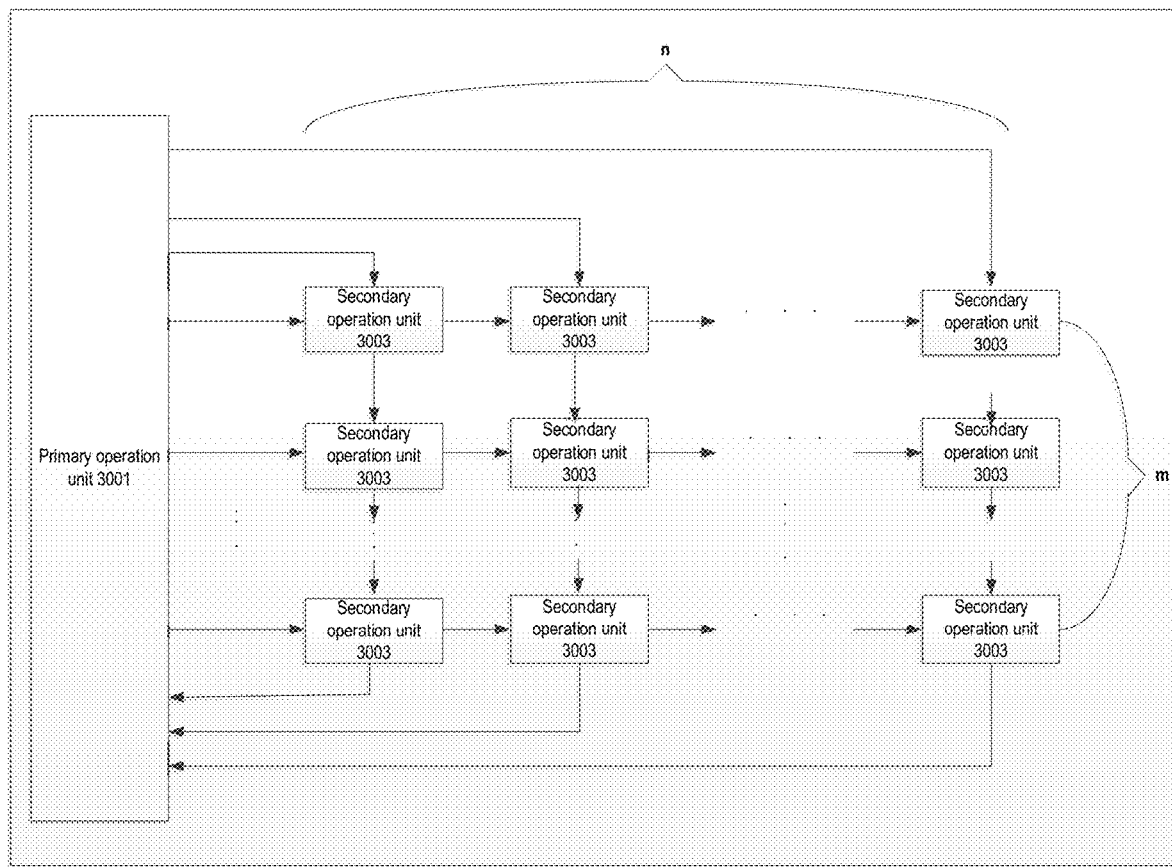
Figures 2, 3, 4, 5, 6, 7, 8, 9:
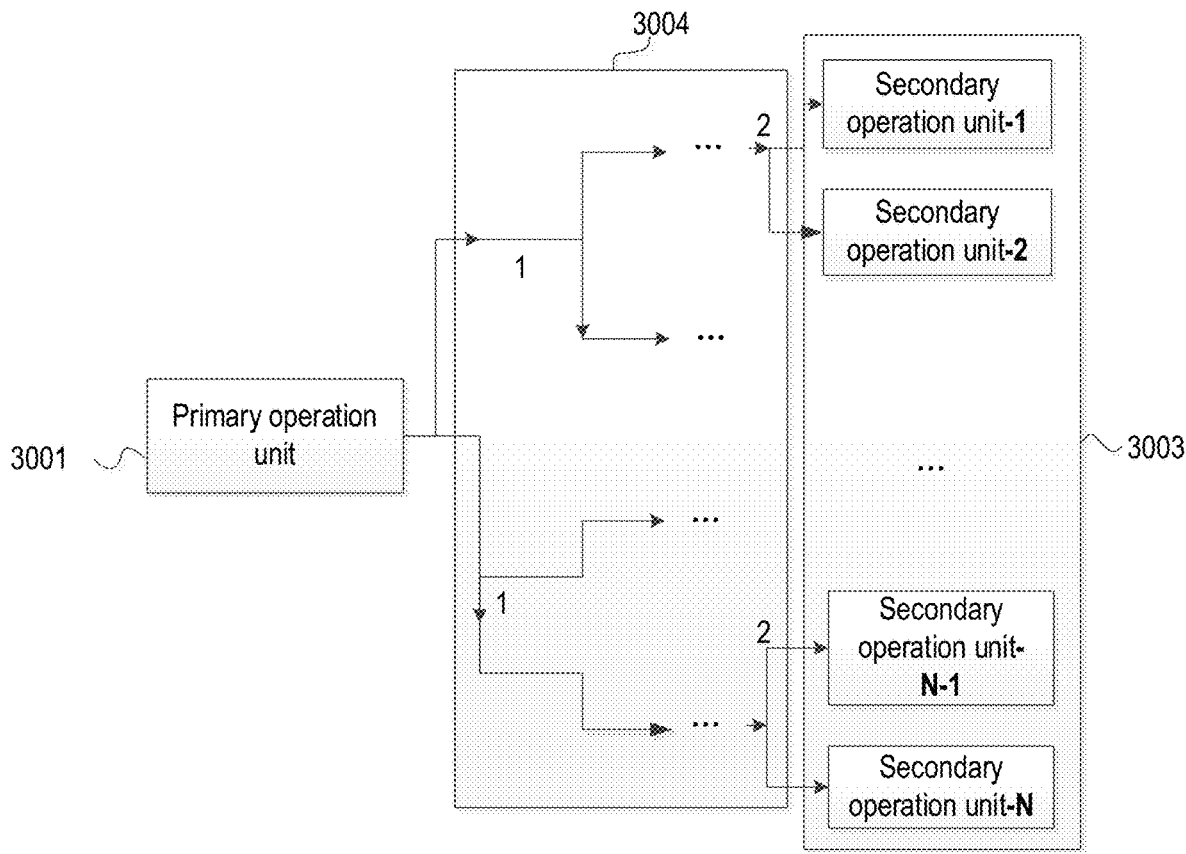
Figures 2, 3, 4, 5, 6, 7, 8, 9, 10:
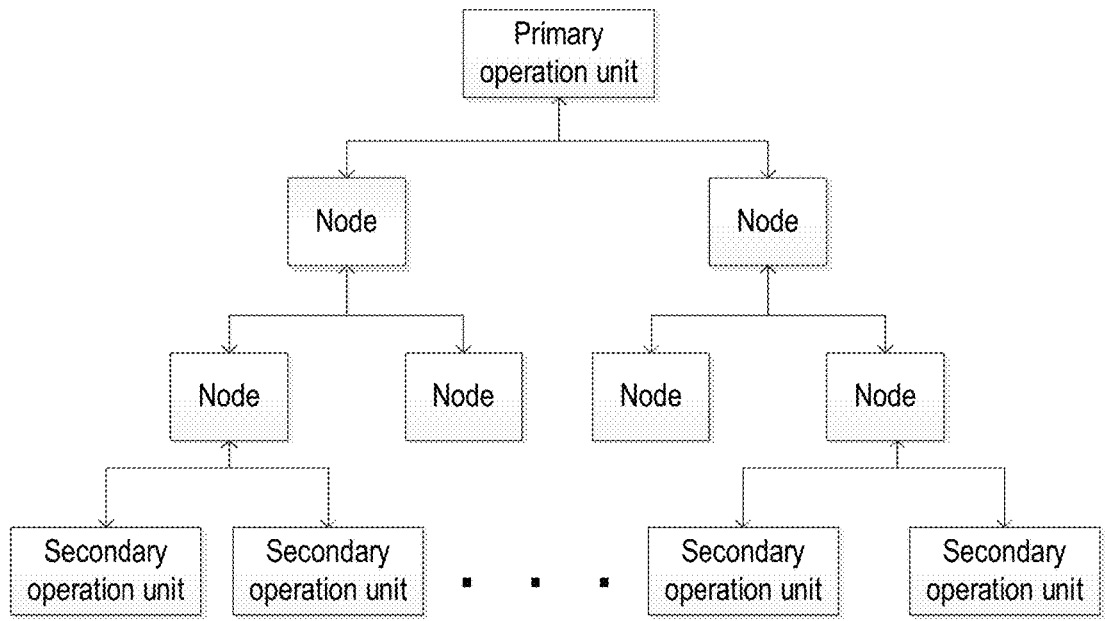
Figures 1, 3:
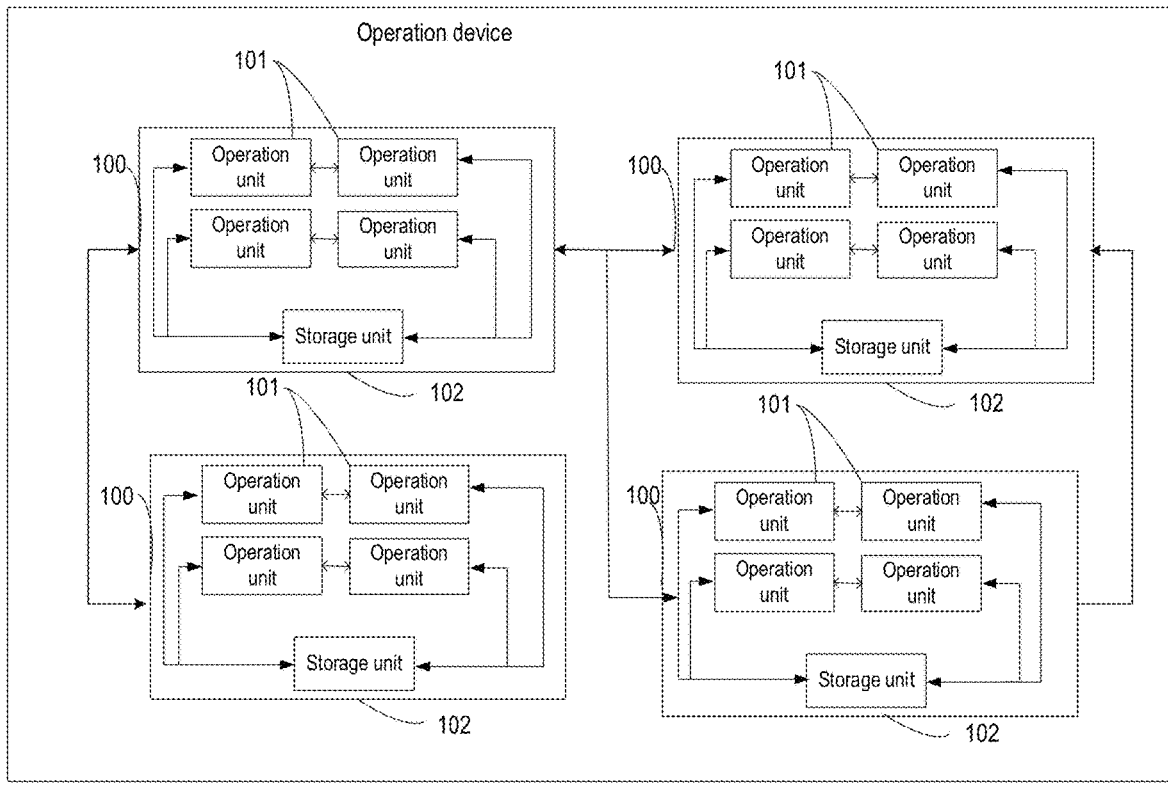
Figures 2, 3:
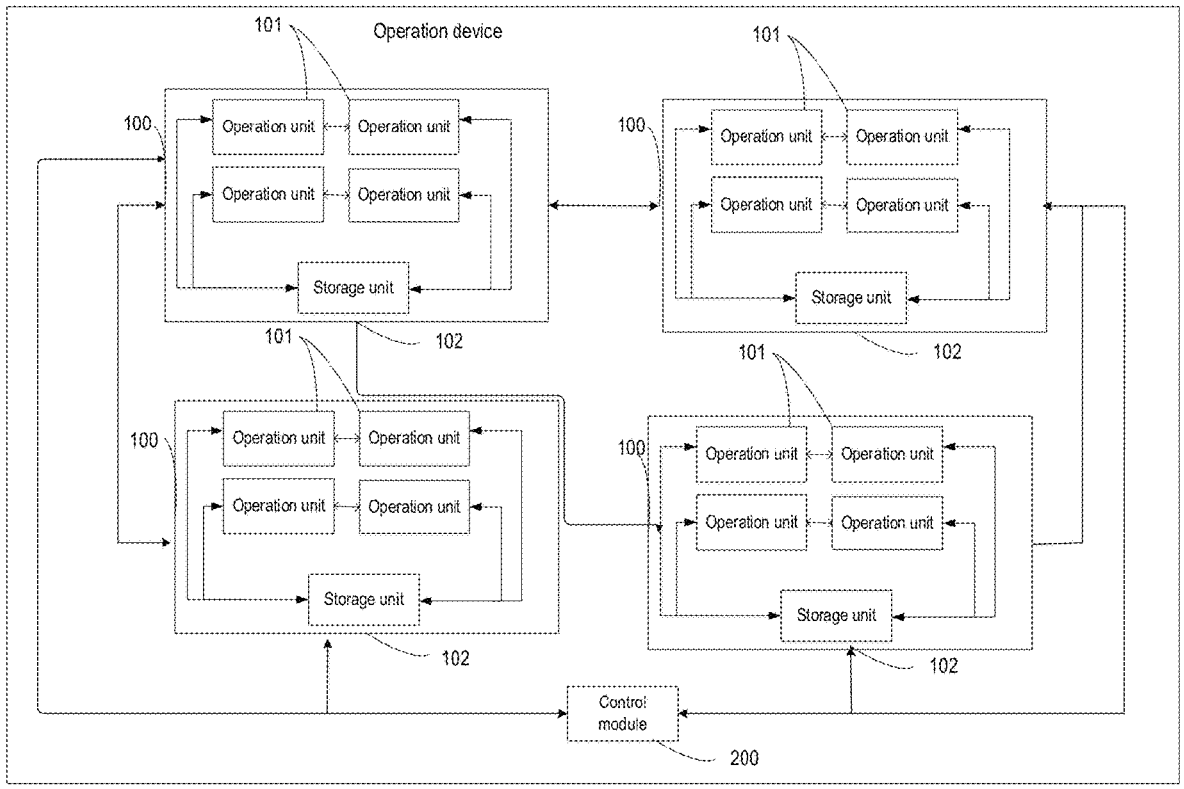
Figure 3:
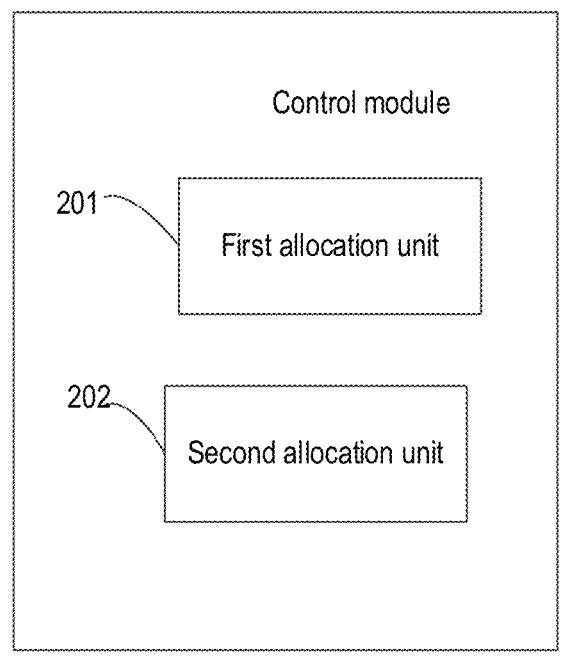
Figures 3, 4:
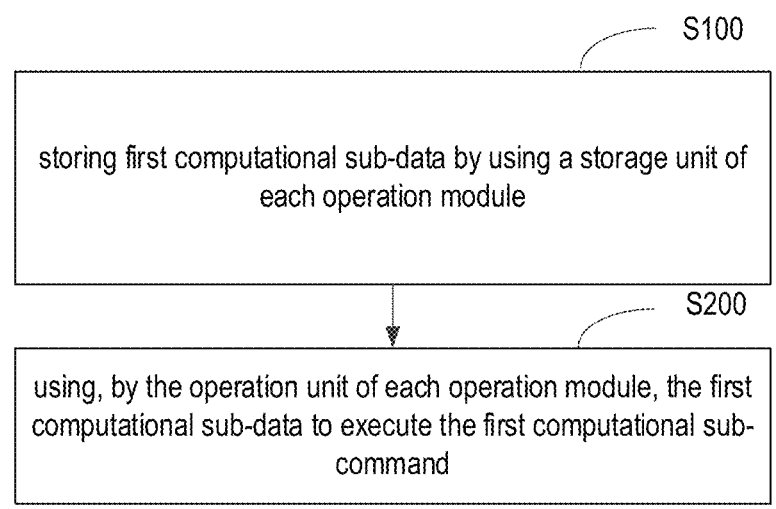
Figures 3, 4, 5:
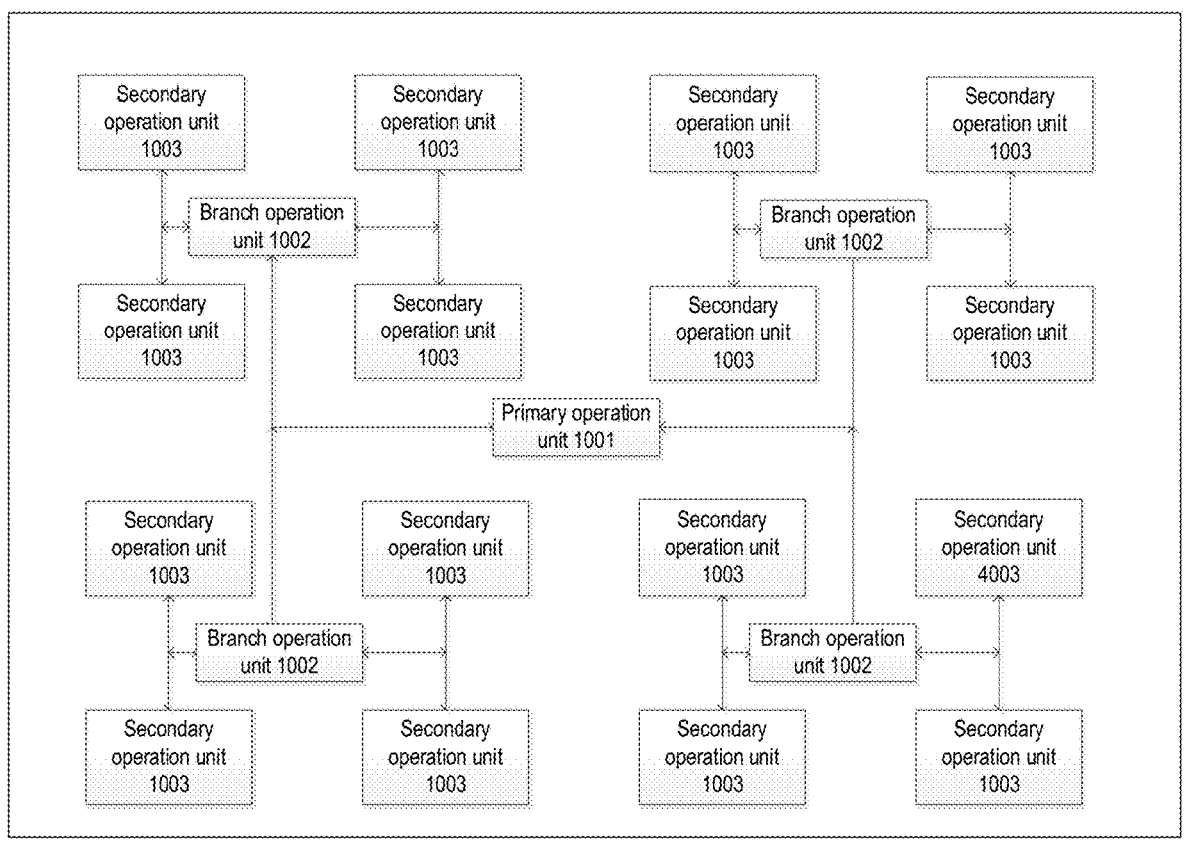
Figures 3, 4, 5, 6:
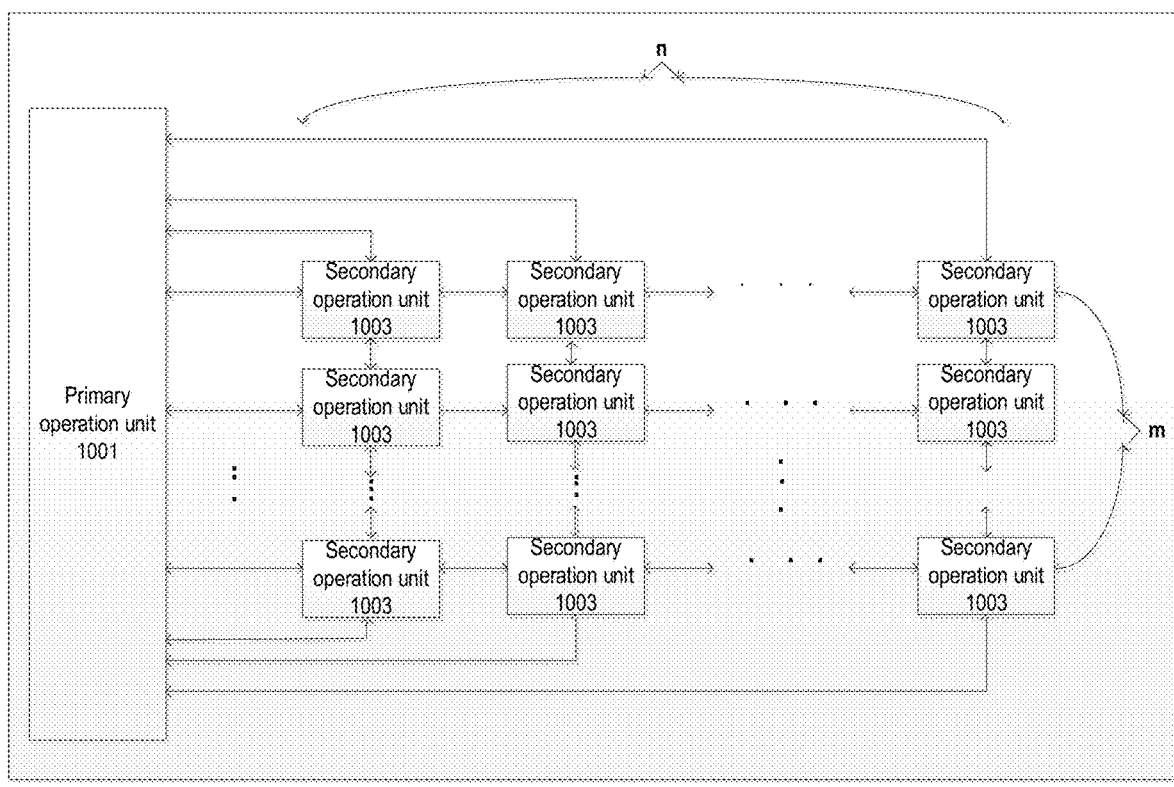
Figures 3, 4, 5, 6, 7:
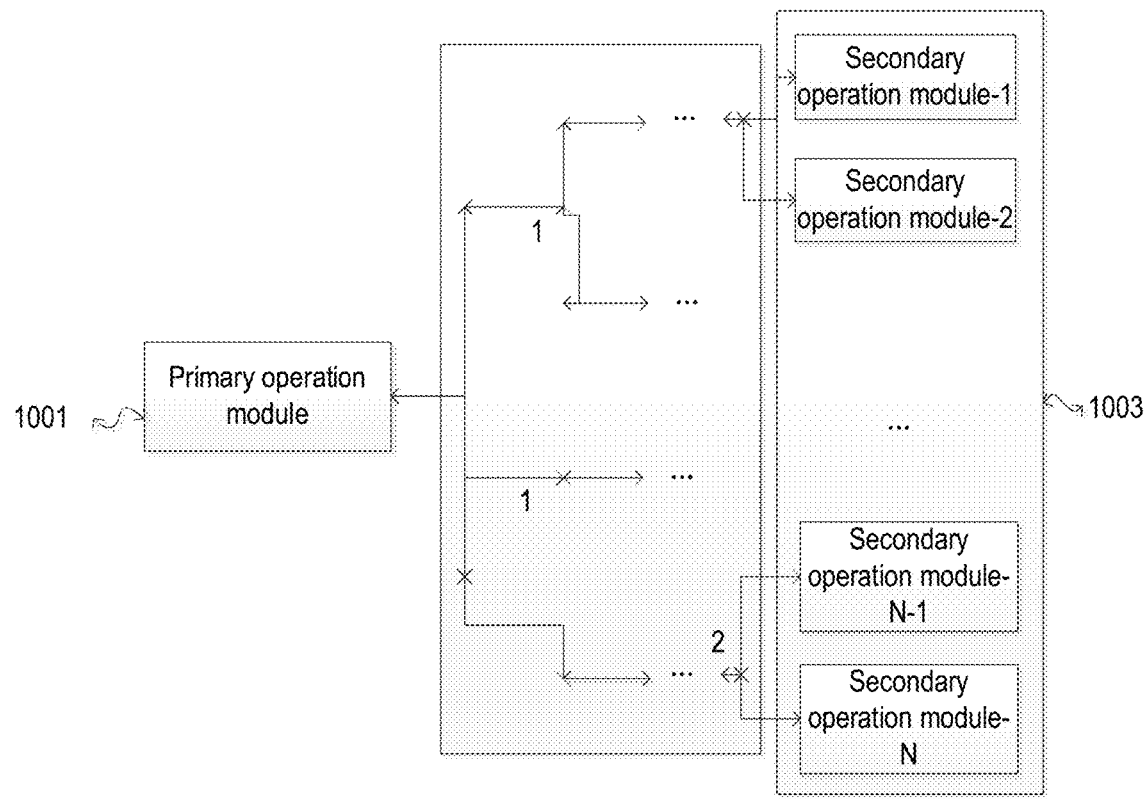
Figures 3, 4, 5, 6, 7, 8:
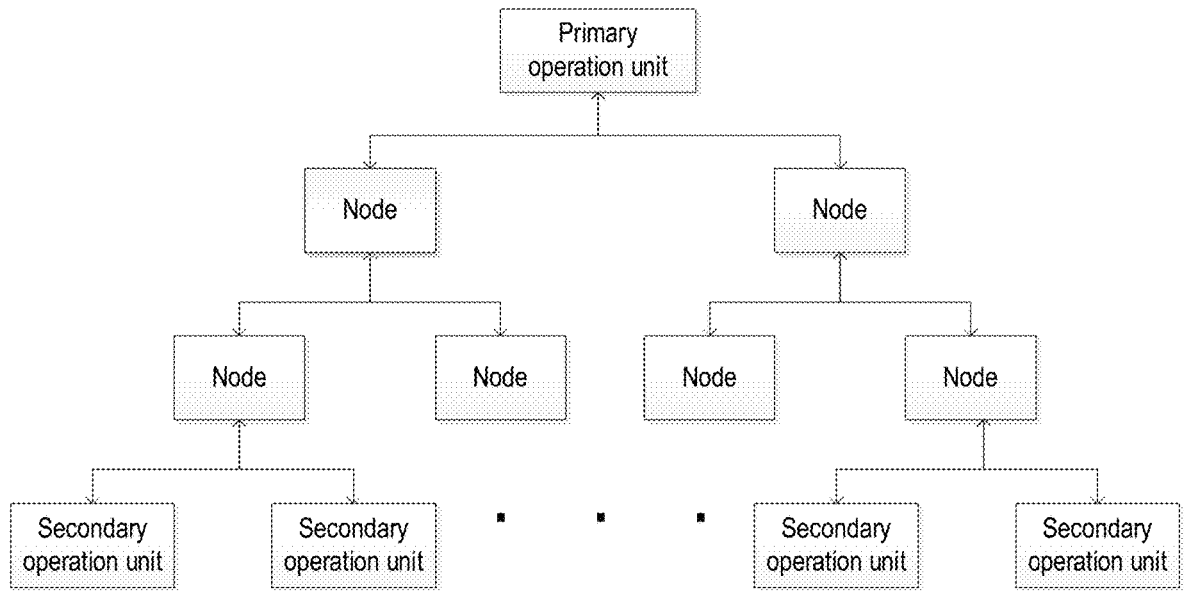
Figures 1, 4:
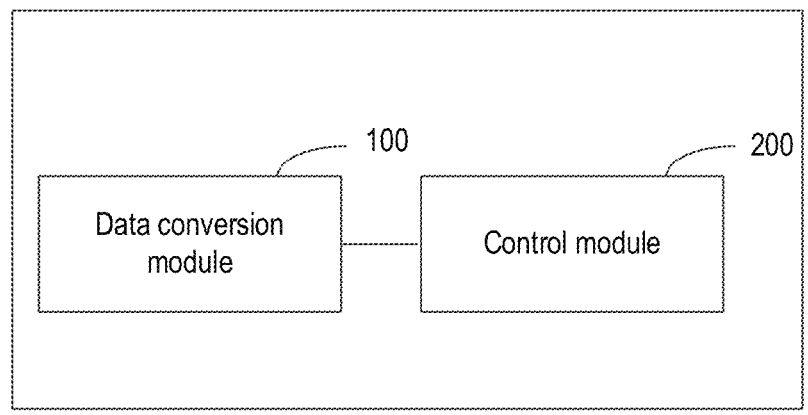
Figures 2, 4:
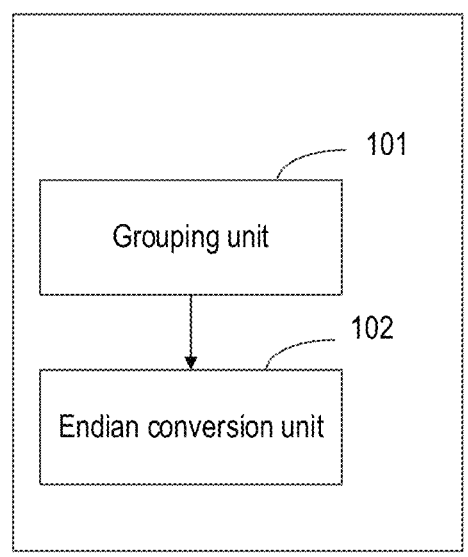
Figures 3, 4:
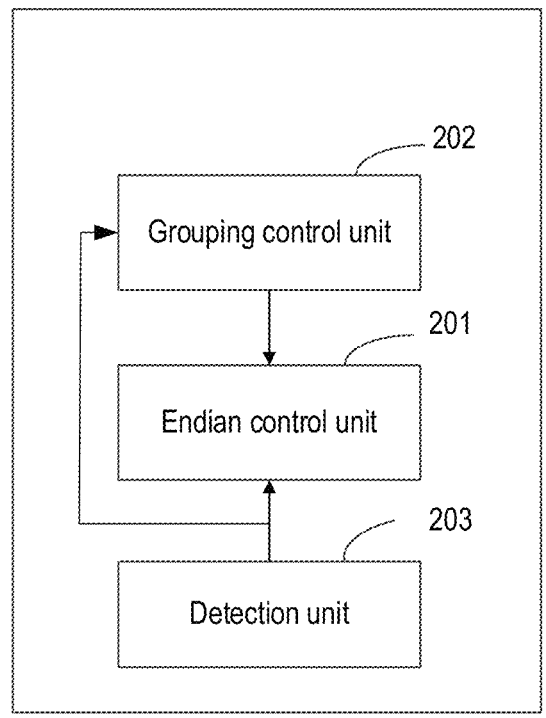
Figure 4:
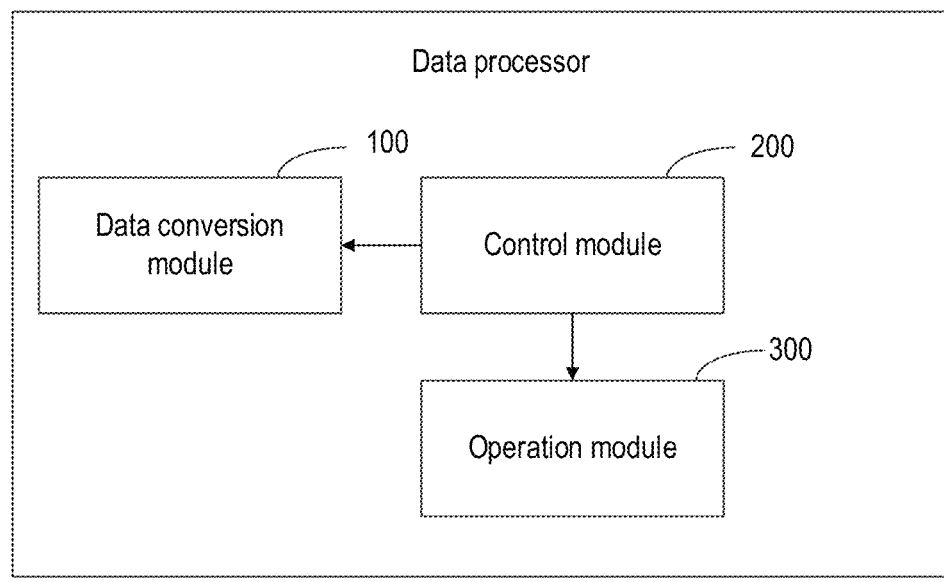
Figures 4, 5:
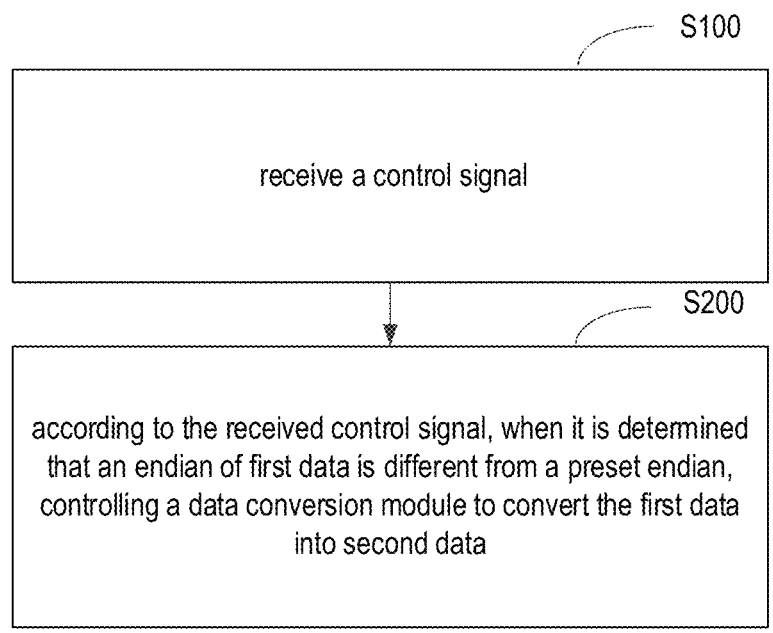
Figures 4, 5, 6:
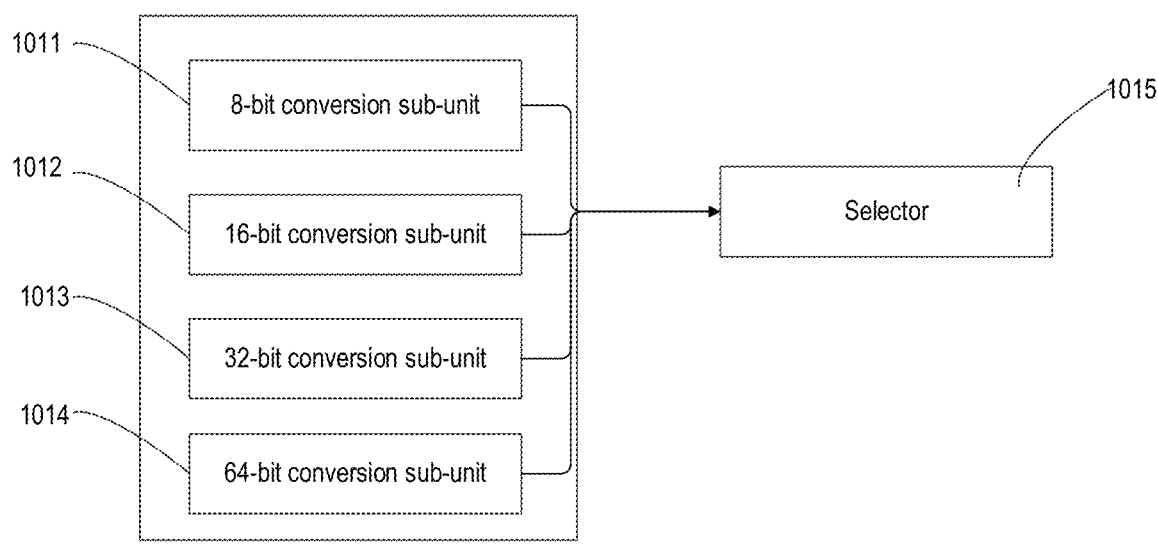

Alternatively, in other embodiments of the present disclosure, the grouping unit 101 may include the above-mentioned plurality of conversion sub-units at the same time. FIG. 4-6 show a structural diagram of the grouping unit according to an embodiment of the present disclosure. The grouping unit may include an 8-bit conversion sub-unit 1011, a 16-bit conversion sub-unit 1012, a 32-bit conversion sub-unit 1013, a 64-bit conversion sub-unit 1014, and a selector 1015 connected to each of the conversion sub-units. Other embodiments of the present disclosure may also include conversion sub-units of other granularities to perform grouping corresponding to preset granularities, which is not limited in by embodiments of the present disclosure.

The selector 1015 is configured to perform a selection operation of the third data. In other words, each of the conversion sub-units 1011, 1012, 1013, and 1014 can respectively perform the grouping operation on the first data to obtain the corresponding third data, and the selector 1015 can select a group of the third data corresponding to the preset granularity from output of each conversion sub-unit. When the preset granularity changes, the third data corresponding to the preset granularity can be easily obtained.

In addition, the endian conversion unit 102 in the embodiment of the present disclosure is configured to convert the endian of the data, so that data of different endian can be processed in the subsequent computational processing. The third data converted by the grouping unit 102 can be subjected to endian conversion. The endian of each byte group of the third data can be converted, and then the second data can be obtained according to the order of each byte group. The data granularity of each byte group is the same as the preset granularity.

When the data granularity of the first data is the same as the preset granularity, the endian conversion unit 102 divides the first data into a plurality of byte groups according to the order from a low address to a high address, which is used for storing the first data and where a data granularity serves as a unit and is regarded as a byte group. When endian conversion is performed, the endian of each byte group is reversed. For example, for a 16-bit data granularity, each byte group can include 2 bytes, and the order of a first byte and a second byte can be reversed. For another example, for a 32-bit data granularity, each byte group can include 4 bytes, and the order of a first byte to a fourth byte can be reversed. Alternatively, for a 64-bit data granularity, each byte group can include 8 bytes, and the order of a first byte to an eighth byte can be reversed. In this way, the endian of the data in each byte group can be converted. After the conversion of the endian in the byte groups is finished, the second data can be formed according to the order of the byte group, in other words, when the data endian conversion process is completed, the byte order in the byte groups is reversed, but the order of the byte groups remains unchanged.

In addition, when the data granularity of the first data is different from the preset granularity, the first data is divided into a plurality of byte groups corresponding to the preset granularity by the grouping unit 101 to form the third data, and then the endian of the third data is converted into the preset endian by the endian conversion unit 102 to obtain the second data. For example, when a 16-bit data granularity is converted by the grouping unit 101, the first data can be divided into a plurality of byte groups according to the order from a low address to a high address, where each byte group includes 2 bytes. The endian conversion unit 102 can exchange the position of the 2 bytes in each byte group while the order of the byte groups is unchanged. In this way, the second data can be obtained. Alternatively, when a 32-bit data granularity is converted by the grouping unit 101, the first data can be divided into a plurality of byte groups according to the order from a low address to a high address, where each byte group includes 4 bytes. The endian conversion unit 102 can exchange the position of the 4 bytes in each byte group while the order of the byte groups is unchanged. In this way, the second data can be obtained. Alternatively, when a 64-bit data granularity is converted by the grouping unit 101, the first data can be divided into a plurality of byte groups according to the order from a low address to a high address, where each byte group includes 8 bytes. The endian conversion unit 102 can exchange the position of the 8 bytes in each byte group while the order of the byte groups is unchanged. In this way, the second data can be obtained, and so on. The above-mentioned embodiment is only an embodiment for explaining the endian conversion performed by the endian conversion unit. In other embodiments, the endian conversion process of data of other granularities can also be performed, which will not be explained in detail here.

Further, as shown in FIG. 4-3, in the embodiment of the present disclosure, the control module 200 may further include a detection unit 203. Before the control module 200 controls the data conversion module 100 to perform data conversion, the detection unit 203 may determine whether the second address space used to store the second data in the control signal is in an idle status. If the second address space is idle, the data conversion module 100 is directed to perform data conversion. If the second address space is not idle, the data conversion module will not execute the corresponding data conversion operation until the second address space becomes idle. In this way, address conflicts and data errors can be avoided.

To present the data conversion process of the embodiment of the present disclosure, the following examples are used for description.

When a system applying the data processor of the embodiment of the present disclosure needs to perform data processing, a control signal may be sent to the control module 200 through the control bus. The control signal may include information such as the first address space of the first data on which a data processing operation is to be executed, the data granularity of the first data (e.g., 64 bits), the endian of the first data (the big endian format), the second address space of the second data to be obtained, the preset data granularity of the second data (32 bits), and the preset endian (the small endian format) of the second data. After receiving the control signal, the control module 200 can send a data conversion instruction to the data conversion module 100, so that the grouping unit can group the first data according to the preset data granularity (32 bits) to obtain the third data. Next, the endian conversion unit converts the endian of each byte group of the third data into the preset endian (the small endian format) to obtain the second data that is in the preset data format. Then the second data can pass through a data bus to be output to the corresponding second storage space, or may be used for other computational processing.

Based on the above-mentioned embodiment, the conversion of the data granularity and/or endian of the first data can be completed, so that the data processor can be used to process various types of first data without requiring other devices to perform data conversion.

In addition, FIG. 4-4 shows a block diagram of a data processor according to an embodiment of the present disclosure. The data processor may include an operation module 300 in addition to the data conversion module 100 and the control module 200 described in the foregoing embodiment. The operation module 300 can perform computational processing on the second data according to a preset computational instruction.

As described in the foregoing embodiment, the control module 200 obtains the control signal from an address bus to obtain a preset computational instruction for performing data operation. Based on this, the control module 200 can determine the preset computational instruction based on the control signal and control the operation module 300 to perform computational processing on the second data based on the preset computational instruction.

In the embodiment of the present disclosure, when the control module 200 determines that the first data does not need to be converted by the data conversion module 100 according to the control signal, in other words, when the endian of the first data is the same as the preset endian, the control module 200 controls the operation module to perform the computational operation on the data according to the preset computational instruction.

In addition, when the control module 200 determines that the first data needs to be converted by the data conversion module 100 according to the control signal, in other words, when the endian of the first data is different from the preset endian, the control module 200 first uses the data conversion module 100 to convert the first data into the second data, and then controls the operation module 300 to perform the operation on the second data based on the preset computational instruction, so as to obtain the data required by the system. It should be noted that the preset computational instruction in the embodiment of the present disclosure can be set based on different computational requirements. The system can determine the computational instruction used for the computational processing of data according to the requirements. The computational instruction includes information such as formulas and rules used for the computational processing. Data required by the system can be obtained from the computational processing. Therefore, the embodiment of the present disclosure does not limit the preset computational instruction. The computational instruction may differ according to different application requirements.

Further, in the embodiment of the present disclosure, before the control module 200 performs a computational operation by using the operation module 300, the control module 200 also needs to determine whether the operation module satisfies a preset condition. Only when the preset condition is met, the operation module can be controlled to perform the computational processing operation. The detection unit 203 in the control module 200 can detect whether the operation module 300 meets the preset condition. If the operation module 300 meets the preset condition, the operation module is directed to perform computational processing on the second data.

In the embodiment of the present disclosure, the detection unit 203 can determine whether the operation module 300 can perform the above-mentioned computational operation. If the operation module 300 has the capability, the operation module 300 can be controlled to perform the computational processing on the second data. If the operation module 300 does not have the capability, the operation module 300 cannot be directed to perform the computational processing on the second data until the operation module 300 is configured to perform the above-mentioned computational operation. The operation module 300 may be an electronic device with data computational processing capabilities and can process a plurality of computational instructions in parallel. When there are a plurality of computational operations, the operation module 300 may not be configured to execute many computational operations successfully due to memory or data processing speed limits. Thus, in the embodiment of the present disclosure, when the detection unit 203 finds that the data processing speed of the operation module 300 is higher than a preset speed or the memory space is higher than a preset memory space, the detection unit 203 can determine that the operation module 300 is capable of performing computational operations.

In addition, the operation module 300 in the embodiment of the present disclosure may include a plurality of operation units. The plurality of operation units can perform different computational operations respectively. Therefore, the detection unit 203 can determine that the operation module meets the preset condition when there is an idle operation unit. In other words, when there is an operation unit that can perform the foregoing computational operation, the operation module is controlled to perform the corresponding computational operation by using the idle operation unit.

In the embodiment of the present disclosure, the detection unit 203 can also detect whether an address space applied by the computational processing currently performed by the operation module 300 conflicts with the second address space of the second data and/or an address space of the preset computational instruction. If there is no conflict, it is determined that the operation module meets the preset condition. The conflict refers to that there is an overlap between an address space for storing data generated during the computational operation currently performed by the operation module and the address space of the second data, or there is an overlap between the address space for storing the data generated during the computational operation currently performed by the operation module and the address space of the preset computational instruction, or there is an overlap between an address space for storing data after performing the operation of the second data and an address space used by the computational operation currently performed by the operation module. When there is no conflict between the above addresses can the operation module be controlled to perform the computational operation.

Based on the above configuration, when the operation module meets the preset condition, the operation module can be used to perform the corresponding computational operation, which ensures data security and improves the efficiency of computation.

In summary, a data conversion module can be set in the data processor of the embodiment of the present disclosure, so that data can be conveniently converted into the required format by the data conversion module without using other conversion devices to convert data, thereby reducing the cost of using other conversion devices. At the same time, with the data conversion module, the data processor can be used for various data formats, thus having better applicability.

It can be understood that, without violating the principle and logic, the method embodiments mentioned in the present disclosure can be combined with each other to form a combined embodiment, details of which are omitted due to space limitation.

In addition, the present disclosure also provides a data processing chip and an electronic equipment that include the data processor provided in any of the embodiments above, and a data processing method applied to the data processor. Corresponding technical solutions and descriptions can be found in the description of the method, and are thus omitted.

An embodiment of the present disclosure also provides a data processing chip which includes the data processor as described in any of the foregoing embodiments.

In some examples, the present disclosure provides a chip package structure including the chip.

In some examples, the present disclosure provides a board card including the chip package structure.

An embodiment of the present disclosure also provides an electronic equipment which includes the data processor or the data processing chip or the board card as described in any of the above embodiments.

The electronic equipment may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In addition, an embodiment of the present disclosure also provides a data processing method. The method is applied to the data processor provided in any of the embodiments above. FIG. 4-5 is a flowchart of a data processing method according to an embodiment of the present disclosure. The method includes:

S100: receive a control signal; and

S200: according to the received control signal, when it is determined that an endian of first data is different from a preset endian, controlling a data conversion module to convert the first data into second data according to a preset data format.

The data conversion module is configured to convert the first data into the second data according to the preset data format, where the preset data format includes a preset granularity and the preset endian.

In an embodiment of the present disclosure, the data conversion module includes a grouping unit and an endian conversion unit.

The step of controlling the data conversion module to convert the first data into the second data according to the preset data format includes:

using the grouping unit to divide the first data into a plurality of byte groups based on the preset granularity to obtain third data; and using the endian conversion unit to convert the third data into the second data based on the preset endian.

The granularity of each byte group of the third data is the same as the preset granularity.

In the embodiment of the present disclosure, the step of using the grouping unit to divide the first data into a plurality of byte groups based on the preset granularity to obtain the third data includes:

dividing the first data into the plurality of byte groups according to the order from a low address to a high address of an address space of the first data, where the count of the plurality of byte groups is the same as the ratio between the data granularity of the first data and the preset granularity; and obtaining the third data based on the plurality of byte groups.

In an embodiment of the present disclosure, the step of using the endian conversion unit to convert the third data into the second data based on the preset endian includes:

using the endian conversion unit to reverse the endian of each byte group of the third data, and obtaining the second data according to the order of the byte groups.

In an embodiment of the present disclosure, the method further includes:

obtaining a first address space for storing the first data and a second address space for storing the second data based on the control signal.

The data conversion module obtains the first data based on the first address space, converts the first data into the second data, and stores the second data in the second address space.

In an embodiment of the present disclosure, the method further includes:

determining the preset computational instruction based on the control signal; and controlling the operation module to perform computational processing on the second data according to the preset computational instruction.

In an embodiment of the present disclosure, the method further includes:

detecting whether the operation module meets a preset condition; and if the operation module meets the preset condition, controlling the operation module to perform computational processing on the second data according to the preset computational instruction.

In an embodiment of present disclosure, the step of detecting whether the operation module meets the preset condition includes:

when the operation module includes an idle operation unit, determining that the operation module meets the preset condition; and/or detecting whether the address space used by the current computational processing performed by the operation module conflicts with the address space of the second data and/or the address space of the preset computational instruction, and if there is no conflict, determining that the operation module meets the preset condition.

It should be noted that, the foregoing embodiments of method, for the sake of conciseness, are all described as a series of action combinations, but those skilled in the art should know that since according to the present disclosure, the steps may be performed in a different order or simultaneously, the disclosure is not limited by the described order of action. Secondarily, those skilled in the art should also know that the embodiments described in the specification are all optional, and the actions and modules involved are not necessarily required for the present disclosure.

In the embodiments above, the description of each embodiment has its own emphasis. For a part that is not described in detail in one embodiment, reference may be made to related descriptions in other embodiments.

In the several examples provided in this disclosure, it should be understood that the disclosed device may be implemented in other ways. For instance, the examples above are merely illustrative. For instance, the division of the units is only a logical function division. In a real implementation, there may be another manner for division. For instance, a plurality of units or components may be combined or may be integrated in another system, or some features can be ignored or not performed. In addition, the displayed or discussed mutual coupling or direct coupling or communication connection may be implemented through indirect coupling or communication connection of some interfaces, devices or units, and may be electrical or other forms.

The units described as separate components may or may not be physically separated. The components shown as units may or may not be physical units. In other words, the components may be located in one place, or may be distributed to a plurality of network units. According to certain needs, some or all of the units can be selected for realizing the purposes of the examples of the present disclosure.

In addition, the functional units in each example of the present application may be integrated into one processing unit, or each of the units may exist separately and physically, or two or more units may be integrated into one unit. The integrated units above may be implemented in the form of hardware or in the form of software program modules.

When the integrated units are implemented in the form of a software program module and sold or used as an independent product, they may be stored in a computer-readable memory. Based on such understanding, the essence of the technical solutions of the present disclosure, or a part of the present disclosure that contributes to the prior art, or all or part of technical solutions, can all or partly embodied in the form of a software product that is stored in a memory. The software product includes several instructions to enable a computer device (which may be a personal computer, a server, or a network device, etc.) to perform all or part of the steps of the methods described in the examples of the present disclosure. The foregoing memory includes: a USB flash drive, a read-only memory (ROM), a random-access memory (RAM), a mobile hard disk, a magnetic disk, or an optical disc, and other media that can store program codes.

A person of ordinary skill in the art may understand that all or part of the steps of the foregoing embodiments of method may be completed by a program instructing related hardware. The program may be stored in a computer-readable memory, and the memory may include a flash disk, a read-only memory (ROM), a random-access memory (RAM), a magnetic disk, an optical disk, or the like.

The examples of the present disclosure have been described in detail above. Specific examples have been used in the specification to explain the principles and implementation manners of the present disclosure. The descriptions of the above examples are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

The invention claimed is:

1. An on-chip code breakpoint debugging method, comprising:
   an on-chip processor configured to execute an on-chip code, wherein an output function is set at a breakpoint of the on-chip code;
   obtaining, by the on-chip processor, output information output by the output function;
   outputting the output information to an off-chip memory; and
   storing the output information in the off-chip memory;
   wherein the outputting of the output information to the off-chip memory comprises:
   querying, by the on-chip processor, a hardware status of the off-chip memory by using a first thread, wherein the hardware status includes a hardware interrupt status or a hardware non-interrupt status, wherein, the hardware interrupt status of the off-chip memory is a status that the off-chip memory enters after triggering an interrupt function according to the received output information, and
   when the on-chip processor determines that the status of the off-chip memory is the hardware interrupt status, outputting, by the first thread, the output information in the off-chip memory.

2. The method of claim 1, further comprising:
   determining, by the on-chip processor, a breakpoint debugging result of the on-chip code according to the output information while the on-chip code continues to be executed.

3. The method of claim 1, wherein, the output function includes a print number function or a print string function.

4. The method of claim 1, wherein, the output information includes preset number information, or string information, or output information of functions other than the output function in the on-chip code.

5. The method of claim 1, wherein, the obtaining, by the on-chip processor, the output information output by the output function includes:
   obtaining, by the on-chip processor, the output information from a RAM of a system on chip.

6. The method of claim 1, further comprising:
outputting, by the on-chip processor, the output information to the off-chip memory using a driver.

7. The method of claim 6, wherein, the outputting, by the on-chip processor, the output information in the off-chip memory using a driver includes:
when the output information in the off-chip memory is updated, outputting, by the on-chip processor, updated output information.

8. The method of claim 7, wherein, when the output information in the off-chip memory is updated, outputting, by the on-chip processor, the updated output information includes:
querying, by the on-chip processor, the output information in the off-chip memory using a second thread,
when the output information is updated, update a status identifier of the off-chip memory using the second thread,
querying, by the on-chip processor, the status identifier of the off-chip memory by using a third thread, and
when the on-chip processor determines that the status identifier is updated, using the third thread to output the updated output information in the off-chip memory.

9. The method of claim 8, wherein, the querying, by the on-chip processor, the output information in the off-chip memory by using the second thread includes: starting, by the on-chip processor, the second thread to query the output information in the off-chip memory by using a driver, and
wherein the querying, by the on-chip processor, the status identifier of the off-chip memory by using the third thread includes: starting, by the on-chip processor, the third thread to query the status identifier of the off-chip memory by using a HOST program; and
wherein, the status identifier of the off-chip memory includes a read/unread identifier.

10. An on-chip processor, comprising:
a starting circuit configured to execute an on-chip code, wherein an output function is set at a breakpoint of the on-chip code;
an output information obtaining circuit configured to obtain output information output by the output function;
an outputting circuit to output the output information to an off-chip memory; and
a storage circuit configured to store the output information in the off-chip memory;
wherein the outputting circuit is configured to:
query the output information in the off-chip memory using a first thread,
when the outputting circuit determines that the output information is updated, use the first thread to update a status identifier of the off-chip memory,
query the status identifier of the off-chip memory by using a second thread, and
when the outputting circuit determines that the status identifier is updated, use the second thread to output the updated output information in the off-chip memory, wherein the status identifier of the off-chip memory includes a read/unread identifier.

11. The processor of claim 10, further comprising:
a breakpoint debugging result determining circuit configured to determine a breakpoint debugging result of the on-chip code according to the output information in the off-chip memory.

12. The processor of claim 10, wherein, the output function includes a print number function or a print string function.

13. The processor of claim 10, wherein, the output information includes preset number information, or string information, or output information of functions other than the output function in the on-chip code.

14. The processor of claim 10, wherein, the output information obtaining circuit includes:
the on-chip processor is configured to obtain the output information of the output function from a RAM of a system on chip.

15. The processor of claim 10, wherein the outputting circuit includes:
a first outputting sub-circuit configured to output the output information to the off-chip memory using a driver;
a second—outputting sub-circuit configured to output updated output information to update the output information in the off-chip memory.

16. The processor of claim 15, wherein, when the second outputting sub-circuit queries the output information in the off-chip memory using the first thread,
a driver starts the first thread to query the output information in the off-chip memory, and
when the second outputting sub-circuit queries the status identifier of the off-chip memory by using the second thread,
a HOST program starts the second thread to query the status identifier of the off-chip memory.

17. The processor of claim 16, wherein, the outputting circuit includes:
a third outputting sub-circuit configured to query a hardware status of the off-chip memory using a third thread, wherein the hardware status includes a hardware interrupt status or a hardware non-interrupt status, wherein, the hardware interrupt status of the off-chip memory is a status that the off-chip memory enters after triggering an interrupt function according to the received output information, when the third outputting sub-circuit determines that the status of the off-chip memory is the hardware interrupt status, the third thread outputs the output information in the off-chip memory.

18. A chip breakpoint debugging system, comprising: a breakpoint debugging chip and an off-chip memory, wherein,
the breakpoint debugging chip includes the on-chip processor of claim 10, and is configured to perform on-chip breakpoint debugging; and
the off-chip memory is configured to store output information of the breakpoint debugging chip.

* * * * *